(12) United States Patent
Tran et al.

(10) Patent No.: US 11,646,492 B2
(45) Date of Patent: May 9, 2023

(54) CELLULAR SYSTEM

(71) Applicants: Bao Tran, Saratoga, CA (US); Ha Tran, Saratoga, CA (US)

(72) Inventors: Bao Tran, Saratoga, CA (US); Ha Tran, Saratoga, CA (US)

(*) Notice: Subject to any disclaimer, the term of this patent is extended or adjusted under 35 U.S.C. 154(b) by 0 days.

(21) Appl. No.: 17/665,523

(22) Filed: Feb. 5, 2022

(65) Prior Publication Data
US 2022/0255223 A1    Aug. 11, 2022

Related U.S. Application Data

(63) Continuation of application No. 17/094,596, filed on Nov. 10, 2020, which is a continuation of application No. 16/684,504, filed on Nov. 14, 2019, now Pat. No. 10,897,083, which is a continuation of application No. 16/511,164, filed on Jul. 15, 2019, now Pat. No. 10,498,029, which is a continuation of application No. 16/404,853, filed on May 7, 2019, now Pat. No. 10,461,421.

(51) Int. Cl.
| | |
|---|---|
| H01Q 3/46 | (2006.01) |
| G10L 25/51 | (2013.01) |
| H01Q 1/44 | (2006.01) |
| H01Q 1/24 | (2006.01) |
| H01Q 21/28 | (2006.01) |
| G06N 3/08 | (2023.01) |
| G06N 3/04 | (2023.01) |
| H04W 4/40 | (2018.01) |
| F21S 8/08 | (2006.01) |
| G06V 40/16 | (2022.01) |
| F21W 131/103 | (2006.01) |
| H04L 67/12 | (2022.01) |
| H04L 67/10 | (2022.01) |
| H04B 17/309 | (2015.01) |
| G06V 40/20 | (2022.01) |

(52) U.S. Cl.
CPC ............ *H01Q 3/46* (2013.01); *F21S 8/086* (2013.01); *G06N 3/04* (2013.01); *G06N 3/08* (2013.01); *G10L 25/51* (2013.01); *H01Q 1/246* (2013.01); *H01Q 1/44* (2013.01); *H01Q 21/28* (2013.01); *H04W 4/40* (2018.02); *F21W 2131/103* (2013.01); *G06V 40/172* (2022.01); *G06V 40/25* (2022.01); *H04B 17/309* (2015.01); *H04L 67/10* (2013.01); *H04L 67/12* (2013.01)

(58) Field of Classification Search
CPC ........... H01Q 3/46; H01Q 1/246; H01Q 1/44; H01Q 21/28; H01Q 21/26; H01Q 21/205
See application file for complete search history.

(56) References Cited

U.S. PATENT DOCUMENTS

| | | | |
|---|---|---|---|
| 11,171,719 B2* | 11/2021 | Cui | H04B 7/18584 |
| 2017/0126476 A1* | 5/2017 | Curtin | H04L 41/5009 |
| 2018/0270128 A1* | 9/2018 | Auvenshine | H04L 43/16 |

(Continued)

FOREIGN PATENT DOCUMENTS

| | | | |
|---|---|---|---|
| CN | 101742775 A | * | 6/2010 |
| CN | 104035388 A | * | 9/2014 |

(Continued)

*Primary Examiner* — Hoang V Nguyen
(74) *Attorney, Agent, or Firm* — PowerPatent; Bao Tran

(57) ABSTRACT

A system includes one or more antennas and a processor to communicate with a predetermined target using 5G or 6G protocols.

20 Claims, 24 Drawing Sheets

(56) References Cited

U.S. PATENT DOCUMENTS

2018/0285767 A1* 10/2018 Chew .................... H04L 67/566
2018/0324780 A1* 11/2018 Novlan ............... H04L 43/0811

FOREIGN PATENT DOCUMENTS

| CN | 106778910 A | * | 5/2017 | ........... G06K 9/6256 |
| CN | 109032002 A | * | 12/2018 | |
| WO | WO-2016156401 A1 | * | 10/2016 | ......... G06K 9/00288 |
| WO | WO-2018128946 A1 | * | 7/2018 | |

* cited by examiner

User Plane Protocol Stack

Control Plane Protocol Stack

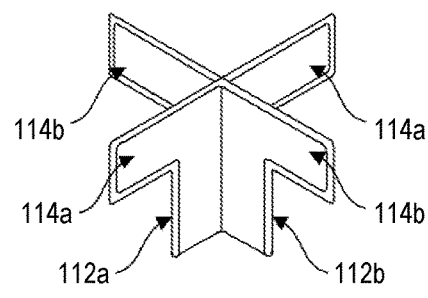
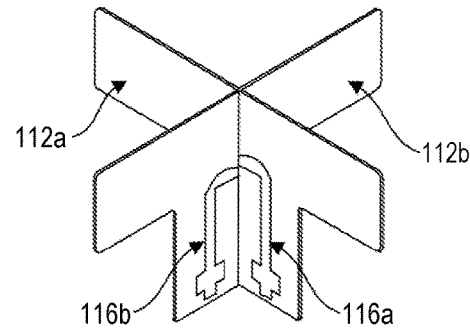
FIG. 3A       FIG. 3B
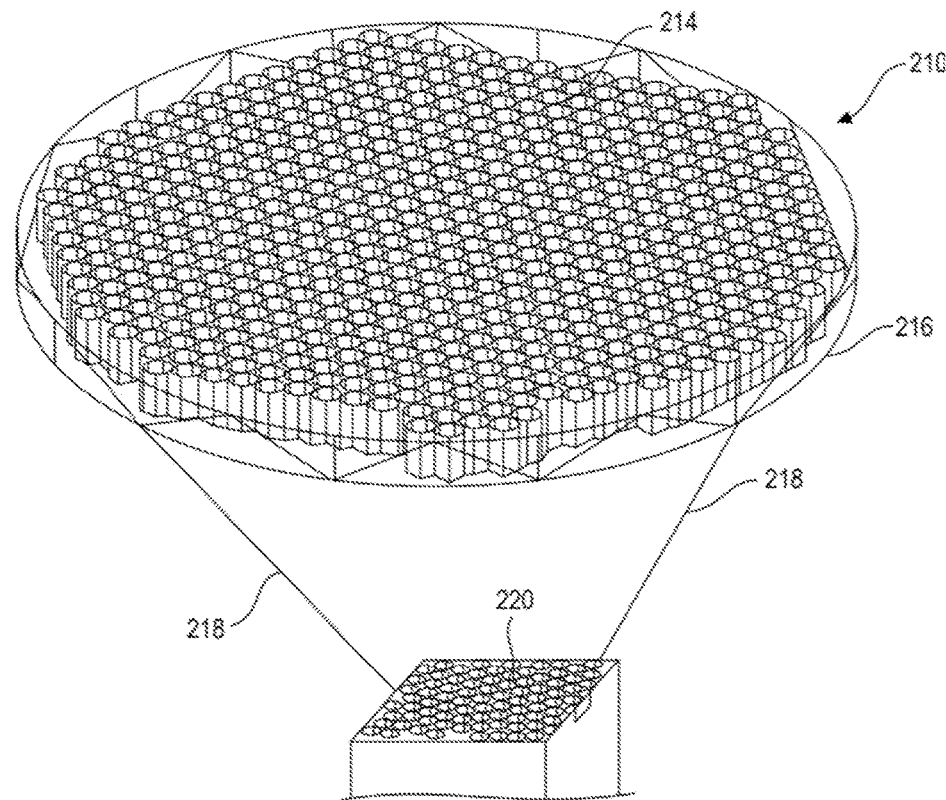
FIG. 4A

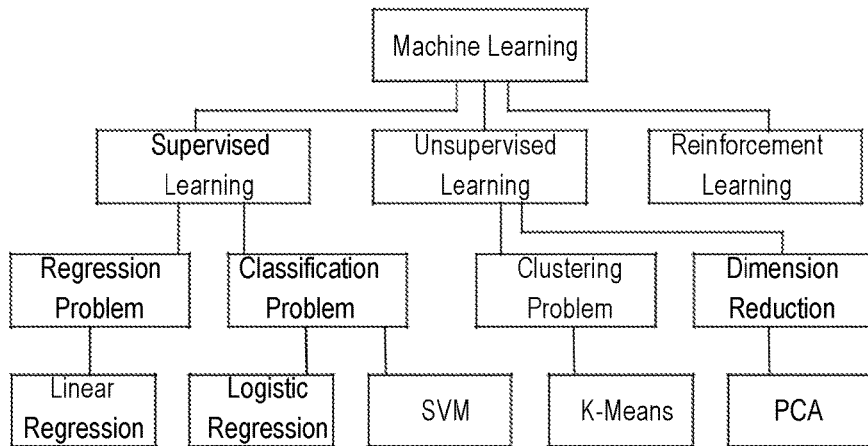

FIG. 7C

- ◎ Backfed Input Cell
- ○ Input Cell
- ⊙ Noisy Input Cell
- ○ Hidden Cell
- ◎ Probablistic Hidden Cell
- ⊙ Spiking Hidden Cell
- ○ Output Cell
- ◎ Match Input Output Cell
- ○ Recurrent Cell
- ◎ Memory Cell
- ⊙ Different Memory Cell
- ○ Kernel
- ◎ Convolution or Pool Perceptron (P)  Feed Forward (FF)  Radiel Basis Network (RBF)  Deep Feed Forward (DFF)

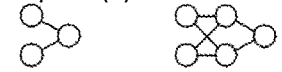

Recurrent Neural Network (RNN)   Long / Short Term Memory (LSTM)   Gated Recurrent Unit (GRU)

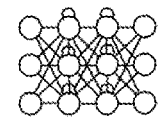 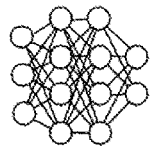

Auto Ercoder (AE)   Variational AE (VAE)   Denoising AE (DAE)   Sparse AE (SAE)

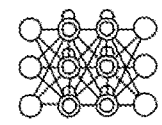 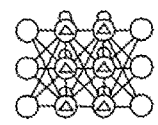

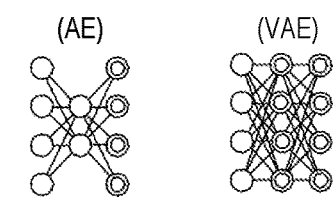 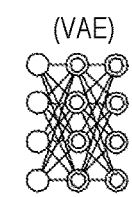 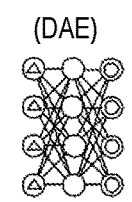 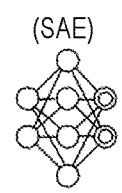

Markov Chain (MC)   Hopfield Network (HN)   Boltzmann Machine (BN)   Restricted BM (RBM)   Deep Belief Network (DBM)

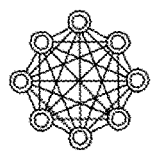 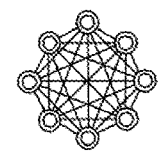 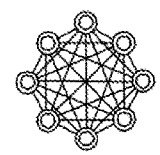 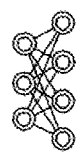 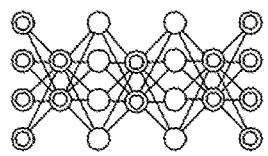

FIG. 7D

CELLULAR SYSTEM

The present invention relates to cellular systems.

2G, 3G and 4G cellular wireless technologies have been mass deployed throughout the world. Moreover personal area network based technologies such as Wi-Fi, Bluetooth and ZigBee have become predominant in our daily life. 5G is the short form of 5th Generation. It is used to designate fifth generation of mobile technologies. 5G has made it possible to use mobile phone with larger bandwidth possible. It is a packet switched wireless system. It is used to cover wide area and used to provide higher throughput. It uses CDMA, BDMA and also millimeter wave (for backhaul wireless connectivity). It uses improved and advanced data coding/modulation techniques. It provides about 100 Mbps at full mobility and 1 Gbps at low mobility. It uses smart antenna techniques to support higher data rate and coverage.

5G cell phones use radio frequencies in various bands as per country wise allocations. Typically it uses less than 1 GHz, below 6 GHz and above 6 GHz (i.e. mmwave) frequency bands. It delivers fast uplink/downlink throughput due to massive MIMO and lower latency between 5G network (i.e. 5GNB) and itself. The 5G cell phone supports 10 times throughput compare to 4G phones. They are backward compatible to 4G standards such as LTE and LTE-advanced. Moreover latest 5G phones will support Bluetooth, Wi-Fi and NFC based short distance wireless technologies. GPS is also incorporated to support various GPS based applications including location tracking, google maps etc.

5G promises an extremely interconnected world where everything from smartwatches, vehicles, houses, and farms utilize the ultrafast speeds and low delays it offers. To accomplish this, and to do it well—with as little coverage gaps as possible—it's required to have a huge number of 5G towers, particularly in areas that demand lots of traffic like big cities and business districts. Another reason 5G towers have to be installed so frequently in busy areas is because for the small cell to support superfast speeds, it has to have a direct line of sight with the receiving device. Since 5G cell towers are so small, they can be positioned in ordinary places like on light poles, the tops of buildings, and even street lights. This translates into less traditional looking towers but also potentially more eyesores nearly everywhere.

5G relies on massive multi-antenna (MIMO) where NT transmitting antennas are provided to a transmitting stage, while NR receiving antennas are provided to a receiving stage. The increase of the channel transmission capacity is in proportion to the number of antennas, assuming that the transmitter in a wireless communication system knows the channel. For channel estimation without interference, the RSs of multiple transmitters should be orthogonal to each other. If there is a correlation between the RS from the first transmitter to the first receiver and the RS from the second transmitter to the second receiver, the channel estimation at the first receiver may reflect not only the channel from the first transmitter to the first receiver but also the channel from the second transmitter to the first receiver. It can be said that the channel from the first transmitter to the first receiver is contaminated by the channel from the second transmitter to the first receiver (pilot contamination).

SUMMARY

Various inventive aspects are disclosed below:

Liquid Lens Antenna

1. A system, comprising:
   a liquid lens with moveable surface, wherein liquid is added or removed to adjust the curvature of the moveable surface; and
   an antenna mounted on the moveable surface to change a direction of the antenna to a predetermined target.

The system may include one or more of the following:

2. A viscous liquid in the lens can be injected under processor control to change the curvature of the lens and to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the lens can be done by injecting or removing liquid from the lens.

6. Opposing pairs of lenses can be formed to provide two-sided communication antennas.

7. An array of liquid lens can be used (similar to bee eyes), each antenna is independently steerable to optimize 5G transmission.

8. Fresnel lens can be used to improve SNR.

9. The focusing of the lens can be automatically done using processor with iterative changes in the orientation of the antenna by changing the lens shape until predetermined criteria is achieved such as the best transmission speed, TSSI, RSSI, SNR, among others. This is similar to the way human vision eyeglass correction is done.

10. A learning machine such as neural network or SVM can be used over the control/management plane of the 5G network to optimize 5G parameters based on local behaviors.

Steerable Actuated Antenna

1. A system, comprising:
   a moveable surface; and
   one or more antennas mounted on the moveable surface to change a direction of the antenna to a predetermined target.

The system may include one or more of the following:

2. A pneumatic actuator or electrical motor can be placed under processor control to change the curvature of the lens and to change the directionality of the antenna.

3. The processor can calibrate the RF link between the tower and the client device.

4. The processor can calibrate the connection by examining the RSSI and TSSI and scan the moveable surface until the optimal RSSI/TSSI levels (or other cellular parameters) are reached.

5. The scanning of the target device can be done by moving the actuators up or down.

6. Opposing actuator arrays can be formed to provide two-sided communication antennas.

7. An array of actuators can be used (similar to bee eyes), each antenna is independently steerable to optimize 5G transmission.

8. Fresnel lens can be used to improve SNR.

9. The focusing of the actuators can be automatically done using processor with iterative changes in the orientation of the antenna by changing the actuators until predetermined criteria is achieved such as the best transmission speed, TSSI, RSSI, SNR, among others. This is similar to the way human vision eyeglass correction is done.

10. A learning machine such as neural network or SVM can be used over the control/management plane of the 5G network to optimize 5G parameters based on local behaviors.

Learning System Plane

1. A system to optimize data flow in a 5G network, comprising:
a neural network plane;
a control plane coupled to the neural network plane;
a management plane coupled to the neural network plane;
a data plane coupled to the neural network plane, wherein the neural network plane receives cellular network statistics from the data plane for training, and during run-time, the neural network provides operating parameters to the data, control and management planes; and
one or more operations sending resource request to the neural network plane for autonomous resolution that maximizes data flow in the system.

The system may include one or more of the following:

2A. A moveable surface; and one or more antennas mounted on the moveable surface to change a direction of the antenna to a predetermined target.

2B. A pneumatic actuator or electrical motor can be placed under processor control to change the curvature of the lens and to change the directionality of the antenna.

3. The processor can calibrate the RF link between the tower and the client device.

4. The processor can calibrate the connection by examining the RSSI and TSSI and scan the moveable surface until the optimal RSSI/TSSI levels (or other cellular parameters) are reached.

5. The scanning of the target device can be done by moving the actuators up or down.

6. Opposing actuator arrays can be formed to provide two-sided communication antennas.

7. An array of actuators can be used (similar to bee eyes), each antenna is independently steerable to optimize 5G transmission.

8. Fresnel lens can be used to improve SNR.

9. Focus the antenna on BS and UE, and then combine antennas for orthogonal transmissions based on various factors.

10. The focusing of the actuators can be automatically done using processor with iterative changes in the orientation of the antenna by changing the actuators until predetermined criteria is achieved such as the best transmission speed, TSSI, RSSI, SNR, among others. This is similar to the way human vision eyeglass correction is done.

Man-Hole Antenna

1A. A system, comprising:
one or more actuators;
a ground cover above the one or more actuators providing a moveable surface, wherein the actuators move to adjust the curvature of the movable surface; and
an antenna mounted on the moveable surface to change a direction of the antenna to a predetermined target.

18. A system, comprising:
a ground cover (such as a manhole cover) that allows radio signal to pass through;
a moveable surface coupled to the cover; and
one or more antennas mounted on the moveable surface to change a direction of the antenna to a predetermined target.

The system may include one or more of the following:

2. A processor can control to change the curvature of the surface and to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. The cover is a drop in replacement for existing city light housing to enable ease of upgrading city/street lights to add 5G/6G active antenna capability.

City Light or Street Light Antenna

1. A system, comprising:
a city light or a street light mounted above a pole, the city light having a housing;
one or more antennas mounted on the housing and in communication with a predetermined target using 5G protocols.

The system may include one or more of the following:

2. A processor can control to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A movable surface can be provided on the housing to steer the antenna. The moveable surface can be liquid lens or actuator array as described above.

12. Cameras and sensors can be positioned to capture security information.

13. Learning machine hardware can provide local processing at the edge.

14. The housing is a drop in replacement for existing city light housing to enable ease of upgrading city/street lights to add 5G/6G active antenna capability.

3G/4G Cell Towers

1. A system, comprising:
   a cell tower with a pole and a top portion to mount 4G antennas and a 5G housing;
   one or more mechanically steerable active antennas mounted on the 5G housing and in communication with a predetermined target using 5G protocols.

The system may include one or more of the following:

2. A processor can control to change the curvature of the surface and/or to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A movable surface can be provided on the housing to steer the antenna. The moveable surface can be liquid lens or actuator array as described above.

12. Cameras and sensors can be positioned to capture security information.

13. Learning machine hardware can provide local processing at the edge.

Actuator-Based Active Antenna Array

1. An antenna, comprising:
   an array of antenna element, each connected to a separate transceiver;
   an array of actuators to point the antenna elements;
   data converters coupled to the transceivers for up conversion and down conversion;
   a baseband unit (BBU) with one or more digital signal processors coupled to the data converters; and
   a broadband connection connecting the baseband unit to a wide area network (WAN).

The system may include one or more of the following:

2. A processor can control to change the curvature of the surface and/or to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH.

Beamforming Actuator Driven Active Antenna to Track Moving UEs

1. A method of communicating data with a UE using an array antenna onboard a cell tower and having a digital beam former (DBF), said array antenna having a plurality of actuators moving the RF radiating elements for providing steerable antenna beams within an antenna footprint region, said DBF providing for each radiating element, beam forming coefficients for controlling characteristics of said steerable antenna beams.
   receiving a signal from the UE within a receive one of said steerable antenna beams;
   determining a location direction of the UE using said signal;
   generating digital beam forming coefficients to provide a transmit one of said steerable antenna beams in said location direction of the UE;
   transmitting data from said cell tower to said UE within said one transmit steerable antenna beam;
   tracking said location direction of said UI as said cell tower and said UE move relative to each other;

adjusting said beam forming coefficients associated with one transmit steerable antenna beam in response to the tracking step to maintain said one transmit steerable antenna beam in the location direction of said UE;

further adjusting said beam forming coefficients associated with one transmit steerable antenna beam to improve a signal quality of communication signal received at said communication station.

The system may include one or more of the following:

2. The antenna arrays can have shape shifting or moving surfaces to directionally aim the antennas.

3. The system remaps the beams to avoid obstructions or issues that affect 5G/6G transmissions. The Beams can also be changed according to load, usage, time of day, or other factors.

4. The processor can calibrate the connection by examining the RSSI and TSSI and scan the antenna actuators or moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH.

Multi-Level 5G/6G Antenna

1. An antenna system, comprising:

A high power active antenna array mounted on a cell tower, balloon, or a drone, the high power active antenna array controlled by a BBU with a broadband connection;

A plurality of medium power active antenna arrays wirelessly coupled to the high power active antenna, wherein the medium power antenna array relays data transmission between the high power active antenna array and a UE to reduce RF exposure on biologics. This reduces cancer risk on users.

The system may include one or more of the following:

2. The antenna arrays can have shape shifting or moving surfaces to directionally aim the antennas.

3. The high power active antenna can have an array of antenna element, each connected to a separate transceiver; an array of actuators to point the antenna elements; data converters coupled to the transceivers for up conversion and down conversion; the baseband unit (BBU) with one or more digital signal processors coupled to the data converters.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors. The learning machine can be used to help steering the antennas to improve connections with UEs. The learning machine can also optimize operation based on data collected from other elements in the transceiver and/or the BBU. The broadband connection can be fiber optic or wireless connection (UWB). The baseband unit can have a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the antennas. The AAS can have passive cooling fins on the housing, or can use evaporative cooling techniques, for example with an enhanced boiling or evaporation microstructure surface including microporous structures; and an electro-deposited surface to enhance a vapor condensation rate, wherein the surface includes a porous medium to replenish condensed liquid back to the microstructure surface by capillary pumping force, wherein the surface is part of an antenna. Since there are many more transceivers/amplifiers in an AAS, each amplifier in an AAS delivers a much lower power when compared to an amplifier in an equivalent RRH.

11. The medium power antenna arrays can be mounted on traffic lights or street lights as replacement lights with 5G relay capacity, and further can provide fast response time for vehicular navigation/control.

12. The medium power antenna arrays can be mounted on car, bus, trucks, drones, local stores, mailboxes. The host for the medium power antenna can collect a usage fee in exchange.

Car/Truck/Van/Bus/Vehicle with 5G Antenna Small Cells

1. A system, comprising:
   a moveable vehicle including a pole and a top portion to mount 4G antennas and a 5G housing, wherein the pole is retractable and extendable during 5G operation;
   one or more antennas mounted on the 5G housing and in communication with a predetermined target using 5G protocols.

The system may include one or more of the following:

2. A processor can control to change the curvature of the surface and/or to change the directionality of the antenna.
3. The processor can calibrate the RF link between the tower and the client device.
4. The processor can calibrate the connection by examining the RSSI and TSSI and scan the moveable lens until the optimal RSSI/TSSI levels (or other cellular parameters) are reached.
5. The scanning of the target client/device can be done by injecting or removing liquid from moveable surface, or can be done by moving actuators coupled to the surface.
6. Opposing pairs of lenses can be formed to provide two-sided communication antennas.
7. An array of actuator/antenna can be used (similar to bee eyes), each antenna is independently steerable to optimize 5G transmission.
8. Fresnel lens can be used to improve SNR.
9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.
10. A learning machine such as neural network or SVM can be used over the control/management plane of the 5G network to optimize 5G parameters based on local behaviors.
11. A movable surface can be provided on the housing to steer the antenna. The moveable surface can be liquid lens or actuator array as described above.
12. Cameras and sensors can be positioned to capture security information.
13. Learning machine hardware can provide local processing at the edge.
14. A frame can be used with an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed.
15. A fleet of drones can operate and navigate as a flock of birds to provide real time adjustment in coverage as needed. The flock of birds antenna has power and autonomous navigation and can self-assemble and scatter as needed to avoid physical and wireless communication obstacles.

Glider/Helicopter/Baloon/Ship/Low Earth Orbit Drone with 5G Antenna

1. A system, comprising:
   an airborne frame to mount 4G antennas and a 5G housing;
   one or more antennas mounted on the 5G housing and in communication with a predetermined target using 5G protocols.

The system may include one or more of the following:

2. A processor can control to change the curvature of the surface and/or to change the directionality of the antenna.
3. The processor can calibrate the RF link between the tower and the client device.
4. The processor can calibrate the connection by examining the RSSI and TSSI and scan the moveable lens until the optimal RSSI/TSSI levels (or other cellular parameters) are reached.
5. The scanning of the target client/device can be done by injecting or removing liquid from moveable surface, or can be done by moving actuators coupled to the surface.
6. Opposing pairs of lenses can be formed to provide two-sided communication antennas.
7. An array of actuator/antenna can be used (similar to bee eyes), each antenna is independently steerable to optimize 5G transmission.
8. Fresnel lens can be used to improve SNR.
9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.
10. A learning machine such as neural network or SVM can be used over the control/management plane of the 5G network to optimize 5G parameters based on local behaviors.
11. A movable surface can be provided on the housing to steer the antenna. The moveable surface can be liquid lens or actuator array as described above.
12. Cameras and sensors can be positioned to capture security information.
13. Learning machine hardware can provide local processing at the edge.
14. The air frame has an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed.
15. A fleet of drones can operate and navigate as a flock of birds to provide real time adjustment in coverage as needed. The flock of birds antenna has power and autonomous navigation and can self-assemble and scatter as needed to avoid physical and wireless communication obstacles.
16. The cars/trucks/buses can carry ads as a monetization system. Alternatively, personal vehicles can be paid a percentage of the traffic relayed by their vehicles.

Cell Phone Antenna

1. A system, comprising:
   a cell phone housing; and
   one or more antennas mounted on the housing, the antenna being selectable to avoid discharging RF energy into a human body and to target RF energy at a predetermined target.

The system may include one or more of the following:

2. A processor can control to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A processor controlled moveable surface can be provided on the tree (such as a leaf, flower, or fruit on the tree), wherein the moveable surface can be liquid lens or actuators that move the surface as detailed above.

12. Cameras and sensors can be positioned to capture security information.

13. Learning machine hardware can provide local processing at the edge.

Cell Phone Body with Movable Antenna

1. A system, comprising:
a cell phone housing having a moveable surface; and
one or more antennas mounted on a moveable surface, wherein the antenna direction is changed by the moveable surface to target RF energy at a predetermined target.

The system may include one or more of the following:

2. A processor can control to change the directionality of the antenna.

3. The processor can calibrate the RF link between the tower and the client device.

4. The processor can calibrate the connection by examining the RSSI and TSSI and scan the moveable lens or actuators until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A processor controlled moveable surface can be provided on the tree (such as a leaf, flower, or fruit on the tree), wherein the moveable surface can be liquid lens or actuators that move the surface as detailed above.

12. Cameras and sensors can be positioned to capture security information.

13. Learning machine hardware can provide local processing at the edge.

Cell Phone Liquid Metal Antenna

1. A system, comprising:
a cell phone housing;
a plurality of channels on the housing; and
one or more liquid antenna movable on the channels to change a frequency or a direction of the antenna to a predetermined target.

The system may include one or more of the following:

2. A processor can control to change the directionality of the antenna.

3. The processor can calibrate the RF link between the tower and the client device.

4. The processor can calibrate the connection by examining the RSSI and TSSI and scan the moveable lens until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A processor controlled moveable surface can be provided on the tree (such as a leaf, flower, or fruit on the tree), wherein the moveable surface can be liquid lens or actuators that move the surface as detailed above.

12. Cameras and sensors can be positioned to capture security information.

13. Learning machine hardware can provide local processing at the edge.

14. The liquid antenna can be a liquid metal such as mercury or non-toxic material.

15. The liquid antenna can be electrically controlled to travel to predetermined channels to change frequency or direction of the antenna.

16. The liquid antenna can be MEMS based.

Cancer Minimization of 5G Cell Phones

1. A system, comprising:
a 5G transceiver spaced apart from a user to minimize 5G radiation directly on the user body; and a display and microphone/speaker coupled to the 5G transceiver which is nearer to the user body than the 5G transceiver.

The system may include one or more of the following:

2. A processor can control to change the directionality of the antenna to reduce RF energy on human body.

3. The processor can calibrate the RF link between the tower and the client device.

4. The processor can calibrate the connection by examining the RSSI and TSSI and scan the antennas until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A processor controlled moveable surface can be provided on the tree (such as a leaf, flower, or fruit on the tree), wherein the moveable surface can be liquid lens or actuators that move the surface as detailed above.

12. Cameras and sensors can be positioned to capture security information.

13. Learning machine hardware can provide local processing at the edge.

14. The 5G transceiver can be part of a portable computer, laptop computer, tablet computer, brief case, or any utensil/appliance that can be away from the body to reduce RF energy on the human body, but still linked to the display and mike/speaker to act as a UI for the user.

15. The user clothing can be electrically conductive to reduce RF energy on the body.

Cancer Minimization of 5G Vehicles

1. A vehicle, comprising:
a 5G transceiver to receive 5G transmission;
a faraday cage isolating the user from the 5G transceiver; and
a display and microphone/speaker in the faraday cage and in communication with the 5G transceiver which is nearer to the user body than the 5G transceiver.

Powering of IOT Devices Using 5G Energy

1. An IOT system, comprising:
a housing having a moveable surface;
one or more antennas mounted on a moveable surface, wherein the antenna direction is changed by the moveable surface to receive RF energy from a small cell;
a capacitor, battery or energy storage device coupled to the antennas to store received energy; and
a power regulator coupled to the capacitor, battery, or energy storage device to power the IOT system.

The system may include one or more of the following:

2. A processor can control to change the directionality of the antenna.

3. The processor can calibrate the RF link between the tower and the client device.

4. The processor can calibrate the connection by examining the RSSI and TSSI and scan the moveable lens or actuators until the optimal RSSI/TSSI levels (or other cellular parameters) are reached.

5. The scanning of the target client/device can be done by injecting or removing liquid from moveable surface, or can be done by moving actuators coupled to the surface.

6. Opposing pairs of lenses can be formed to provide two-sided communication antennas.

7. An array of actuator/antenna can be used (similar to bee eyes), each antenna is independently steerable to optimize 5G transmission.

8. Fresnel lens can be used to improve SNR.

9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

10. A learning machine such as neural network or SVM can be used over the control/management plane of the 5G network to optimize 5G parameters based on local behaviors.

11. A processor controlled moveable surface can be provided on the tree (such as a leaf, flower, or fruit on the tree), wherein the moveable surface can be liquid lens or actuators that move the surface as detailed above.

12. Cameras and sensors can be positioned to capture security information.

13. Learning machine hardware can provide local processing at the edge.

Antenna with Evaporative Cooling for 5G Power Amplifiers

1. A heat spreader to cool a heated region of a device, comprising:
an enhanced boiling or evaporation microstructure surface including microporous structures; and
an electro-deposited surface to enhance a vapor condensation rate, wherein the surface includes a porous medium to replenish condensed liquid back to the microstructure surface by capillary pumping force, wherein the surface is part of an antenna.

2. The heat spreader, wherein each surface comprises a plate.

3. The heat spreader, wherein the electro-deposited surfaces utilize boiling (evaporation), condensation, and capillary pumping action.

4. The heat spreader, wherein liquid is vaporized or boiled from the electro-deposited surface designed for boiling (evaporation) enhancement.

5. The heat spreader, wherein vapor is condensed at the enhanced surface for condensation.

6. The heat spreader, wherein the enhanced surface for condensation is formed by electro-deposition.

7. The heat spreader, wherein condensed liquid is supplied back to the heated region by another electro-deposited surface aimed for capillary pumping action.

8. The heat spreader, comprising one or more structures are mounted on at least one of the opposing surfaces.

9. The heat spreader, wherein the first and second opposing surfaces are separated by a small gap.

10. The heat spreader, wherein the first and second opposing surface have a first separation distance above a predetermined region on device and a second separation distance surrounding the predetermined region and wherein the second separation distance is larger than the first separation distance.

11. A method to cool an electronic device, comprising:
forming an enhanced boiling or evaporation surface including microporous structures;
forming an electro-deposited surface to improve a condensation rate of vapor, wherein the surface includes a porous medium to replenish condensed liquid back to the first surface by capillary pumping force; and
communicating radio signal using the other side of the condensation surface.

12. The method, comprising improving a heat transfer coefficient in a low-profile vapor chamber using wick structures having projections formed by electrodepositing a metal on the target surfaces at a first current density followed by strengthening at one or more second current densities lower than the first current density.

13. The method, comprising forming projections with nucleate boiling cavities on the surface from local heating source, increased capillary pumping action of the wick structure, and augmented condensation rate of vapors.

14. The method, comprising cooling the electronic device using a combination of nucleate boiling (evaporation), capillary pumping action, and condensation.

15. The method, comprising forming a two-phase cooling chamber with integrated electro-deposited surfaces that utilize boiling (evaporation), condensation, and capillary pumping action.

16. The method, comprising
a. vaporizing a liquid into a vapor from a heated region thermally coupled to a first electro-deposited surface designed for boiling (evaporation) enhancement;
b. condensing the vapor at an enhanced surface for condensation by a second electro-deposited surface;
c. returning the condensed liquid to the heated region through capillary pumping action by the second electro-deposited surface.

17. The method, comprising enclosing both surfaces in a thin circular, square, or rectangular housing for heat spreading.

18. The method, comprising forming one or more supporting structures on one surface to provide mechanical strength that prevents bending of the surface and structure built thereon.

19. The method, comprising promoting a streamlined flow pattern induced by nucleate boiling with a predetermined structure shape.

20. A two-phase cooling chamber to cool a heated region, comprising:
an enhanced boiling or evaporation microstructure surface including microporous structures; and
an electro-deposited surface to enhance a vapor condensation rate, wherein the surface includes a porous medium to replenish condensed liquid back to the microstructure surface by capillary pumping force, wherein the electro-deposited surfaces utilize boiling or evaporation, condensation, and capillary pumping action.

21. The chamber, wherein liquid is vaporized or boiled from the electro-deposited surface designed for boiling or evaporation enhancement, then the vapor will be condensed at the enhanced surface for condensation and wherein the condensed liquid is supplied back to the heated region by an electro-deposited surface aimed for capillary pumping action.

Low Orbit Drone with Active Antennas
1. A system, comprising:
an airborne frame to mount 4G antennas and a 5G housing;
a variable buoyancy propulsion with a combination of a lighter than air chamber and a compressed gas chamber to propel the airborne frame; and
one or more antennas mounted on the 5G housing and in communication with a predetermined target using 5G protocols.

The system may include one or more of the following:
2. A processor can control to change the curvature of the surface and/or to change the directionality of the antenna.
3. The processor can calibrate the RF link between the tower and the client device.
4. The processor can calibrate the connection by examining the RSSI and TSSI and scan the moveable lens until the optimal RSSI/TSSI levels (or other cellular parameters) are reached.
5. The scanning of the target client/device can be done by injecting or removing liquid from moveable surface, or can be done by moving actuators coupled to the surface.
6. Opposing pairs of lenses can be formed to provide two-sided communication antennas.
7. An array of actuator/antenna can be used (similar to bee eyes), each antenna is independently steerable to optimize 5G transmission.
8. Fresnel lens can be used to improve SNR.
9. The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.
10. A learning machine such as neural network or SVM can be used over the control/management plane of the 5G network to optimize 5G parameters based on local behaviors.
11. A movable surface can be provided on the housing to steer the antenna. The moveable surface can be liquid lens or actuator array as described above.
12. Cameras and sensors can be positioned to capture security information.
13. Learning machine hardware can provide local processing at the edge.
14. The air frame has an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed.
15. A fleet of drones can operate and navigate as a flock of birds to provide real time adjustment in coverage as needed. The flock of birds antenna has power and autonomous navigation and can self-assemble and scatter as needed to avoid physical and wireless communication obstacles.
16. A refueling drone can be used to supply the GBS with power by swap battery with the GBS or refueling the hydrogen fuel cells, where the refueling drone designed for boom-type transfers in which a boom controller extends and maneuvers a boom to establish a connection to transfer hydrogen fuel from the refueling drone to the refueling drone. Prior to refueling, the refueling drone extends a refueling probe.

17. The refueling drone includes a navigation system that may be used for positioning the refueling drone during aerial refueling. The GBS navigation system provides inertial and Global Positioning System (GPS) measurement data to the refueling drone via a data link. Relative positioning can be used to navigate both crafts.

Hydrogen Refueling Drone

1. A refueling drone to refuel a target vehicle, comprising:
  a moving body including a hydrogen tank at a high pressure;
  sensors to determine current positions of the refueling drone and the target vehicle;
  sensors on the drone and target vehicle to determine hydrogen fuel parameters;
  navigation processor to control the moving body to a predetermined distance near the target vehicle;
  a probe extending from the moving body to a refill receptacle on the target vehicle, wherein the processor extends the probe from the moving body to enter the target vehicle receptacle at a lower pressure; and
  a valve opened to release hydrogen from the hydrogen tank to a fuel container in the target vehicle at a lower pressure than the high pressure at the hydrogen tank.

2. The probe can be guided by image processing techniques or by radar sensors to reach the refill receptacle.

3. Processors on the refueling drone and target vehicle cooperate so both vehicles keep a relative distance vector between them.

4. The refueling drone can be for an air drone, ground drone, or ship drone.

5. A plurality of target vehicles can be refueled at once, where the target vehicles and the refueling drone operate as a flock of birds, where the refueling drone is the master bird that the drones that need resupply follow as a flock of birds.

6. The hydrogen tank can be composite tank that is light weight, yet strong to prevent hydrogen explosion.

BRIEF DESCRIPTION OF THE DRAWINGS

FIGS. 3A-3B show an exemplary antenna element.

FIG. 4A shows an exemplary array of antennas.

FIGS. 7A-7D and FIG. 8 show exemplary learning machine processes and architectures.

DESCRIPTION

Figure 1A:
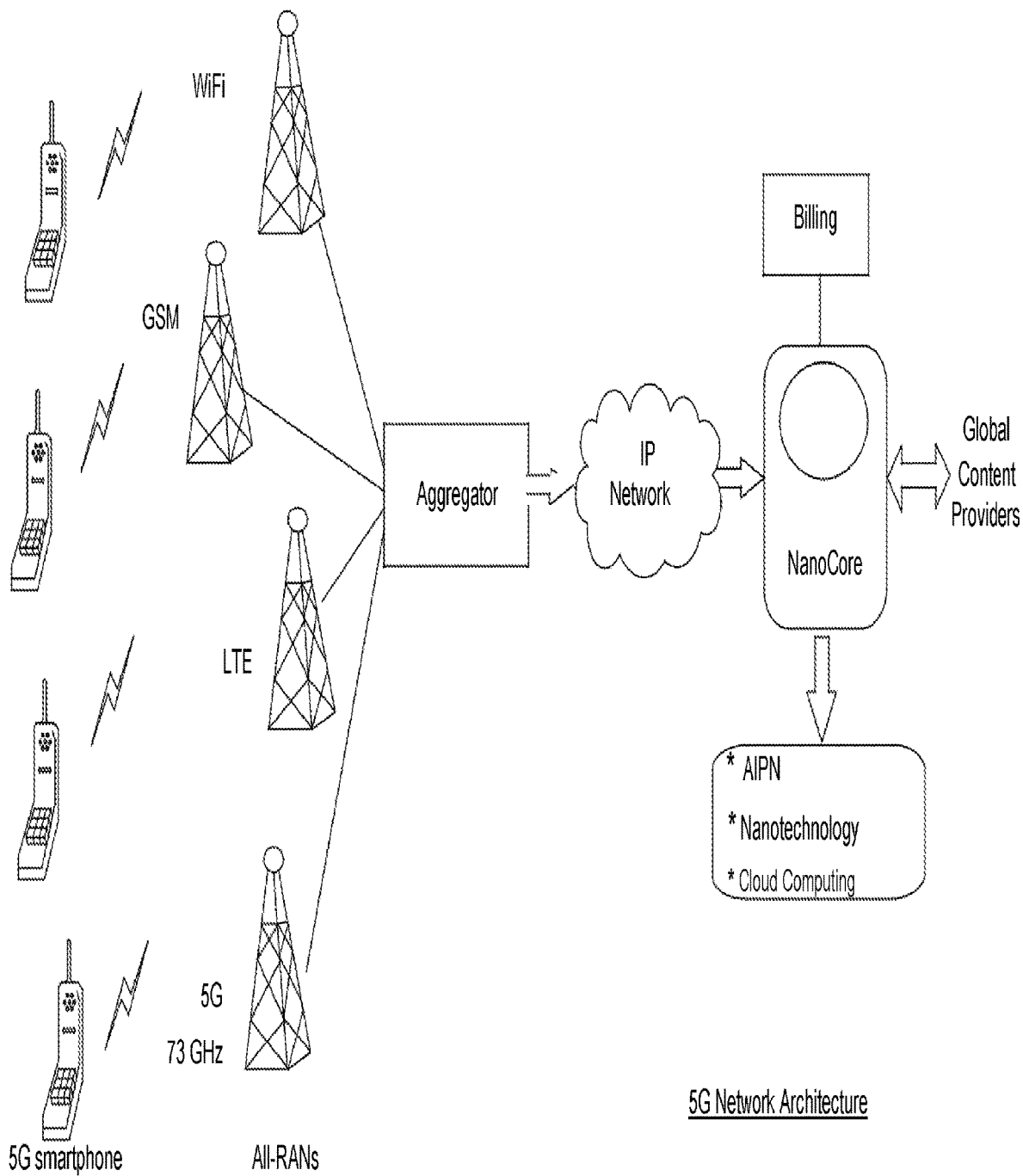
FIGS. 1A-1G show an exemplary 5G network architecture and exemplary 5G mobile devices.
Figure 1B:
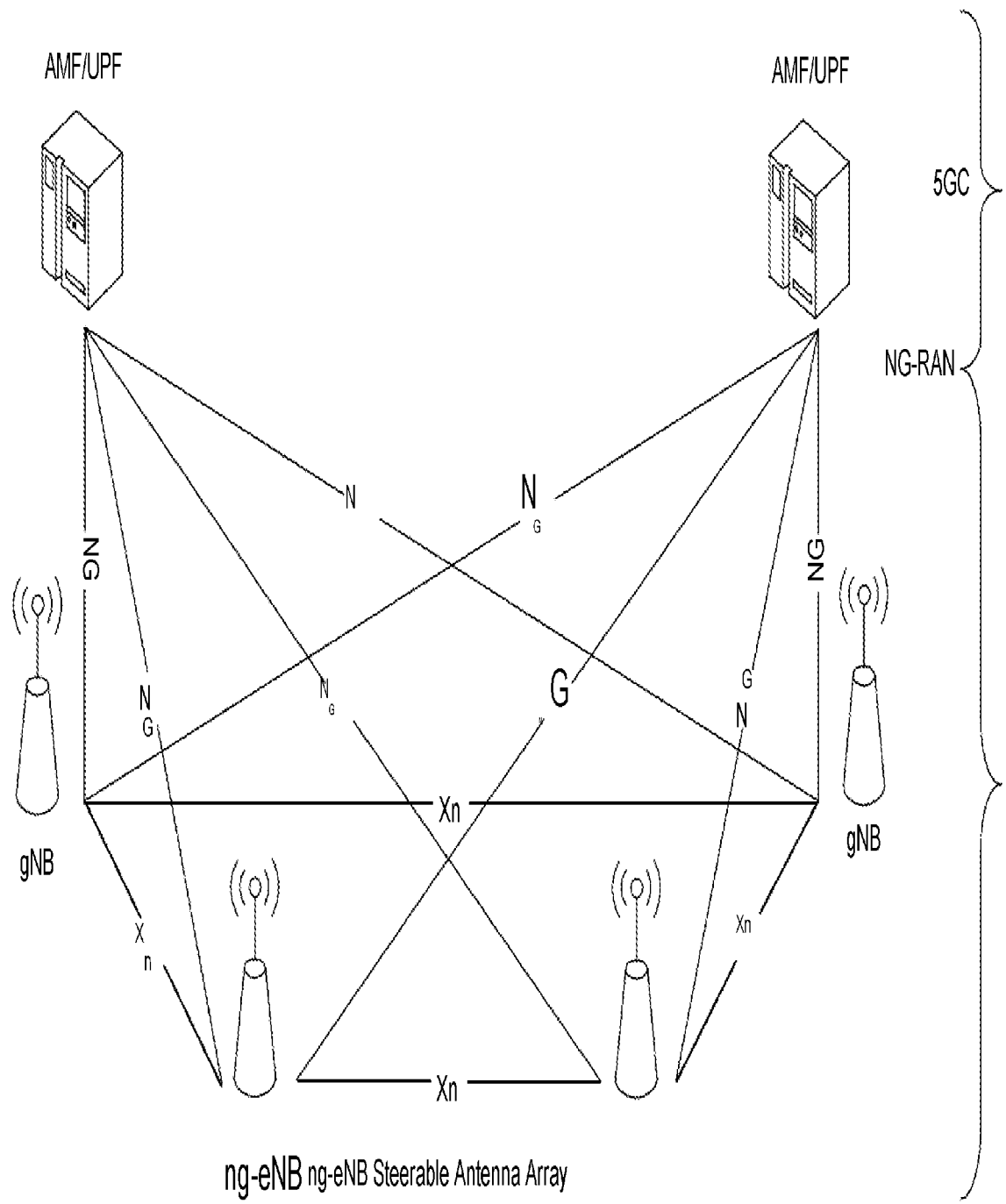
Figure 1C:
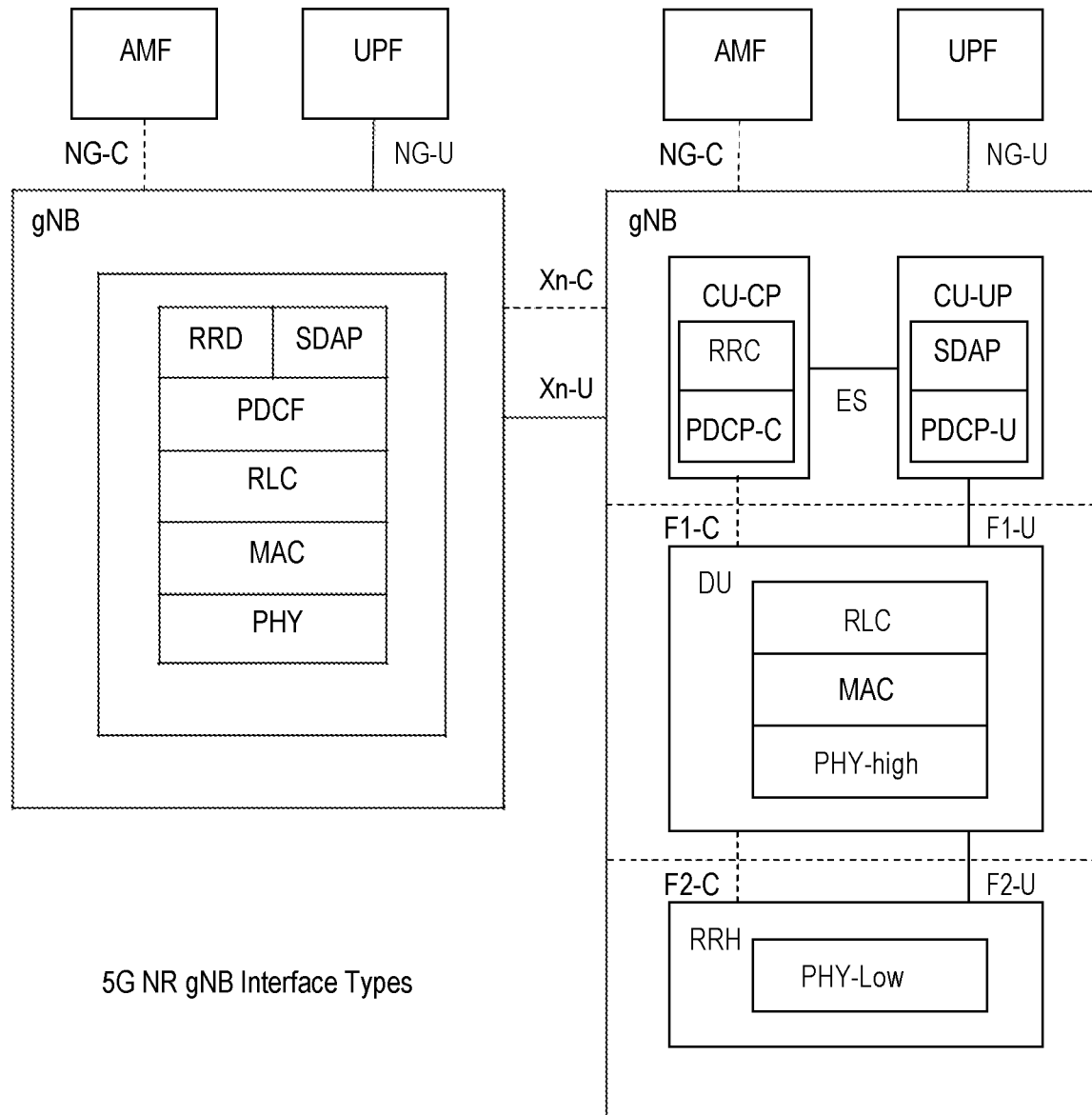
Figure 1D:
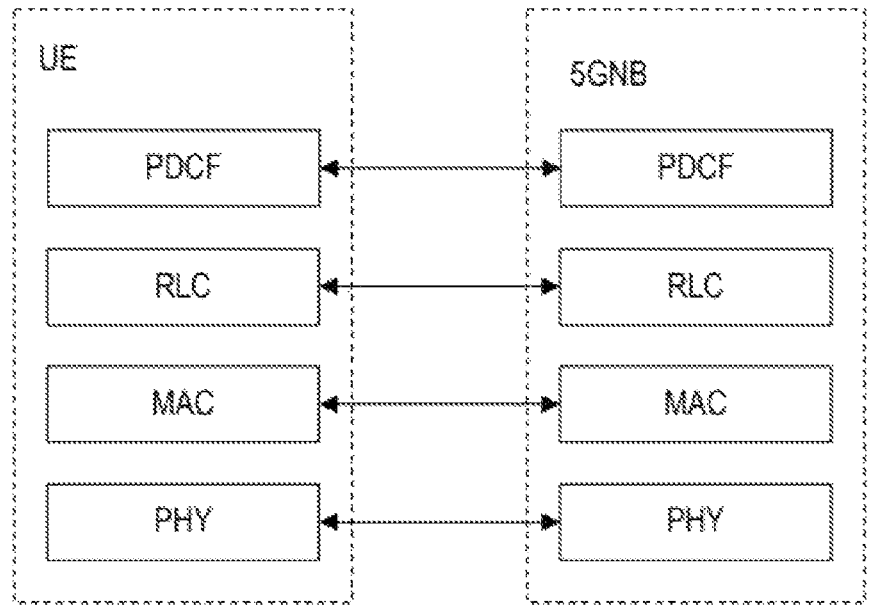
Figure 1D:
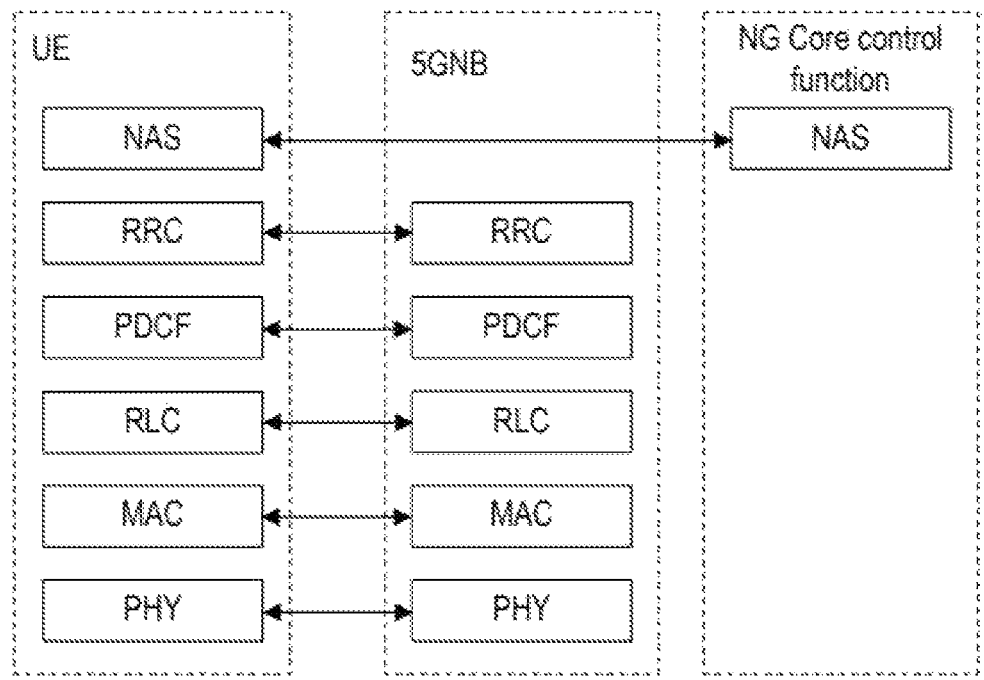

FIGS. 1A-1D shows an exemplary 5G network architecture. A plurality of phones running 2G, 3G, 4G and 5G communication with wireless RANs. The radio access network (RAN) has been in use since the beginning of cellular technology and has evolved through the generations of mobile communications (1G, 2G, 3G, 4G, and in anticipation of the forthcoming 5G). Components of the RAN include a base station and antennas that cover a given region depending on their capacity. In a RAN, radio sites provide radio access and coordinate management of resources across the radio sites. A device is wirelessly connected to the core network, and the RAN transmits its signal to various wireless endpoints, and the signal travels with other networks' traffic. Two types of radio access networks are Generic Radio Access Network (GRAN), which uses base transmission stations and controllers to manage radio links for circuit-switched and packet-switched core networks; and GSM Edge Radio Access Network (GERAN), which supports real-time packet data. Two other types of radio access networks are UMTS Terrestrial Radio Access Network (UTRAN), which supports both circuit-switched and packet-switched services; and Evolved Universal Terrestrial Radio Access Network (E-UTRAN), which focuses only on packet-switched services. E-UTRAN also provides high data rates and low latency. The RAN's controller controls the nodes that are connected to it. The network controller performs radio resource management, mobility management, and data encryption. It connects to the circuit-switched core network and the packet-switched core network, depending on the type of RAN. The RAN architectures separate the user plane from the control plane into different network elements. In this scenario, the RAN controller can exchange user data messages through one software-defined networking (SDN) switch, and a second set with base stations via a second control-based interface. This separation of the control plane and data plane will be an essential aspect of the flexible 5G radio access network, as it aligns with SDN and network functions virtualization (NFV) techniques such as service chaining and network slicing.

In one implementation of one or more gNBs and one or more UEs in which systems and methods for supporting ultra-reliable low-latency communication (URLLC) service and associated numerologies in fifth generation (5G) New Radio (NR) may be implemented. The one or more UEs communicate with one or more gNBs using one or more physical antennas. For example, a UE transmits electromagnetic signals to the gNB and receives electromagnetic signals from the gNB using the one or more physical antennas. The gNB communicates with the UE using one or more physical antennas.

The UE and the gNB may use one or more channels and/or one or more signals to communicate with each other. For example, the UE may transmit information or data to the gNB using one or more uplink channels. Examples of uplink channels include a physical shared channel (e.g., PUSCH (Physical Uplink Shared Channel)), and/or a physical control channel (e.g., PUCCH (Physical Uplink Control Channel)), etc. The one or more gNBs may also transmit information or data to the one or more UEs using one or more downlink channels, for instance. Examples of downlink channels physical shared channel (e.g., PDCCH (Physical Downlink Shared Channel), and/or a physical control channel (PDCCH (Physical Downlink Control Channel)), etc. Other kinds of channels and/or signals may be used.

Each of the one or more UEs may include one or more transceivers, one or more demodulators, one or more decoders, one or more encoders, one or more modulators, a data buffer and a UE operations module. For example, one or more reception and/or transmission paths may be implemented in the UE. The transceiver may include one or more receivers and one or more transmitters. The one or more receivers may receive signals from the gNB using one or more antennas. For example, the receiver 120 may receive and downconvert signals to produce one or more received signals. The one or more received signals may be provided to a demodulator. The one or more transmitters may transmit signals to the gNB using one or more physical antennas. For example, the one or more transmitters may upconvert and transmit one or more modulated signals.

The demodulator may demodulate the one or more received signals to produce one or more demodulated signals. The one or more demodulated signals may be provided to the decoder. The UE may use the decoder to decode signals. The decoder may produce decoded signals, which may include a UE-decoded signal (also referred to as a first UE-decoded signal). For example, the first UE-decoded signal may comprise received payload data, which may be stored in a data buffer. Another signal included in the decoded signals (also referred to as a second UE-decoded signal) may comprise overhead data and/or control data. For example, the second UE-decoded signal may provide data that may be used by the UE operations module to perform one or more operations. In general, the UE operations module may enable the UE to communicate with the one or more gNBs. The UE operations module may include one or more of a UE URLLC module. With regard to NR, some considerations with SR include traffic characteristics, logical channel/logical channel group, the amount of data available, information related to numerology and/or Transmission Time Interval (TTI) duration, and the priority of data.

Short latency in NR may be important to support services like URLLC. This may impact the design of the SR. The design of the SR in a multi-numerology/TTI duration configuration also influences the latency. With regard to NR, some considerations for SR latency and periodicity include: major design changes related to SR latency and periodicity compared to LTE; what is the impact from the NR latency requirements; what is the impact from a multiple numerology/TTI duration configuration; and what is the impact from other functions designed to reduce latency (e.g., grant-free transmissions and Semi-Persistent Scheduling (SPS)).

The function of the Buffer Status Report (BSR) in LTE is for the UE to report the amount of available data in the UE to the eNB. The eNB can then use this information to set the size of the UL grant. Logical channels are grouped together in logical channel groups (LCGs). A BSR is triggered if data becomes available in an LCG and all other LCGs have no data, or if data belonging to a logical channel with a higher priority than all other LCGs becomes available, or if there is room in the MAC Protocol Data Unit (PDU) to send a BSR instead of padding. There may be two timers which upon expiry trigger BSR. A BSR contains information on the amount of data available per logical channel group. The BSR is carried as a MAC control element (CE) in a MAC PDU. Like the SR, the design of the BSR for NR may be impacted by the multi-numerology/TTI duration configuration supported in NR. The systems and methods described herein provide mechanisms for BSR for NR. Uplink scheduling is a key functionality to meet a broad range of use cases including enhanced mobile broadband, massive MTC, critical MTC, and additional requirements. Buffer Status Reports (BSRs) on the other hand carry more detailed information compared to SR. A BSR indicates buffer size for each LCG. However, the BSR requires a grant for transmission so it may take a longer time until the gNB receives it since it may need to be preceded by an SR. The framework with SR/BSR from LTE may be improved. In an approach, the SR/BSR scheme from LTE can be reused in NR as a baseline. NR should support a wide spread of use cases which have different requirements. In some use cases (e.g., critical MTC and URLLC), NR has tighter latency requirements than has been considered for LTE so far. Also, services such as eMBB can enjoy the enhancements to SR and BSR. In NR, modifications of SR/BSR aim to report the UE buffer status (e.g., priority and the buffer size) as well as wanted numerology/TTI duration within the given time constraints. It is assumed that a mapping of logical channel (LCH) to LCG to numerology/TTI duration will make it possible to infer which numerology/TTI duration to use given the LCG. Hence no explicit signaling of numerology/TTI duration is needed in the SR/BSR if an LCG (or LCH) is present in the SR/BSR. Considering the limitations identified above, it is possible to either enhance SR with more information bits to indicate more information or enhance BSR.

URLLC provides 1 ms end-to-end radio link latency and guaranteed minimum reliability of 99.999%, which are crucial for some URLLC use cases. Some URLLC uses cases are described herein and how they map to requirements at a high level. A URLLC terminal (e.g., UE) will get a benefit from packet duplication. Radio Link Control (RLC) retransmission (ARQ) is not assumed to be used for meeting the strict user plane latency requirements of URLLC. A URLLC device MAC entity may be supported by more than one numerology/TTI durations. The NR design aims to meet the URLLC QoS requirements only after the control plane signaling for session setup has completed (to eliminate the case that the UE is initially in idle). Discontinuous reception (DRX) design will not optimize for URLLC service requirements. For DL, dynamic resource sharing between URLLC and eMBB is supported by transmitting URLLC scheduled traffic. URLLC transmission may occur in resources scheduled for ongoing eMBB traffic. Asynchronous and adaptive HARQ is supported for URLLC DL. At least an UL transmission scheme without grant is supported for URLLC. Resources may or may not be shared among one or more users.

In an implementation, mini-slots have the following lengths. At least above 6 GHz, mini-slot with length 1 symbol supported. Lengths from 2 to slot length −1 may be supported. It should be noted that some UEs 102 targeting certain use cases may not support all mini-slot lengths and all starting positions. Mini-slots can start at any OFDM symbol, at least above 6 GHz. A mini-slot may contain Demodulation RS(s) (DM-RS) at position(s) relative to the start of the mini-slot.

A wide range of URLLC use cases may be supported by NR. 5G aims to support a broad range of use cases (or services) and enable ground-breaking performance of the URLLC devices (e.g., robots, smart cars, etc.). Some URLLC applications are discussed herein.

One URLLC use case is robotics. 5G needs to improve the response time for diagnostic situations. For instance, in the near future, robots will be very low-cost, since robots will only carry around a set of sensors, cameras, actuators and mobility control units. All the intelligent computation system, requiring expensive hardware, may be remotely run on an edge cloud.

The sensors and cameras on the robots may be used to monitor the environment and capture the data in real time. The captured data will be immediately transmitted to a central system in a few milliseconds. The center processes the data in an intelligent way (e.g., based on machine learning and AI (artificial intelligent) algorithms) and makes decisions for the robots. The decision/commands may be delivered to the robot very quickly and the robots will follow the instructions.

The targeted maximum round trip time for this kind of robotic scenario is 1ms. This may include starting with capturing data, transmitting the data to the center, progressing data on the center and sending the command to the robot, and running the received command.

Another URLLC use case is industrial automation. Industrial automation (together with MTC) is one of the key applications that are considered within 5G systems. Current industrial control systems rely on fast and reliable wired links. However, there exists a large interest in utilizing flexible wireless systems provided by 5G in the future.

This use case considers a combined indoor factory environment, where a number of objects (e.g., robots, self-driving heavy machines, etc.) perform various dedicated tasks as parts of a production process. All these objects are controlled by a production center. These kinds of industrial applications require a guaranteed reliability, higher data rate and minimum end-to-end latency within various control processes.

Another URLLC use case is remote surgery and health care. Remote surgery can be considered as another 5G URLLC use case. With a sense of touch, 5G can enable a surgeon to diagnose (e.g., identify cancerous tissue) where the specialist and the patient physically are not able to be present in the same room/environment.

In this 5G medical use case, there may be a robotic end which in real time will provide the sense of touch to the surgeon during a minimally invasive surgery. The sense of touch will be captured at the robotic end and, with a latency of few milliseconds, the sensed data will be reflected to the surgeon who is at the other end and wears haptic gloves. On top of that, the surgeon needs to be able to remotely control the robotic end as well in a visualized environment. In the remote surgery scenario, the e2e latency is ideally in the order of several milliseconds.

Another URLLC use case is interactive augmented-virtual reality. A high-resolution augmented-virtual reality system is an efficient way to display a real or manipulated environment in three-dimensions for educational purposes, for instance. In one scenario, a number of trainees are connected in a virtualized real environment/system simulator, where the trainees are able to jointly/collaboratively interact with each other by perceiving the same environment and the same artificial subjects and objects. Since the scenario requires interaction between the trainees in real time, the targeted round-trip time from trainee to the simulator and from simulator back to the trainee should be in the order of milliseconds and not exceed human perception time.

Another URLLC use case is smart vehicles, transport and infrastructure. Self-Driving vehicles can be interpreted as automated driving where vehicle-to-infrastructure (e.g., smart bus stop, smart traffic lights, etc.) and vehicle-to-vehicle real-time communication is required. All these communications can be coordinated in real time by a centralized system (e.g., Intelligent Traffic Management Center (ITMC)).

In such a scenario, the ITMC aims to estimate hazardous conditions well in advance and decrease the risk of traffic accidents. As an example, as an intelligent system, the ITMC can monitor attributes of the objects in the traffic based on the object's received data. By doing that, fatal situations will be anticipated and the system will interact directly (e.g., steer vehicles) even before the drivers to prevent accidents. In this kind of traffic scenario, round-trip latencies from vehicles to ITMC and ITMC to the vehicles in the order of milliseconds will increase the traffic safety.

Another URLLC use case is drones and aircraft communication. Drones are getting increasingly important, especially in the surveillance, public safety and media domain. All of these domains come under the critical communication with strict requirements on latency and reliability. The motivation for such requirements varies from mission criticality to monetary benefits (e.g., coverage of sports events using drones leading to in-demand content with high copyrights cost).

Latency and reliability are key factors to control the drones given the nature of use cases considered. Similarly, aircraft communication is also being considered using NR which also demands the highest standard of reliability and strict latency requirements. The long distances and mobility aspects together with latency and reliability requirements present challenges in this use case.

As observed by these use cases, in some URLLC scenarios, mobility is a key requirement together with latency and reliability. A core need of each URLLC use case is reliability and latency and these needs should have precedence over resource efficiency due to criticality of the scenarios.

Both International Telecommunication Union (ITU) and 3GPP have defined a set of requirements for 5G, including URLLC. For URLLC reliability, the requirement is the same, whereas for URLLC latency, 3GPP places a stricter requirement of 0.5 ms one-way end-to-end latency in UL and DL, compared to 1ms in ITU.

3GPP has agreed on the following relevant requirements. Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge). A general URLLC reliability requirement for one transmission of a packet is 1-105 for 32 bytes with a user plane latency of 1ms.

User plane (UP) latency can be described as the time it takes to successfully deliver an application layer packet/message from the radio protocol layer 2/3 SDU ingress point to the radio protocol layer 2/3 SDU egress point via the radio interface in both uplink and downlink directions, where neither device nor base station reception is restricted by DRX. For URLLC, the target for user plane latency should be 0.5 ms for UL, and 0.5 ms for DL. Furthermore, if possible, the latency should also be low enough to support the use of the next generation access technologies as a wireless transport technology that can be used within the next generation access architecture. The value above should be considered an average value and does not have an associated high reliability requirement.

According to IMT 2020, LTE Rel-15 should be able to separately fulfill low latency and reliability requirements. Low latency may be defined as the one-way time it takes to successfully deliver an application layer packet/message from the radio protocol layer 2/3 SDU ingress point to the radio protocol layer 2/3 SDU egress point of the radio interface in either uplink or downlink in the network for a given service in unloaded conditions, assuming the mobile station is in the active state. In IMT 2020, the minimum requirements for user plane latency is 1 ms for URLLC.

Reliability may be defined as the success probability of transmitting a layer 2/3 packet within a required maximum time, which is the time it takes to deliver a small data packet from the radio protocol layer 2/3 SDU ingress point to the radio protocol layer 2/3 SDU egress point of the radio interface at a certain channel quality (e.g., coverage-edge). This requirement is defined for the purpose of evaluation in the related URLLC test environment.

The minimum requirement for the reliability is 1-10-5 success probability of transmitting a data packet of size (e.g., 20 bytes) bytes within 1 ms in channel quality of coverage edge for the Urban macro-URLLC test environment.

Apart from the ITU and 3GPP requirements, there are other interesting combinations of latency and reliability that may apply to future use cases. One such case is a wide-area scenario with a more relaxed latency but with high reliability. Therefore, we argue that a network should be able to configure a wide range of latency-reliability settings. To enable this, several different technological components may be considered for URLLC. Therefore, URLLC may fulfil IMT 2020 requirements and also a wider range of requirements relevant for future use cases.

As mentioned above, a wide range of performance requirements calls for a set of tools for the network to apply according to use case and scenario. At the physical layer, this can include enhanced coding, diversity, repetitions, and extra robust control and feedback. At higher layers, the focus is fast and reliable scheduling, data duplication, and mobility robustness.

Diversity is a key to achieve high reliability. Whereas one single transmission (including control message) can be robust (e.g., low BLER), it requires a very low code rate and therefore wide allocations to reach the target. With diversity, the transmission is spread out in time, space, and frequency, exploiting variations in the channel to maximize the signal.

In time domain, at least two main options may be employed. One option is that the transmission is extended over more OFDM symbols and thereby the code rate is reduced. Alternatively, the transmission is repeated. A repetition can be automatic (bundled transmissions), or a retransmission triggered by feedback.

In frequency domain, the transmission of control and data may be repeated on multiple carriers to exploit frequency diversity of the channel. Frequency repetition of data can be done on lower layers (e.g., MAC) or in higher layers (e.g., PDCP). Another possibility for achieving frequency diversity is to spread out parts of the transmissions over a wider bandwidth.

For UL transmissions, the basic access may be based on a scheduling request (SR). The SR may be followed by an UL grant, and only after receiving this grant can the UE transmit UL data. The two first transmissions (SR and grant) cause an extra delay, which may be an issue for delay sensitive traffic. Latency reduction is a feature in LTE-14 to scale down the minimum schedulable time unit so that the absolute time duration of the first two transmissions is scaled down proportionally. Similar principles can be applied to 5G with tools such as higher numerology. This, in principle, can satisfy the latency requirements and allow several HARQ retransmissions round-trip-time that further enhance the reliability. However, with higher numerology, it poses challenges to support wide-area deployment with power-limited UEs 102 and requires a larger bandwidth. Last but not the least, additional works to enhance reliability for SR and UL grant are required.

As an alternative, the UL grant can be configured (e.g., like SPS UL) with skip padding in LTE. This may be referred to as "Fast UL." With Fast UL, the UE has a configured UL grant that it may use when it has UL data. In this setup, the UL latency is similar to that of DL, making it an important enhancement for URLLC.

Given the large BW allocations expected for URLLC UL traffic, a configured grant where the gNB 160 pre-allocates a part of the band to a UE can lead to UL capacity problems. This leads to even larger resource waste if the URLLC UL traffic is less frequent and sporadic. This issue can be solved if the same time-frequency resource can be given to multiple UEs 102.

Collisions may occur in contention-based access. To satisfy the strict URLLC requirements, resolutions must be resolved in a reliable way and remedial solutions may be in place in the event of the collisions. As a baseline, reliable UE identification should be available for contention-based access in the case of collided transmissions. After detecting the collision, fast switching to grant-based resources should be available. In addition, automatic repetitions with a pre-defined hopping pattern can reduce requirements on collision probability and UE identification detection.

The requirement on latency and reliability is not only for static UEs 102, but also for UEs 102 with different mobility levels for different use cases.

Increased robustness can be achieved at higher layers by transmitting duplicates of the data in either the spatial domain (e.g., Dual Connectivity), frequency domain (e.g., Carrier Aggregation), or in time domain with MAC/RLC layer duplication. Optionally, without duplication, better reception quality can be achieved by properly selecting between a set of available connecting links (e.g., Multiple Connectivity).

In another aspect, a buffer status reporting (BSR) procedure may be used to provide the serving eNB 160 with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signaling logical Channel Group, which allocates the logical channel to a Logical Channel Group (LCG).

For the Buffer Status reporting procedure, the MAC entity may consider radio bearers that are not suspended and may consider radio bearers that are suspended. For narrowband Internet of Things (NB-IoT), the Long BSR is not supported and all logical channels belong to one LCG.

A (BSR) may be triggered if any of the following events occur. A BSR may be triggered if UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. In this case, the BSR may be referred to as a "Regular BSR."

A BSR may also be triggered if UL resources are allocated and the number of padding bits is equal to or larger than the size of the BSR MAC control element plus its sub header. In this case, the BSR may be referred to as a "Padding BSR."

A BSR may also be triggered if the retxBSR-Timer expires and the MAC entity has data available for transmission for any of the logical channels which belong to a LCG. In this case, the BSR may be referred to as a "Regular BSR."

A BSR may also be triggered if a periodicBSR-Timer expires. In this case, the BSR may be referred to as a "Periodic BSR."

For a Regular BSR, if the BSR is triggered due to data becoming available for transmission for a logical channel for which logicalChannelSR-ProhibitTimer is configured by upper layers, a UE may start or restart the logicalChannelSR-ProhibitTimer. Otherwise, if running, the UE may stop the logicalChannelSR-ProhibitTimer.

For Regular and Periodic BSR, if more than one LCG has data available for transmission in the TTI where the BSR is transmitted, the UE may report a Long BSR. Otherwise, the UE may report a Short BSR.

For a Padding BSR, if the number of padding bits is equal to or larger than the size of the Short BSR plus its sub header but smaller than the size of the Long BSR plus its sub header and if more than one LCG has data available for transmission in the TTI where the BSR is transmitted, the UE may report a truncated BSR of the LCG with the highest priority logical channel with data available for transmission. Otherwise, the UE may report a Short BSR. If the number of padding bits is equal to or larger than the size of the Long BSR plus its subheader, the UE may report a long BSR.

If the BSR procedure determines that at least one BSR has been triggered and not cancelled and if the MAC entity has UL resources allocated for new transmission for this TTI, then the UE may instruct the Multiplexing and Assembly procedure to generate the BSR MAC control element(s). The UE may start or restart the periodicBSR-Timer except when all the generated BSRs are Truncated BSRs. The UE may start or restart a retxBSR-Timer.

If a Regular BSR has been triggered and logicalChannelSR-ProhibitTimer is not running, and if an uplink grant is not configured or the Regular BSR was not triggered due to data becoming available for transmission for a logical channel for which logical channel SR masking (logicalChannelSR-Mask) is setup by upper layers, then a Scheduling Request may be triggered.

A MAC PDU may contain at most one MAC BSR control element, even when multiple events trigger a BSR by the time a BSR can be transmitted in which case the Regular BSR and the Periodic BSR have precedence over the padding BSR. The MAC entity shall restart retxBSR-Timer upon indication of a grant for transmission of new data on any UL-SCH.

All triggered BSRs may be cancelled in case the UL grant(s) in this TTI can accommodate all pending data available for transmission but is not sufficient to additionally accommodate the BSR MAC control element plus its subheader. All triggered BSRs may be cancelled when a BSR is included in a MAC PDU for transmission.

The MAC entity may transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI may reflect the buffer status after all MAC PDUs have been built for this TTI. Each LCG may report at the most one buffer status value per TTI and this value may be reported in all BSRs reporting buffer status for this LCG.

It should be noted that padding BSR is not allowed to cancel a triggered Regular/Periodic BSR, except for NB-IoT. A Padding BSR is triggered for a specific MAC PDU only and the trigger may be cancelled when this MAC PDU has been built.

A MAC PDU is a bit string that is byte aligned (i.e., multiple of 8 bits) in length. As described herein, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte-aligned (i.e., multiple of 8 bits) in length. An SDU is included into a MAC PDU from the first bit onward. The MAC entity may ignore the value of Reserved bits in downlink MAC PDUs.

A MAC PDU includes a MAC header, zero or more MAC Service Data Units (MAC SDU), zero, or more MAC control elements, and optionally padding, as illustrated in FIG. 4. Both the MAC header and the MAC SDUs may be of variable sizes. A MAC PDU header may include one or more MAC PDU subheaders. Each subheader may correspond to either a MAC SDU, a MAC control element or padding. Examples of MAC PDU subheaders are described in connection with FIG. 5.

A MAC PDU subheader may include the five or six header fields R/F2/E/LCID/(F)/L but for the last subheader in the MAC PDU and for fixed sized MAC control elements. The last subheader in the MAC PDU and subheaders for fixed sized MAC control elements may include the four header fields R/F2/E/LCID. A MAC PDU subheader corresponding to padding includes the four header fields R/F2/E/LCID.

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per Transport Block (TB) per MAC entity. A maximum of one MCH MAC PDU can be transmitted per TTI.

In the system of FIG. 1A-1D, multiple-input, multiple-output antenna systems coordinate two or four antennas at a time to simultaneously send data over the same radio channel, increasing data speeds. A phone might have a 4×2 MIMO system with 4 receiving (downloading) antennas and 2 transmitting (uploading) antennas, with up to an 8×8 array for 5G. To address multiple customers at once, new cell towers will include "massive" 128-antenna arrays with 64 receiving and 64 transmitting antennas. In one embodiment, each antenna of the phone and the cell tower is individually steerable. The steering can be done using individual motor/actuator, or can be done as a small group of 2×2 antennas on the cell tower that communicate with a particular phone. A group of antennas can be coordinated to beam at each other. This can be done using neural network or machine learning to provide real time beam steering. Moreover, the antennas support carrier aggregation that enables a radio to increase data capacity. Known as "channel bonding," 5G supports aggregation of up to 16 channels at once, including mixes of separate 4G and 5G frequencies.

Figure 1E:
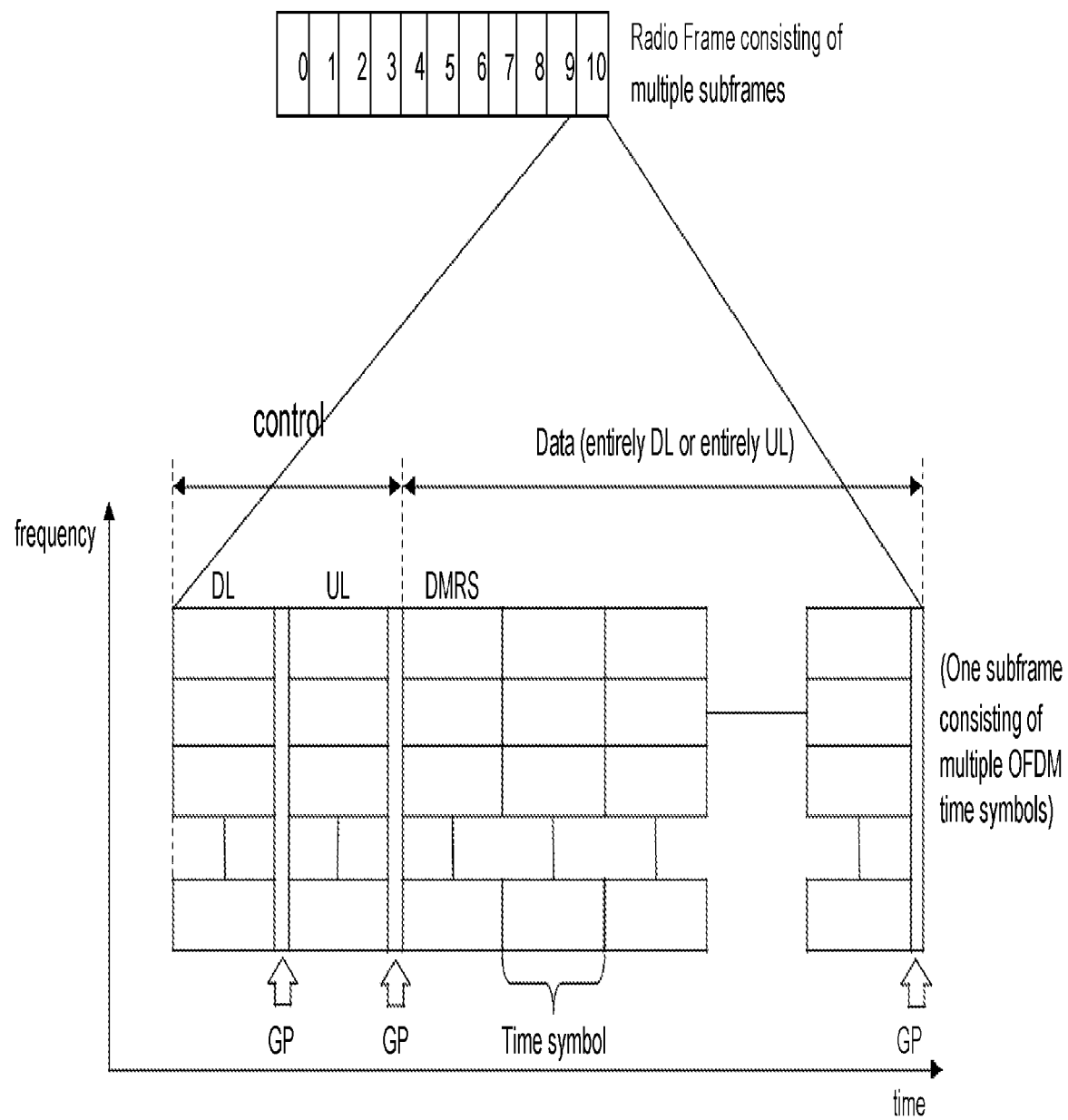

FIG. 1E shows an exemplary 5G millimeter wave frame structure. As shown DL refers to downlink transmission from eNB to UEs and UL refers to uplink transmission from UEs to eNB. As shown control and data planes are separate, which helps in achieving lesser latency requirements. This is due to the fact that processing of control and data parts can run in parallel. The mm wave has small antenna and hence large number of antennas are packed in small size. This leads to use of massive MIMO in eNB/AP to enhance the capacity. Dynamic beamforming is employed and hence it mitigates higher path loss at mm wave frequencies. 5G millimeter wave networks support multi-gigabit backhaul up to 400 meters and cellular access up to 200-300 meters. Hover, 5G millimeter wave goes through different losses such as penetration, rain attenuation etc. This limits distance coverage requirement of mm wave in 5G based cellular mobile deployment. Moreover path loss at mm is proportional to square of the frequency. It supports 2 meters in indoors and about 200-300 meters in outdoors based on channel conditions and AP/eNB height above the ground. It supports only LOS (Line of Sight) propagation and foliage loss is significant at such mm wave frequencies. Power consumption is higher at millimeter wave due to more number of RF modules due to more number of antennas. To avoid this drawback, hybrid architecture which has fewer RF chains than number of antennas need to be used at the receiver. Moreover low power analog processing circuits are designed in mm wave hardware.

Between bands 30 Ghz and 300 Ghz, mmWave promises high-bandwidth point-to-point communications at speeds up to 10 Gbps. But the signals are easily blocked by rain or absorbed by oxygen, which is one reason why it only works at short ranges. Beamforming is a way to harness the mmWave spectrum by directly targeting a beam at a device that is in line of sight of a base-station. But that means antennas in devices, and base-stations on network infrastructure, have to be designed to handle the complexity of aiming a beam at a target in a crowded cellular environment with plenty of obstructions.

Figure 1F:
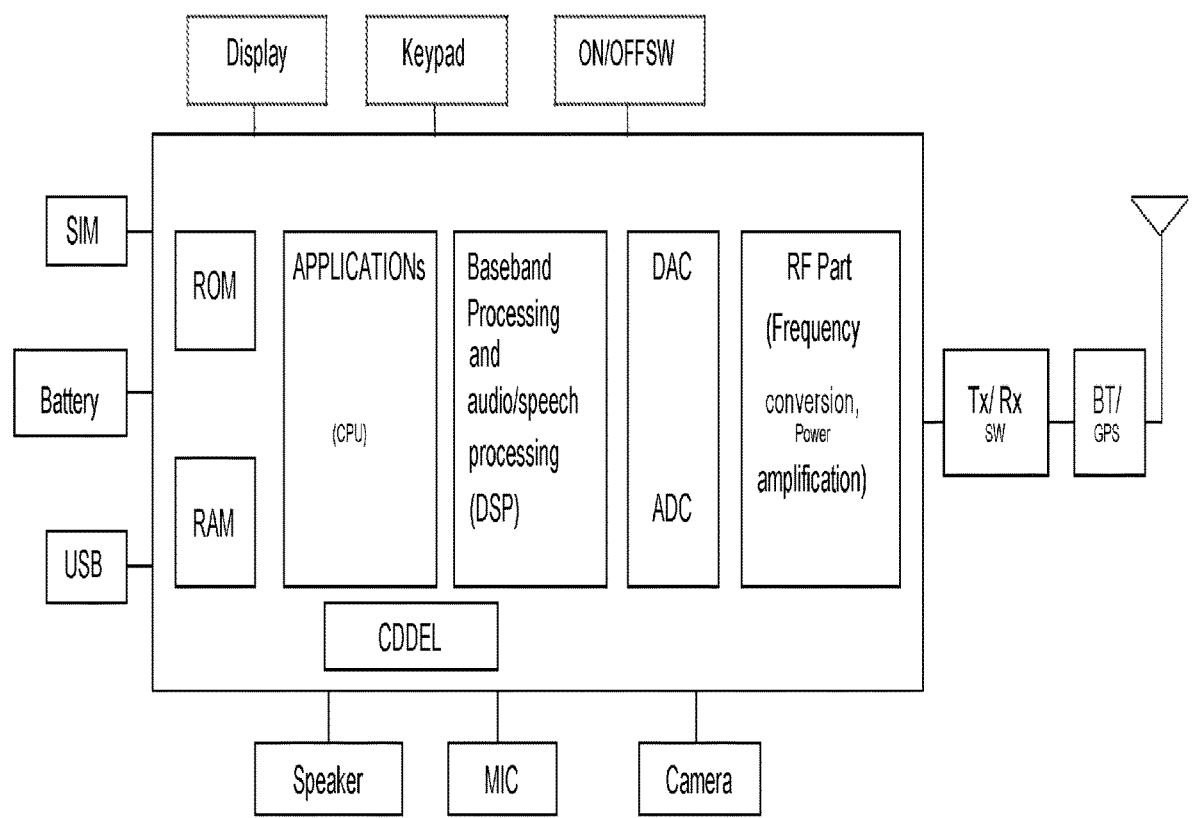
Figure 1G:
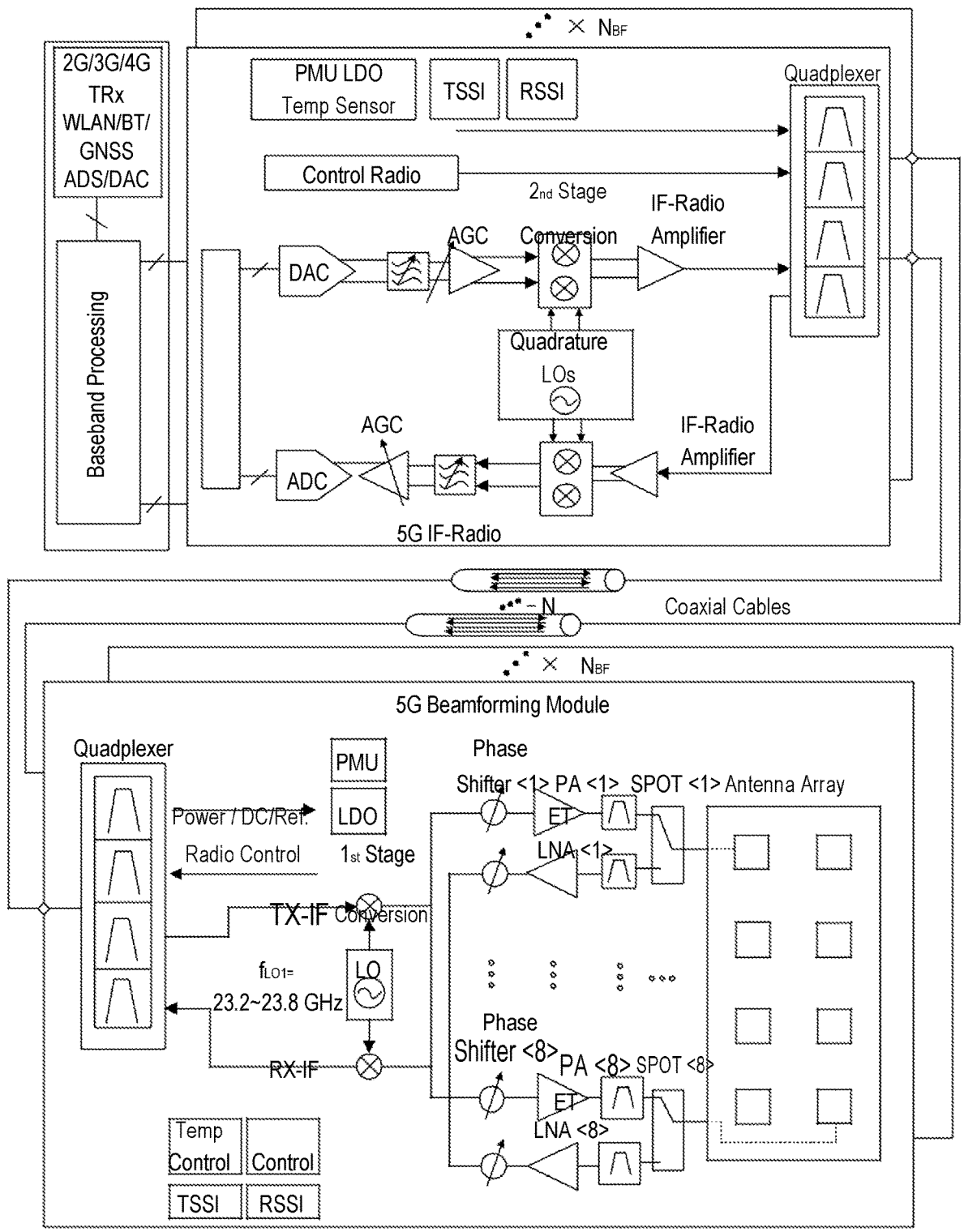

FIGS. 1E and 1F depict a cell phone that has an RF part including RF Transceiver chip, baseband part comprising of DSP and CPU for controlling the data/control messages. ADC/DAC chips are used for interfacing both RF and baseband parts. The other basic cell phone components include touchscreen display, battery, RAM, ROM, RF antenna, MIC, Speaker, camera, diplexer, micro-USB, SIM slots and others. FIG. 1F shows an exemplary 5G cell phone architecture. As shown the architecture include baseband part, digital RF interface such as DigRF, ADC/DAC and RF Transceiver. The basic components are same in the 5G phone except antenna array is used instead of one antenna to support massive MIMO and beamforming. Quadplexer is used instead of diplexer to support multiple bands. Quadplexer or Quadruplexer is used to multiplex and demultiplex four radio frequencies to/from single coaxial cable as shown. This helps in reducing cost and weight as well as uses very smaller area of the phone. This shown 5G cell phone architecture supports millimeter wave frequency bands. In order to support massive MIMO/beamforming multiple PAs, LNAs, phase shifters, RF filters and SPDT switches are incorporated in the 5G cell phone design. The 5G phone is backward compatible to 2G/3G/4G, WLAN, Bluetooth, GNSS etc. The 5G phone shown is based on heterodyne architecture and advantages of Heterodye receiver. Radio Frequency Front End (RFFE) control signals are used to carry transmitter signal strength indicator (TSSI) and receiver signal strength indicator (RSSI) signals. The temperature control of the beamforming module and its calibration are performed. PMUs (Power Management Units) and LDOs (low drop-out regulators) are used in beamforming part of the 5G cell phone. They transform DC voltage of coaxial cable to different power supplies for use in various dies for cell phone operation.

The RF frontend transceiver can realize the beam scanning function through a plurality of antenna elements, T/R switches, power amplifier in the transmitter, low noise amplifiers in the receiver, low noise switches, phase shifters, and RF signals. The transceiver switches and the low loss switches can control whether the antenna elements in the system receive RF signals or transmit RF signals. When the RF signals are controlled to be transmitted, the RF signals have different phase information for each link through the phase shifters, and then the RF signals are amplified by the power amplifiers, which consists of a pre-power amplifier and a power amplifier, and finally RF signals are transmitted to the antenna elements. With different phases of the antenna elements, antenna array can form different beam directions, so that an optimum beam pointing can be achieved in real time.

Since numerous antennas need to be provided on the mobile device, an antenna system applied in the metal back cover of the 5G mobile terminal, which includes a metal back cover, a signal feeder line, and a plurality of antenna elements. Preferably 3D printing to create a capacitive coupled patch antenna array capable of providing high gain and 360-degree coverage in the elevation plane. A material with a relative dielectric constant 2.2 and loss tangent 0.0009 at the frequency band of 24-28 GHz is used as the substrate for printed circuit board (PCB). The patches are printed at the top layer of the substrate. The bottom layer of the substrate consists of the ground plane. The inner conductor of the coaxial probe feed extends from the ground plane through the PCB substrate to reach the top layer feed which capacitively couples the patches. The antenna element covers 24-28 GHz, which is a possible frequency band for future 5G applications. Four sub-arrays of 12 antenna elements, each providing 90 degrees in the elevation plane, were integrated into the mobile phone chassis for 360-degree coverage. The antenna array achieved a high gain of 16.5 dBi in the boresight and can be steered from −60° to 60° in the phi plane. The physical size of the antenna is relatively small compared to existing designs, meaning that it consumes less space and more antenna elements can be arranged along the width of the mobile phone ground plane. The bandwidth of the antenna is sufficient for 5G applications and can be further widened by modifying the antenna structure.

In one embodiment, the case of the mobile device can have a plurality of channels where a liquid metal can be pumped into the right location and be used as antennas. Such antenna scan be a liquid metal whose shape can change according to the frequency. A plurality of microchannels are formed as part of the case, and the liquid metal can move as needed to aim at the antenna on the cell tower, and also to be away from the user's face to minimize radiation on the cells and to reduce RF blockage. The liquid can be a eutectic alloy of Ga and In, which remains in liquid form at room temperature, into very small channels the width of a human hair. The channels are hollow with openings at either end but can be any shape. Once the alloy has filled the channel, the surface of the alloy oxidizes, creating a "skin" that holds the alloy in place while allowing it to retain its liquid properties.

The alloy can be injected into elastic silicone channels, creating wire like antennas that are resilient and that can be manipulated into a variety of shapes. Since the frequency is determined by the antenna's size/shape, it can be tuned by stretching it. Flexibility and durability are also ideal characteristics, since the antenna could be folded or rolled up into a small package for deployment and then unfolded again without any impact on its function. Salt water or other liquid metals or alloys could reduce the cost.

In another embodiment, a 3D PCB utilizes the thickness of the entire mobile phone, which is typically 7-9 mm, and can provide mechanical support to the entire phone like a casing. By using a 3D rather than a flat shape, more space is created for placing PCB components in the mobile phone, particularly for the additional 5G antenna elements along with the corresponding RFIC. The 5G antenna can be the liquid metal discussed above. In one implementation that uses PCB lines, four sub-arrays with three sub-arrays of proposed antenna elements on different sides of the bottom edge region in PCB and one sub-array at the sides of the top edge region in PCB, each sub-array has 24 antenna elements and 96 antenna elements are used altogether. Each sub-array provides 90° coverage in the theta plane.

In another embodiment, each antenna element has a feed probe, an insulating sleeve, and a reflecting cavity. The reflecting cavity is formed by an inner concave of the outer side of a metal frame of the metal back cover. The reflecting cavity includes a first wall and a second wall. One end of a feed probe is connected with the first wall and a middle of the feed probe is connected with the second wall through an insulating sleeve. The other end of the feed probe is connected with a signal feeder line. The 5G antenna can be located at a side of the mobile terminal, which does not occupy the position of the traditional antennas, so it can coexist with the 2G/3G/4G/GPS/WIFI/BT antennas. The reflecting cavity can change a radiation direction of the 5G antenna to reduce the electromagnetic radiation on the user. In one embodiment, if the user puts the phone next to the face, sensors detect such usage scenario, and uses the 5G antennas most away from the user to increase antenna efficiency and reduce radiation on the user.

Further, the shape of the reflecting cavity is a cuboid, and the antenna's operating wavelength is $\lambda$, and the length, width, and height of the reflecting cavity are ranging from to $\lambda$, from $1/10\lambda$ to $1/2\lambda$, and from $1/8\lambda$ to $1/2\lambda$, respectively. The 5G antenna with the above reflecting cavity can produce a better directional radiation. Further, the metal back cover comprises a bottom case and a frame, and the first wall can be a part of the metal bottom case a part of the metal frame. When the first wall is a part of the bottom case, the opening of the reflecting cavity is disposed on the frame. When the first wall is a part of the frame, the of the reflecting cavity is disposed on the bottom case. Further, the reflecting cavity can be filled with low loss materials whose permittivity is larger than 1 and whose dielectric loss is less than 0.02, for example, plastic. The reflecting cavity can be filled with different materials or filled partially through injection molding. The corresponding filling methods and materials can be selected according to a beam scanning range of the antenna. When the reflecting cavity is filled with plastic material, the distance between elements can be reduced therefore the scanning angle can be increased, but the bandwidth of the antenna will be reduced. The coupling between elements will be increased and the radiation efficiency of the antenna will be decreased. If it is necessary, the reflecting cavity can be filled with air. Further, a feed hole is set in the first wall, and the feed probe is connected with the feed hole. The end of the feed probe connected with the feed hole has a larger diameter. The feed probe has a screw structure. The longitudinal section of the feed probe can be a T shape or a triangular or a trapezoidal. The feed probe can be selected according to the required bandwidth of the antenna element. The feed probe with a T shape longitudinal has a narrow impedance bandwidth. The feed probe of the other forms have a wider impedance bandwidth, but it can increase the length of the antenna element and reduce the scanning range of the beam. Further, the antenna element is disposed on a long side of the metal back cover. 5G antenna is disposed on the side of the mobile terminal through an antenna element constituted by a feed probe and a reflecting cavity. The antenna element is disposed on the side of the metal back cover. It is advantageous to form an array, thus it can achieve a high a wide beam width and beam scanning angle. Further, the antenna array includes N elements, and N is a positive integer which is larger than 1. The antenna array can achieve a high gain, a wide beam width and beam scanning angle. Further, the antenna array system applied in the metal back cover includes at least two sub-arrays which are disposed respectively at both long sides of the metal back cover. The antenna array does not occupy the position of the traditional antennas, so it can coexist with 2G/3G/4G/GPS/WIFI/BT antennas, and it has a wide bandwidth and a high gain, and can achieve a wide beam scanning angle and beam width in cooperation with antennas on 5G tower antennas.

Turning now to 5G cell towers, a 5G tower is different than a 4G tower both physically and functionally: more are needed to cover the same amount of space, they're smaller, and they transmit data on an entirely different part of the radio spectrum. Small cells support high frequency millimeter waves, which have limited range. The antennas within the small cell are highly directional and use what's called beamforming to direct attention to very specific areas around the tower. These devices can also quickly adjust power usage based on the current load. The small cell antenna needs to be installed with minimal disruption to local people—no street works or construction—and without changing the look of the area. They are connected using optical fiber high speed converged network, which also supports other mobile technologies, home broadband, Internet of Things (IoT) and business services. The housing of the mobile equipment can be done within street furniture such as manhole covers, lamp-posts and phone boxes to increase the speed and extend the coverage of a mobile signal along busy roads, town squares and in shopping and entertainment areas. For example, the manhole cover antennae can be installed with minimal disruption to local people—no street works or construction—and without changing the look of the area, as the kit is below ground. By connecting the street furniture to 5G network, the fiber-connected 5G-enabled small antennae are the foundation on which connected smart cities will be built. 5G connectivity will allow connected traffic lights instantly to reroute road traffic around congestion, councils automatically to schedule repairs for broken infrastructure like street lighting, and businesses to manage how much energy they use intelligently.

The 5G ecosystem is expected to support high-density networks by adding new features to the radios and to the overall system layout. The traditional combination in 3G/4G networks of a remote radio head connected to an external antenna will be extended by active antenna systems (AAS) or active phased-array antennas with massive antenna elements (massive APAA's), in which the electronics will be embedded in the antenna system and operating over a wide frequency range (600 MHz to 28 GHz and above) GHz. This primary system will be supported by complementary systems in dense areas with a high number of antennas to support multi-user MIMO (MU-MIMO). These antenna elements will feature their own control electronics, requiring new connectivity solutions. Frequencies above 6 GHz will be predominately supported by highly integrated systems. These radio frequency integrated circuits (RFIC) can feature integrated antennas on the top surface of the chipset.

Figure 2A:
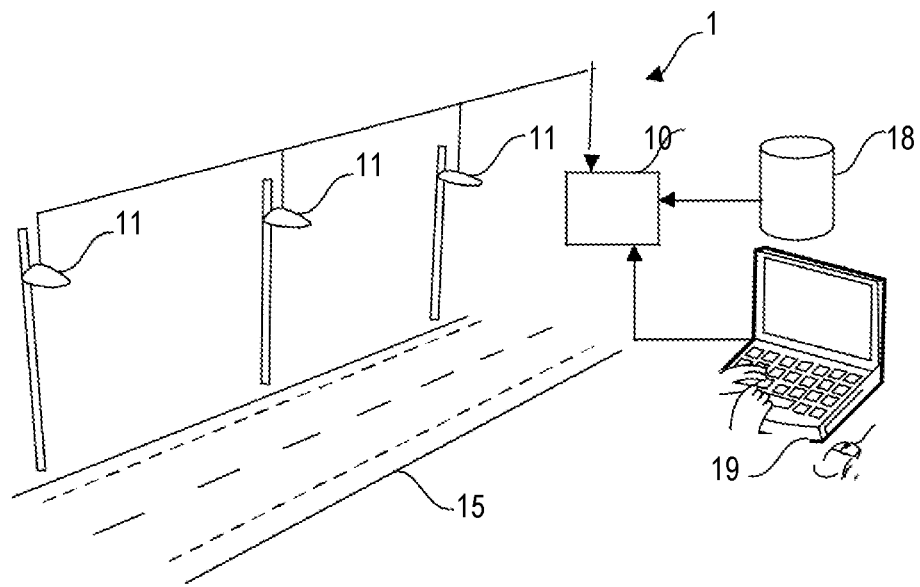
FIGS. 2A-2B show an exemplary city light small cell environment with crime/pollution sniffing capabilities.

FIG. 2A shows an exemplary light post mounted 5G antenna system mounted on a plurality of light posts 11. The light post 11 can also be a traffic light or street sign or utility pole. Small cells are periodically placed on the traffic light, street sign, or utility pole in a neighborhood. A system 1 with a computing unit 10 in communication with 5G antenna and city monitoring units, each monitoring unit arranged to monitor an operational status of at least one street lighting device 11. Hence, a single monitoring unit may be configured to monitor one or several lighting devices 11 with respect to operational status. The monitoring units may e.g. be mounted in (or at or in the vicinity of) the street devices 11. In the present example, the street devices 11 are road lamps arranged to illuminate a road 15 but may alternatively be any other kind of street devices, such as traffic enforcements cameras or traffic lights. The computing unit 10 may be in communication with a user interface 19 and a database 18 (or memory or any other means) for storing region description data. The region description data may e.g. be a region map (such as a road map or geographical map) and/or data indicative of industrial areas, parks, museums parking lots, average number of people in the region or any other information which may be utilized to prioritize regions e.g. with respect to maintenance urgency. The region description data may be presented e.g. in a map and/or a table over a region in which the street devices 11 are located.

The city/traffic light post cellular device can communicate with a cellular device belonging to a person who is crossing a street near the city light or street light. This is confirmed with camera detection of the person crossing the street and if confirmed, the cellular device emits a person to vehicle (P2V) or a vehicle to person (V2P) safety message to oncoming vehicles to avoid a collision. This system can help elderly users cross the street safely. The quick speed of the 5G network enables cars, bikes, and moving vehicles to stop quickly to protect the person in an emergency where the person is crossing the street without advanced notice to others.

In another embodiment, the camera can detect a pedestrian or person walking and facing a crossing point. The system sends a confirmation to the person's cell phone indicating whether the person desires to cross the street. Once confirmed the system can look up oncoming traffic to determine a gap in traffic to allow the user to cross the street. Alternatively, instead of automated traffic crossing detection using the camera, a walking person activates a street button or a cell device pointing to a desired traversal, the person waits for an indication to cross the street, the system can identify a gap in traffic and signal vehicles behind the gap to stop at the intersection and allow the user to traverse the desired path. After the person safely reaches the other side of the street, the system can signal vehicles to move again. The cameras can capture scenarios including: vehicle going straight, vehicle turning right, vehicle turning left, pedestrian crossing, pedestrian in the road, and pedestrian walking adjacent to the road. The vehicle going straight and the pedestrian crossing scenario is the most frequent pre-crash scenario and has the highest cost. The vehicle turning (right or left) scenarios result in less severe injuries, V2P systems functioning correctly within these scenarios would help maximize crash avoidance. The vehicle going straight and pedestrian either in road or adjacent to the road is lower in occurrence but these crashes tend to result in fatalities.

In addition to pedestrian assistance, the 5G vehicle communication and camera combination can handle the following patterns as well:

Intersection Movement Assist (IMA) warns drivers when it's unsafe to enter an intersection due to high collision probability with other vehicles at intersections. The street cameras capture location information from the "cross traffic" vehicle enables the vehicle attempting to cross the intersection to avoid danger, even if the view is blocked.

Electronic Emergency Brake Light (EEBL) enables a vehicle to broadcast a self-generated emergency brake event to surrounding vehicles. Upon receiving information from the cameras, the processor determines the relevance of the event and, if appropriate, provides a warning to the cars/drivers, helping to prevent a crash.

Forward Collision Warning (FCW) warns drivers of an impending rear-end collision with another vehicle ahead in traffic, in the same lane and moving in the same direction. The camera, along with data received from other vehicles, determines if a forward collision is imminent and to warn drivers to avoid rear-end vehicle collisions.

Blind Spot Warning (BSW) and Lange Change Warning (LCW) warn drivers during a lane change attempt if the blind-spot zone into which the vehicle intends to switch is, or will soon be, occupied by another vehicle traveling in the same direction. This is detected by the camera in conjunction with data from vehicles, and the processor sends an advisory message to the car/driver indicating a vehicle in the blind spot zone. When attempting to merge into the same lane as the conflicting vehicle, the processor sends a warning to the car/driver.

Do Not Pass Warning (DNPW) warns drivers during a passing maneuver attempt when a slower-moving vehicle ahead cannot be passed safely using a passing zone, because the passing zone is occupied by vehicles moving in the opposite direction. A vehicle sends out an indication on the V2V it will pass, and the camera captures data and sends advisory information that the passing zone is occupied when a vehicle is ahead and in the same lane, even if a passing maneuver is not being attempted.

Left Turn Assist (LTA) warns drivers during a left turn attempt when it is not safe to enter an intersection or continue in the left turn attempt, due to a car approaching the same path with no intent of stopping. The camera and processor can provide collision warning information to the vehicle operational systems, which may perform actions to reduce the likelihood of crashes at intersections and left turns.

Each monitoring unit may be configured to continuously and/or at predetermined time intervals and/or upon request (e.g. from the computing unit 10) measure (or check) the operational status of the street device 11. The operational status may e.g. be indicated by parameters such as light output, energy consumption or any other parameter relating to the operational condition of the street device 11. Further, the operational status of the street device 11 may be indicated by a failure signal. The monitoring units may be configured to automatically transmit the failure indication signal in case the street device is (or is soon) out of function.

Further, the monitoring units may be configured to store or measure the geographical positions of the street devices 11. For example, a monitoring unit (or the street devices) may comprise a GPS receiver for obtaining a GPS position of the street device 11.

The monitoring units may communicate (directly or indirectly) with the computing unit 10, preferably in an automatic manner. For example, the monitoring units may communicate with the computing unit 10 by means of radio (or any wireless) communication and/or wired communication such as electrical/optical communication (e.g. via Ethernet). The monitoring units may communicate via other units (e.g. servers), which in turn communicates with the computing unit. Hence, the computing unit 10 may obtain information indicative of the operational statuses and positions of the street devices 11 from a peripheral server, which has gathered such information e.g. from the monitoring units.

Figure 2B:
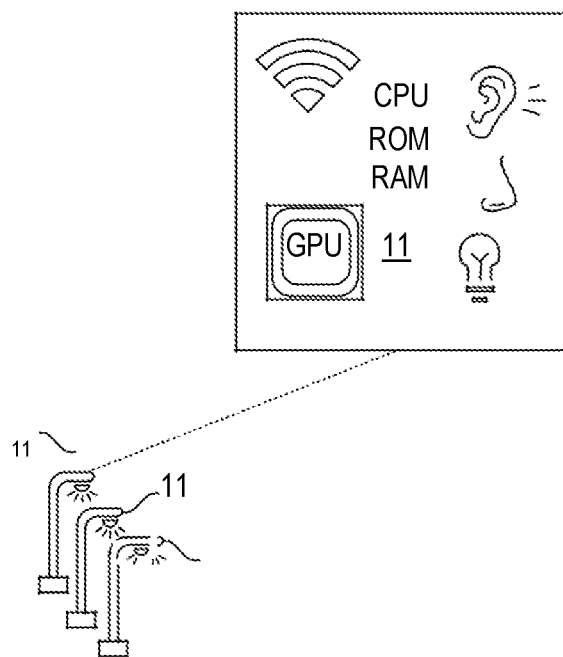

FIG. 2B shows a block diagram of the unit 11. While the unit can include conventional yellow sodium vapor lights, white light emitting diode (LED) light is preferred with an adaptive control system to provide energy efficient lighting. Smart LED streetlights enable the city to monitor energy consumption and provide the opportunity to dim lighting levels during late evenings. The unit 11 includes an electronic nose to detect air pollution level. The electronic nose can simply be a MEMS device acting as a particle counter. Alternatively, the electronic nose can detect composition of gas and provide a more detailed report, for example identifying air pollution as gun power smell, illegal drug substance smell, car exhaust smell, industrial pollutant, or rotting mammal smell and such information can be relayed to suitable trash removal contractors. The unit 11 also includes a microphone array that can detect sound and direction of sound. This is useful to detecting gunshots, and the direction of the sound can be triangulated to pinpoint the position of the shooting. The unit 11 also includes a camera, which can be a 360 degree camera. Alternatively, the camera can be a 3D camera such as the Kinect camera or the Intel RealSense camera for ease of generating 3D models and for detecting distance of objects. To reduce image processing load, each camera has a high performance GPU to perform local processing, and the processed images, sound, and odor data are uploaded to a cloud storage for subsequent analysis. An embodiment of the electronic nose can be used that includes a fan module, a gas molecule sensor module, a control unit and an output unit. The fan module is used to pump air actively to the gas molecule sensor module. The gas molecule sensor module detects the air pumped into by the fan module. The gas molecule sensor module at least includes a gas molecule sensor which is covered with a compound. The compound is used to combine preset gas molecules. The control unit controls the fan module to suck air into the electronic nose device. Then the fan module transmits an air current to the gas molecule sensor module to generate a detected data. The output unit calculates the detected data to generate a calculation result and outputs an indicating signal to an operator or compatible host computer according to the calculation result.

One embodiment of an air pollution detector measures five components of the Environmental Protection Agency's Air Quality Index: ozone, particulate matter, carbon monoxide, sulfur dioxide, and nitrous oxide. This device detects all of these pollutants except sulfur dioxide. The device also includes a town gas sensor to alert the user to gas leaks or the presence of flammable gases. Furthermore, a temperature and humidity sensor is included as these conditions can impact the performance of the gas sensors. The system can also use Shinyei PPD42 Particulate Matter Detector, MQ-2 Gas Sensor, MQ-9 Gas Sensor, MiCS-2714 Gas Sensor (NO2), MiSC-2614 Gas Sensor (Ozone) and Keyes DHT11 Temperature and Humidity Sensor to detect air pollution.

City pollution may also impact cloud formation and rainfall. An electronic tongue sensor can be provided to sense quality of fog, rain and/or water. The tongue includes a stirring module, a liquid molecule sensor module, a control unit and an output unit. The stirring module is used to pump liquid actively to the liquid molecule sensor module. The molecule sensor module detects the liquid molecules pumped into by the stirring module. The liquid molecule sensor module at least includes a molecule sensor which is covered with a compound. The compound is used to combine preset liquid molecules. The control unit controls the stirring module to pump liquid to be "tasted" into the electronic tongue device. Then the module transmits a flow current to the liquid molecule sensor module to generate a detected data. The output unit calculates the detected data to generate a calculation result and outputs an indicating signal to an operator or compatible host computer according to the calculation result. Such electronic tongue can detect quality of fog or liquid, among others.

In a method to provide street security, the system obtains data indicative of the operational status of each street device. In the present embodiment, the data is received from the street devices (or the monitoring units connected to, and optionally comprised in, the street devices). The data is transmitted (preferably automatically) from the monitoring units (or any unit which has received the data from the monitoring units) to the computing unit. The data may e.g. be air quality, traffic flow, parking availability, gunshot sound, verbal altercation, sound pollution, light level. The data may also be indicative of a future operational condition of a street device estimated (e.g. by the monitoring unit) based on the current operational status of the street device. Further, the data from the street devices is indicative of the position of each street device 11. The street device may for e.g. send its GPS position. The region description data is obtained for the region in which the street devices are located. The region description data may be transmitted (or retrieved) from the database. The region description data may be a (geographic) map (such as a road map) over the region in which the street devices are located. For example, the geographic data may be retrieved from the Internet from an on-line map provider. The geographic data may provide information such as road type (e.g. straight or curved road, roundabout and bridge). The method further comprises correlating the geographic positions and operational statuses of the street devices with the region description data. For example, the correlation may be provided as a map, table or any other storage/display format pointing out where (at least some of) the street devices are located and indicating their operational status. In the present embodiment, the method may further comprise estimating traffic, noise, air pollution, lighting conditions at roads and/or in subareas in the region in which the street devices are located based on the region description data and the data received from the street devices. A processor, GPU or TPU can detect traffic flow, parked car, open parking spot, license plate number, vehicle identification, and face identification. An energy scavenger coupled to the processor to supply power. A vehicular radio transceiver to communicate with a smart car. The IoT can be inside an enclosure mounted to a light pole, a traffic light, a government vehicle, a utility vehicle, or a city vehicle. A cloud-based image processing system can receive images from the camera and recognize an image.

The IoT device can run code to minimize light pollution by lighting only with a moving person or vehicle in proximity to the light source. This is done by detecting motion near each light pole, and turning on only a few lights in the area of motion while keeping the other lights off. This approach has the advantage of shining light on those who hide in the darkness for nefarious purposes. The IoT device can run code to detect water pipe rupture by recognizing the position of a fire hydrant and when water motion is detected at the hydrant, the IoT device can run code to report a fire or emergency to a fire department. The IoT device can run code to gate off traffic to the fire or emergency. The IoT device can run code to detect car accident and request assistance from police or ambulance by detecting car collisions or detecting unusual prolonged traffic at a spot. The IoT device can run code to detect crime using a combination of video and sound. The IoT device can run code to discover anomalies with a particular city block. The IoT device can run code for providing sensor data to a crowd and requesting from the crowd as a game one or more reasons explaining sensor data.

The device can run code to detect sound direction of sound such as gunshot or gang fight or a crime in progress. Because each light pole is sequential, the microphone arrays have high resolution and a combination of microphone data from an array of light poles on both sides of a street or freeway provides valuable information in detecting sources of sound, much like SONAR systems. In some embodiments, the sound source may be a natural or an artificial sound generator. Examples of natural sounds include, without limitation, human sounds, animal sounds, environmental sounds, etc. In this instance, a natural sound generator may be a human being, an animal, the environment, etc. An example of an artificial sound is a recorded sound, and an artificial sound generator may be a speaker. The sound wave generated from the sound source and propagated toward the sound direction detecting module may have a specific frequency and a certain volume. Further, the sound source may generate sound that has distinguishable characteristics (longitudinal or transverse waves) and physical properties. The characteristics and properties of a sound wave may also be closely related to the transmission medium through which the sound wave travels. Further, the generated sound may be ultrasound that has a frequency greater than the frequency that may be detected by a human, or infrasound that has a frequency lower than the frequency that may be detected by a human. In some embodiments, the sound sensors or microphones may measure the physical characteristics of the detected sound wave and convert the physical characteristics into analog or digital signals. The sound sensors may detect the vibration and/or the pressure of the sound wave traveling through the sound sensors. The microphone arrays or sound sensors of the sound direction detecting module may detect the sound wave generated by the sound source. In some embodiments, the sound sensors are installed on one side of the sound direction detecting module and at their respective physical locations. The sound sensor may be positioned at a physical location different from the sound sensors. For example, the sound sensor may be installed on the opposite side of the sound direction detecting module. Thus, the sound sensors may be positioned to face in a first direction. The sound sensor may be positioned to face in a second direction, which differs from the first direction that the sound sensors face in. In some embodiments, because the sound direction detecting module may detect the sound wave propagated from the sound source in any angle, a distance between the sound sensor and the sound source may be different from a distance between the sound sensor and the sound source. Since the intensity of sound decreases as the distance of propagation increases, the sound pressure detected by the sound sensor is likely to be different from the pressure detected by the sound sensor. On the other hand, if the sound pressures detected by the two sound sensors are substantially identical (same), then the distance and the distance may substantially be the same. In such a situation, the direction vector of the sound source may be close to 90 degrees. If the sound wave is not reflected, for example, from some surface, the sound pressures detected from the different sound sensors may be used to show a direction of the sound source relative to the sound direction detecting module. According to some embodiments of the present disclosure, the sound sensors of the sound direction detecting module may detect the sound wave propagated from an alternative sound source, which is different from the sound source. The sound sensor may have substantially the same distance to the sound source as to the sound source, and the sound sensor may have substantially the same distance to the sound source as to the sound source. Stated differently, the sound sensor may be positioned or located substantially the same distance from the sound source as from the sound source, and the sound sensor may be positioned or located substantially the same distance from the sound source as from the sound source 140. In this case, the sound direction detecting module may have difficulty determining whether the direction of the sound wave is from the sound source or the sound source if it utilizes the sound pressures detected by the sound sensors to determine the direction of the sound wave. Thus, in a two-dimensional space, two sound sensors may be used to determine a direction vector with approximately 180-degree accuracy. That is, the sound direction detecting module may accurately describe, in angle degrees, whether a sound source is from the left side of, the right side of, or the middle area between the sound sensors in a 180-degree range. However, the sound direction detecting module may not be able to determine whether the sound source is in-front-of or behind the sound sensors. According to some embodiments of the present disclosure, a third sound sensor may be installed in the sound direction detecting module at a fixed position and on a side of the sound direction detecting module that is different from the side of the sound direction detecting module that the sound sensors are located on. The sound pressure detected by the third sound sensor may then be used to compare with the pressures detected by the sound sensors in order to determine whether the sound source is in-front-of or behind the sound sensors. For example, the sound sensor may be placed at a position in between the positions of the sound sensors. At the same time, the sound sensor may be placed on a side of the sound direction detecting module that is opposite to the side of the sound direction detecting module on which the sound sensors are placed. During operation, the distance between the sound source and the sound sensor 123 is different. Thus, if the sound pressure detected by the sound sensor is weaker than the pressures detected by the sound sensors, it may be reasoned that the sound wave should be from the sound source, which is in front of the sound sensors and has a shorter distance to the sound sensors than to the sound sensor. Similarly, when the sound pressure detected by the sound sensor is stronger than the pressures detected by the remote sound sensors, the sound direction detecting module may determine that the distance from the sound source to the sound sensor is shorter than to the sound sensors. In this case, the sound should be originated from the sound source, which is behind the sound sensors/microphones. Thus, by using three acoustic sound sensors, the sound direction detecting module may divide a two-dimensional plane, into four substantially same-sized quadrants (front left, front right, behind left, and behind right) from the perspective of the sound direction detecting module, and may determine a two-dimensional direction vector in a 360-degree range. In a similar approach, the device can run code to detect air pollution or odor from the electronic nose. The IoT device can run code to detect crime using a combination of video, odor and sound. Gunshot detectors based on video, sound and other IoT sensors help cops guess at the extent of unreported gun crime. With location data, police officers don't have to spend as much time searching for evidence that a shooting has occurred, such as spent shell casings. The software can tell whether multiple guns were used, or whether the shooter was moving as he pulled the trigger. Camera with face recognition/posture recognition can be turned on to capture events for subsequent analysis.

Figure 2C:
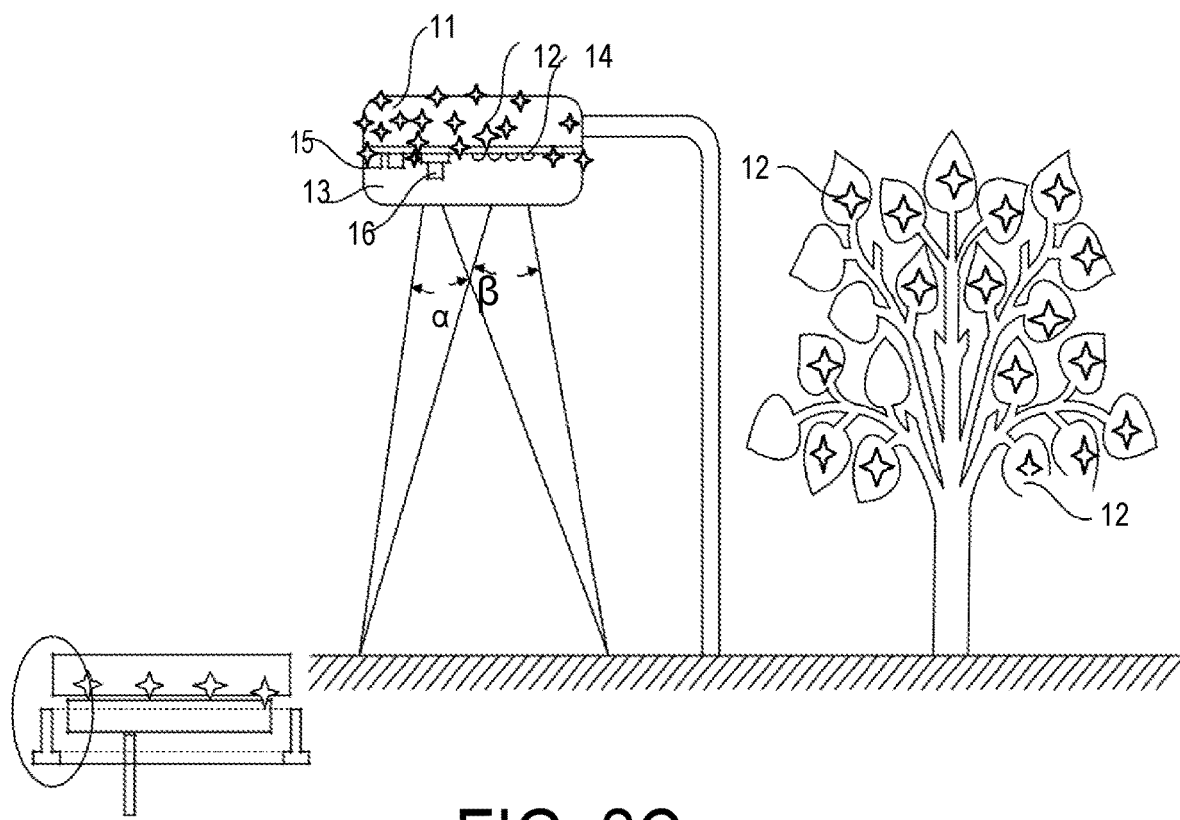
FIG. 2C shows a ground based, light based, and plant based antenna network.
Figure 2D:
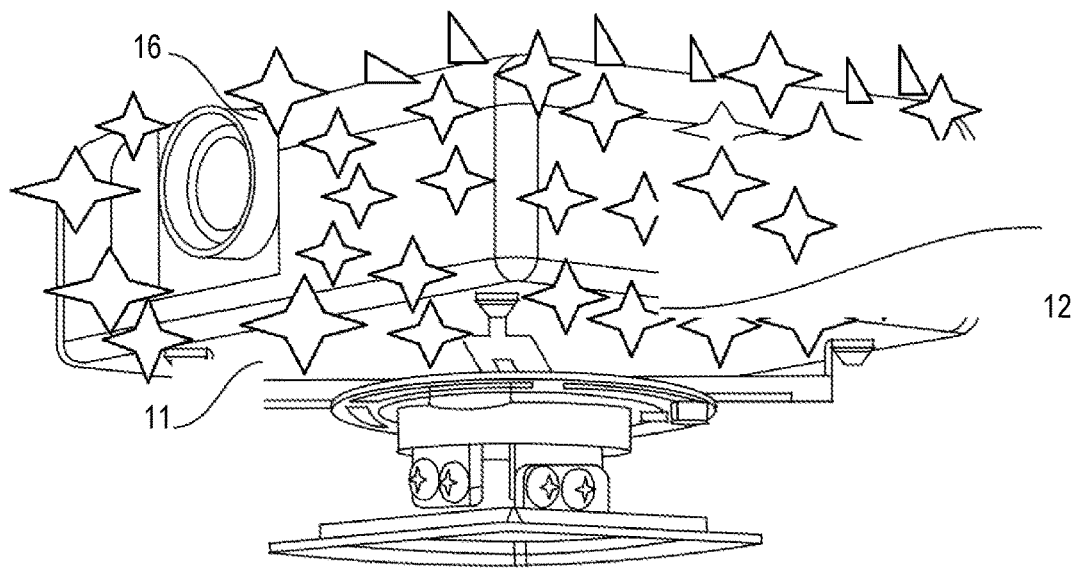
FIG. 2D shows an exemplary security camera with small cell and antennas.
Figure 2E:
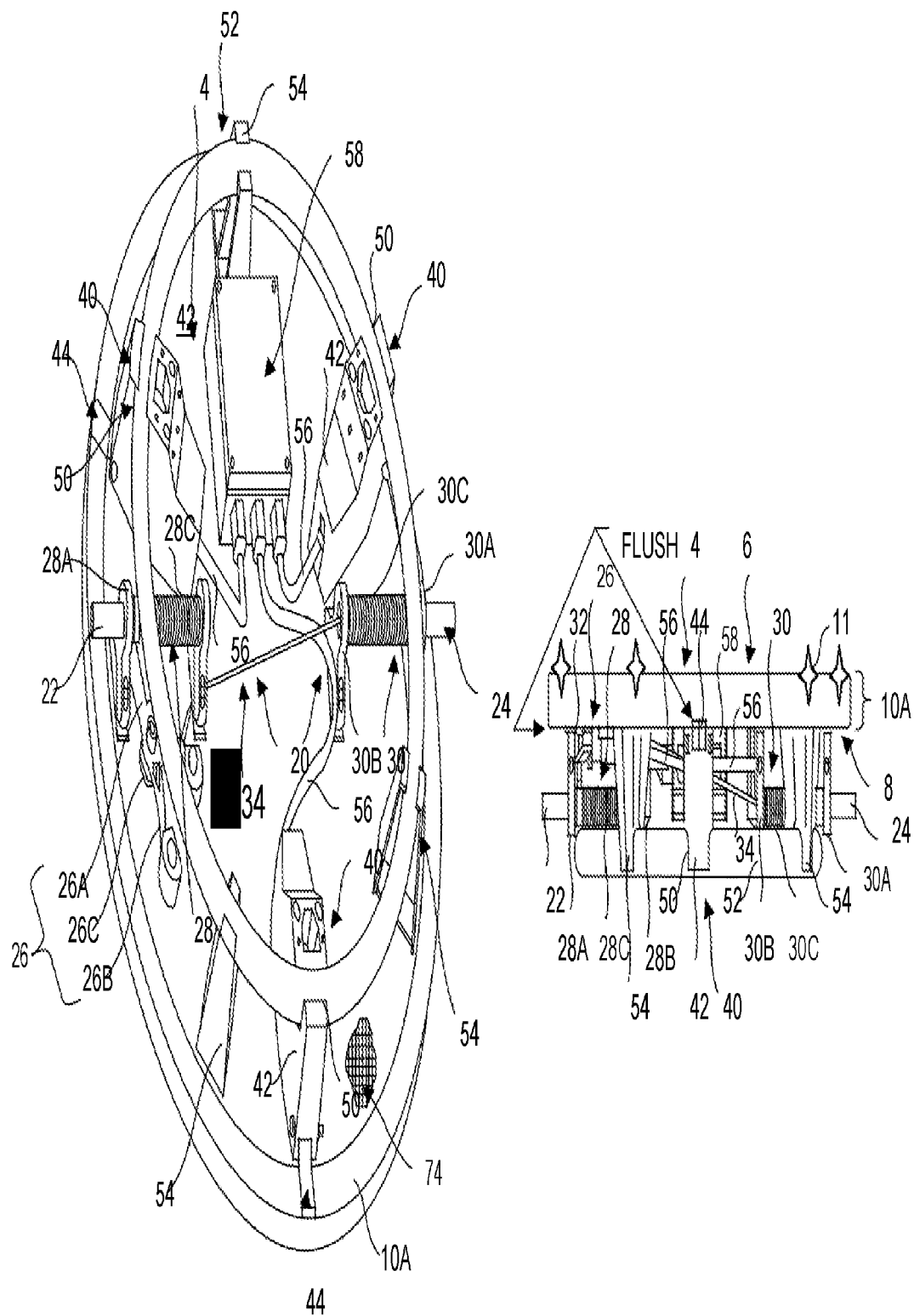
FIG. 2E shows an exemplary man-hole cover with a small cell and steerable antennas.

On each lighting device 11 is a massive MIMO antenna detailed in FIG. 2C hidden into street furniture such as manhole covers, light poles, and real/fake trees or plants, or even utility poles. As shown therein, the combined camera, light, sensor, and massive MIMO antenna unit 11 is mounted on a pole which is secured to the traffic pole cross bar via mounts. For example, a fake tree can be used with solar cells on the top of the leaves and the antenna 11 on the top/bottom of the leaves. The antenna can be near the top of the manhole cover. Referring to FIG. 2C, the street lamp includes one or more sensors 13 (including microphone), a light source 14, a light pervious cover 15, a camera module 16, and a lamppost. The light source 14 include a plurality of LEDs (light emitting diodes). It is understood that the light source 14 can also be incandescent lamps and fluorescent lamps. The light pervious cover is light-permeable. The light beams emitted from the light source 14 are transmitted through the light pervious cover 15 to illuminate the street. A material of the light pervious cover 15 is preferably selected from an anti-reflective material, such as light-permeable plastic, for the sake of preventing the camera module 16 from interfering by the light beams reflected within the light pervious cover when picking up an image of the street. The light-permeable plastic may be selected from the group consisting of Polymethylmethacrylate (PMMA), Poly Carbonate (PC), silicone, epoxy, polyacrylate. Certainly, the material of the light pervious cover can also be glass doped with ZnO, B2O3, SiO2, Nb2O5 or Na2O. The light pervious cover made of above materials has a light weight, which is convenient for assembling and disassembling. The camera module 16 includes a lens group, a lens and an image sensor. In the exemplary embodiment, the lens group includes two lenses. The camera module 16 is configured for capturing the image of the street. The camera module 16 can be wire or wireless connected with sectors of government authorities, e.g. a traffic police. Thus, government authorities can monitor activities on the street via the camera module 16 of the street lamp. When an accident happens, the traffic police can get the street information and take action in the accident in time. The image sensor 145 can be a charged coupled device (CCD) or a complementary metal-oxide-semiconductor (CMOS). In use, the camera module of the street lamp can capture images of the people and cars on the street in both bright and dark conditions. In a dark environment, the light source illuminates the street allowing the camera module to clearly capture images of people and cars on the street. The light source has an illumination range β defined by a spatial extension which the light beams emitted by the light source 14 can reach. The camera module has an image field α which the camera module can pick up. The image field α of the camera module overlaps the illumination range β of the light source. Thus the camera module can capture images of the area which the light source 14 illuminates. The light beams emitted by the light source 14 need to have a high brightness in a bad weather, for example in foggy weather. FIG. 2D shows a mounted system 12 that does not have light source 14, but has camera 16 and antennas 11.

The antennas 11 can be part of a 5G manhole cover. The manhole cover antennae can be installed with minimal disruption to local people—no street works or construction—and without changing the look of the area, as the kit is below ground. The 5G manhole security cover includes a manhole cover body that is constructed substantially entirely from a non-metallic RF signal transmissive material, such as a fiber resin composite. Examples of such composites include, but are not limited to, graphite epoxy composites, fiberglass composites, and other fiber resin systems. The manhole cover body has a generally planar first side, a second side spaced from the first side and a peripheral edge portion. The second side is shown as being generally planar, like the first side. However, the second side 8 could also have other shapes, such as a convex or concave configuration. The manhole cover body is substantially circular. However, non-circular shapes may also be used. For example, the manhole cover body is seated on a manhole frame 16 of conventional design. In the seated position of the manhole cover body 4, its first side 6 is accessible from outside the manhole 14, its second side 8 is disposed within the manhole 14, and its peripheral edge portion 10 engages a manhole cover support surface 18 on the manhole frame 16 (typically formed as a manhole frame ring flange). The peripheral edge portion 10A of the manhole cover body, or at least the underside thereof, may be provided with a protective gasket comprising a durable polymer material. The protective gasket 10A will engage the manhole cover support surface 18 and protect the peripheral edge portion 10A from abrasion. If desired, the thickness of the manhole cover body can be increased around its peripheral edge portion 10A (relative to its interior region) for added structural rigidity. The first side of the manhole cover body will typically be substantially flush with the top the manhole frame 16 and a surrounding surface (not shown) in which the manhole frame is situated (e.g., a roadway, walkway, parking lot, etc.). The manhole security cover may further include a suitable latch mechanism for locking or otherwise securing the manhole cover body to the manhole frame 16. By way of example only, a latch mechanism may be provided in accordance with the self-locking manhole cover where the latch mechanism 20 may include a pair of retractable latches that are driven by a rotatable latch drive unit. The latches 22 and 24 may be configured as slidable locking pistons. Alternatively, one of the latches could be a fixed anchor member while the other is retractable. The latches are arranged to engage diametrically opposing locations on the manhole frame 16. In an alternative configuration, the latches do not directly engage the manhole frame 16. Instead, the latches engage a precision mounting insert that is itself securely attached to the manhole frame 16. The precision mounting insert may be configured as a rolled angle frame whose size and shape conforms to the size and shape of the topmost portion of the manhole opening. In the illustrated embodiment, the mounting insert is ring-shaped due to the manhole opening having a circular configuration.

The precision mounting insert 25 includes a first upper portion 25A that may be configured as a generally horizontal flange element having a flat upper surface. The first portion 25A is fastened or otherwise secured to the manhole cover support surface 18 of the manhole frame using screws 25A-1 or other fasteners. Welding could also be used. The precision mounting insert 25 further includes a second lower portion 25B that may be configured as a generally vertical flange element. The second portion 25B extends obliquely (e.g. perpendicularly) from the first portion 25A. In the illustrated embodiment, the second portion 25B extends downwardly away from the manhole opening 12. In this configuration of the precision mounting insert 25, the flat upper surface of the first portion 25A provides an alternate manhole cover support surface 18A that supports the manhole cover body 4. The bottom edge of the second portion 25B provides a latching control surface 25C that is configured to be engaged by the latches 22 and 24. The latching control surface 25C provides a defined edge that the latches 22 and 24 will affirmatively engage. The distance from the top of the precision mounting insert 25 (i.e., the alternative manhole cover support surface 18A) to the bottom edge of the second portion 25B of the precision mounting insert 25 (i.e., the latching control surface 25C) may be chosen to closely match the spacing between the second side 8 of the manhole cover body (at the peripheral edge portion 10) and the top of the latches 22 and 24. This will ensure that the manhole security cover 2 will always be securely engaged on the manhole frame 16 in a defined home position so as to facilitate accurate manhole cover tamper sensing and movement detection. Without the precision mounting insert 25, it might be possible in some manhole frames for overhead traffic to flex or move the manhole cover body relative to the frame in a manner that is not conducive to accurate security sensing. In an alternative configuration of the precision mounting insert 25, a gap may be left between the latching control surface 25C and the latches 22 and 24. This will allow the manhole security cover 2 to detect a prying attempt in which the manhole cover body is lifted enough to trigger a manhole cover tamper signal before the latches 22 and 24 engage the latching control surface 26C and prevent complete lift out. This configuration would also allow the manhole security cover 2 to detect explosions that occur underground at the manhole site. The manhole cover body would likely lift up during an explosion, generate a manhole cover tamper signal, and the re-seat after the manhole cover body's upward movement is stopped by the latches 22 and 24 engaging the latching control surface 26C.

Figure 2F:
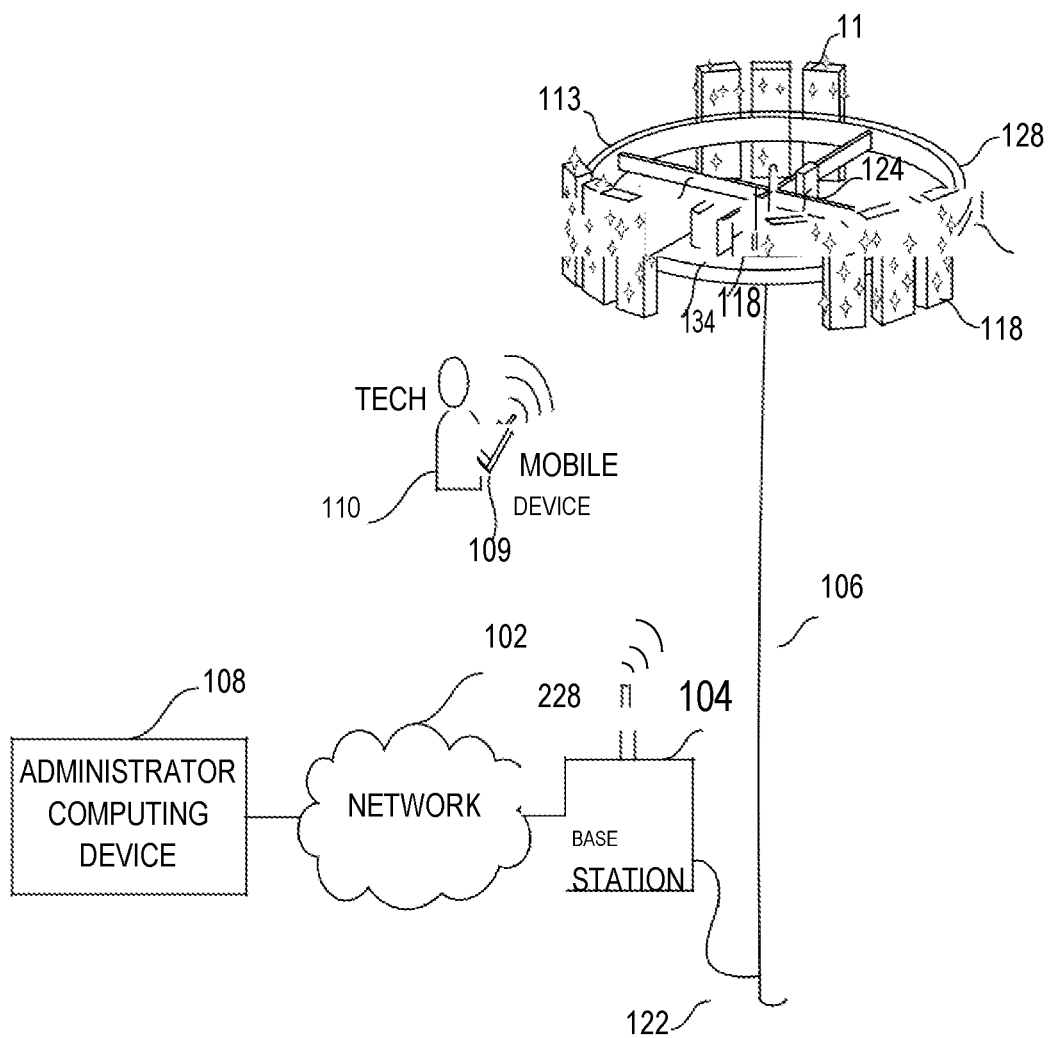
FIG. 2F shows an exemplary 4G-5G network in accordance with one aspect.

The antenna in unit 11 can also work with traditional cell tower antennas, as shown in FIG. 2F. Among other components not shown, the environment 100 generally includes a network 102, a base station 104 communicatively coupled to a communications tower 106, and an administrator's computing device 108. The environment 100 might also include a technician 110 and a mobile device 109. The components of the environment 100 may communicate with each other via the network 102, which may include, without limitation, one or more local area networks (LANs), wide area networks (WANs), and any available networking configuration useable to communicate between networked computing devices. The network might also include telecommunications networks like a public-switched telephone network (PSTN), 2G/3G/4G/5G, Global System for Mobile Communications (GSM), code division multiple access (CDMA), time division multiple access (TDMA), Wi-Fi, Worldwide Interoperability for Microwave Access (WiMAX), or the like. The network may include private or proprietary networks as well as public networks. Such networking environments are commonplace in telecommunications industries, offices, enterprise-wide computer networks, intranets, and the Internet. A number of administrator computing devices 108, mobile devices 109, and user devices (not shown), among others, may be employed within the environment 100 within the scope of embodiments of the invention. Each may comprise a single or multiple devices cooperating in a distributed environment. The administrator's computing device 108 and the mobile device 109 include any computing devices available in the art such as a for example a laptop computer, desktop computer, personal data assistant (PDA) mobile device, or the like. The computing device 108 and the mobile device 109 include one or more processors, memories, busses, input/output devices, and the like as known in the art. Further detail of components and internal functionality of the computing device 108 or the mobile device 109 is not necessary for understanding embodiments of the invention, and as such, is not described herein. The computing device 108 is communicatively coupled to the network while the mobile device 109 may be communicatively coupled to the network and/or may be coupled directly, either wirelessly or through a hardwire connection, to the tower 106. In an embodiment, a plurality of computing devices 108 and/or mobile devices 109 is included in the network. The base station 104 comprises any components useable to receive, handle, transmit, and/or operate on data received via the network 102 or from components on the communications tower 106. In an embodiment, the base station 104 is a base transceiver station. The base station 104 is configured like base stations known in the art and thus may include or be communicatively coupled to components such as a home location registry (HLR), a short-message service center (SMSC), a multimedia message service center (MMSC), signal processors, routers, control electronics, power sources, and the like. Further detail of components and functionalities of the base station 104 in addition to those described below will be understood by one of skill in the art and are thus not described in detail herein. The data received and transmitted by the base station 104 over the network and via the components on the tower 106 includes voice and/or data communications for transmission to, or receipt from a wireless communications network by methods known in the art. The data might also include control signaling for operation of components mounted on the tower 106 as described below. The base station 104 is communicatively coupled to components mounted on the communications tower 106. The tower 106 includes an antenna mount 113 with a plurality of antennas 116 mounted thereon for broadcasting voice or data signals to a plurality of mobile user devices (not shown) or other receiving units. Any configuration of components necessary for transmitting signals from the base station 104 through the antenna housings 116 with antennas 11 mounted on the tower 106 may be employed in embodiments of the invention. For example, antenna housings 116 with antennas 11 are associated with one or more radio units 118 and control units 120 that may be included in the base station 104 or mounted at the base or top of the tower 106 with the antenna housings 116 with antennas 11. One or more cables 122, wires, fiber-optic lines, or other communicative couplings extend from the base station to the tower 106 and up the tower 106 to the one or more of the radios 118, control units 120, antenna housings 116 with antennas 11, or other components disposed on the tower 106. In an embodiment, a wireless transceiver 124 is disposed on the tower 106 for wireless communication of one or more signals to/from the base station 104 or to/from the technician's mobile device 109 to one or more of the radios 118, control units 120, antenna housings 116 with antennas 11, or other components mounted on the tower 106. In an embodiment, the base station 104 might include a transmitter 228 that provides such wireless communications with the transceiver 124.

The tower 106 can comprise any available tower structure known in the art, such as, for example and not limitation, a mast, a tower, a steel lattice structure, a concrete reinforced tower, a guyed structure, a cantilevered structure, or the like. Or the tower 106 might comprise other structures like a church steeple, a geologic structure, a building, or other structure cable of supporting the antenna mount 113 of embodiments of the invention described herein.

The antenna mount 113 can be a ring or generally circular structure 126 mounted on the tower 106. The ring structure 126 can be mounted at the top or at any point along the length of the tower 106 and substantially encircles the tower 106. One or more spokes 128 extend radially outward from the tower 106 to the ring structure 126 and couple the ring structure 126 to the tower 106. One or more of the spokes 128 includes a passageway 130 interior to the spoke 128 and traversing the length of the spoke 128. The passageway 130 is configured to receive cables 132, wires, fiber optic strands, or other communications components therein. The ring structure 126 is generally circular in shape but may comprise any form or shape that substantially encircles the tower 106. In an embodiment the ring structure 126 only encircles a portion of the tower 106. The ring structure 126 has a generally C-shaped cross section that forms a channel 134 disposed therein that is open to the environment generally along the perimeter of the ring structure 126. The channel 134 extends into a body 136 of the ring structure 126.

The linear antenna arrangement is well suited for arrays of radiating elements feeding the lens, but this arrangement suffers from non-uniform element spacing when the plurality of radiating elements cover a significant portion of the lens. The antennas near the edges of the plurality of elements are at a different spacing than the central elements. The result is non-uniform beam crossover between adjacent radiation beams for the spatial coverage area. For this element arrangement, a desired minimum beam crossover level is set by the edge elements where the plurality of remaining elements will certainly meet the minimum crossover requirements. However, this is predicated on the assumption that the same radiating elements are used for the entire plurality of radiating elements. Otherwise, the beam crossover levels may vary across the plurality of radiating elements based on the primary radiation patterns and illumination efficiency. To overcome the issue of non-uniform beam crossover for the linear arrangement of radiating elements, different element types may be used. For example, dipole antennas may be used for the outer elements where patch antennas may be used for the central elements. Different antenna types result in different primary radiation patterns with different illumination efficiencies for the lens. The result is a different gain and beam width between the two antenna types. Therefore, the linear antenna element arrangement may still be utilized with the same, or nearly the same, beam crossover due to the different element types.

The linear arrangement of the plurality of antenna elements may be combined to form an array with beam steering capabilities. The antenna elements may be combined in azimuth, elevation, or both. The result is a fewer number of radiation beams; however, some or all of the beams may have steering capability or sidelobe control.

While housing 116 is rectangular in shape, it can be spherical, balloon shape, semispherical, parabolic, inverse parabolic, pyramidal, among others. A spherical dielectric lens can provide a multi-beam, high gain antenna system for fifth generation (5G) wireless communications. The lens is ideally of the Luneburg type lens. To approximate the focusing properties of the Luneburg lens in a manner that is practical for fabrication purposes, monolithic lenses can be used where the lens is comprised of a single, homogeneous dielectric material, layered lenses where the lens is formed of spherical shells of homogeneous material, and lenses formed by additive or subtractive manufacturing methods where the lens dielectric constant is synthesized by voids formed in otherwise solid dielectric materials. The shells could be connected in any suitable manner, such as by being bonded together on their touching surfaces, or they could be bolted together with non-metallic fasteners.

Objects that have the same shape as each other are said to be similar. If they also have the same scale as each other, they are said to be congruent. Many two-dimensional geometric shapes can be defined by a set of points or vertices and lines connecting the points in a closed chain, as well as the resulting interior points. Such shapes are called polygons and include triangles, squares, and pentagons. Other shapes may be bounded by curves such as the circle or the ellipse. Many three-dimensional geometric shapes can be defined by a set of vertices, lines connecting the vertices, and two-dimensional faces enclosed by those lines, as well as the resulting interior points. Such shapes are called polyhedrons and include cubes as well as pyramids such as tetrahedrons. Other three-dimensional shapes may be bounded by curved surfaces, such as the ellipsoid and the sphere. A shape is said to be convex if all of the points on a line segment between any two of its points are also part of the shape. The housing 116 can have any of these shapes.

Another embodiment uses an active antenna architecture with combined antenna/radio head with distributed radio functionality across antenna elements. The term fronthaul is used to describe the connection between the cell tower radio itself and the mobile network control backbone (the Baseband Unit or BBU) and CPRI is a well-known standard for this interconnection. Backhaul is the linkage between a base station and the core wired network, and is often fiber or coax, and in some cases broadband, proprietary wireless links. Fronthaul, backhaul, and various hybrid architectures will be needed to accommodate cost efficient, backwards compatible, dense deployment of network infrastructure necessary to provide the broadband, low latency demands for 5G systems. In one embodiment, a remote fronthaul access point is placed in the center of the triangle and communicates with the radio head in the active antenna via fiber optics or ultrawideband radios.

Another embodiment fuses fronthaul and backhaul into an integrated 5G Transport Network as a flexible, reconfigurable, software defined transport architecture. A single network is used support a variety of functional splits between the antenna and the packet core. This aligns with the evolution of Network Function Virtualization (NFV) and Cloud RAN (CRAN) which points to the neural network plane or data center that can be configured to support whatever functional split is deployed in the network. At one extreme, a legacy base station and backhaul can be accommodated. At the other extreme, a network of densely distributed radio heads configured for massive MIMO can exchange compressed digitized radio samples for cloud-based processing. 5G-Crosshaul, a European 5GPPP project, can act as a bus/transport network connecting Radio Heads to BBUs which will be virtualized. Once virtualized, base station functions can be flexibly distributed and moved across data centers, providing another degree of freedom for load balancing.

Near the tower can be mounted a baseband unit cabinet. The baseband in the cabinet has a fiber optic output connection using the common public radio interface (CPRI) protocol and small form factor pluggable (SFP) connectors to fiber. The baseband also has a power output 216 to deliver power for the active antenna. CPRI fiber extends up the pole or mast to the active antennas. The antennas are arranged in the figure as four antennas for each of three sectors. In the active antenna, the radio head takes the output of the CPRI interface, which is digital, turns it into an analog radio frequency signal, amplifies it through a PA and drives the 5G antenna.

Wireless radios may be integrated into the antennas for short-distance inter-antenna communication. The radios may operate at a high frequency, such as millimeter-wave or 60 GHz, and may be ultrawideband UWB radios. At high frequencies such as used by these radios, high data rates are possible, sufficient to handle the digital data demands for digital fronthaul traffic, with minimal interference to the reception and transmission frequencies of the radios. The wireless range limitations of frequency bands in the tens of gigahertz (i.e., microwave or millimeter wave) are not problematic, as the antennas are co-located/mounted on the same radio tower. In some embodiments, backhaul may also be wireless using UWB radios. Backhaul to one antenna may be shared with other antennas, in a mesh network.

A baseband board may be provided to perform all baseband functions specific to an antenna. The baseband board may include DPD and CFR functions, as well as self-test routines and modules, as well as handling for one or more channels of MIMO, or one or more channels of multiple radio access technologies, e.g., 2G, 3G, 4G, 5G, 6G UMTS, LTE, and the like. At the bottom of the mast, cabinet 421 no longer needs a shelter with air conditioning, as the reduction in power wastage and increase in thermal mass enables passive cooling at the cabinet. Therefore, no AC and no baseband unit are found at the cabinet; instead, only a passively cooled power supply and a backhaul network terminal are provided in the cabinet.

In some embodiments, a power tilt antenna chassis may be provided. In some embodiments, a winch that can lower itself and that causes the antenna to guide itself into position when it is raised can be deployed at the tower in a base or cradle for the antenna module. A drone may operate an electric latch to release an antenna module, and the antenna module may lower itself to the ground using the winch. In some embodiments, a boom and trolley may be attached at the center of a tower for attaching and detaching antenna modules. The antenna chassis and/or base may be physically designed to be self-guiding, such that a new antenna may be inserted into the base by a drone or by an operator.

In some embodiments, wireless synchronization may be used between antennas. Synchronization is important for various applications, such as time division duplexing (TDD) for certain cellular bands. Direct wireless synchronization could be provided or each antenna subsystem may be equipped with its own GPS antenna, and the GPS antennas may be used to sync the antennas together down to approximately 50 parts per billion (ppb).

Figure 2G:
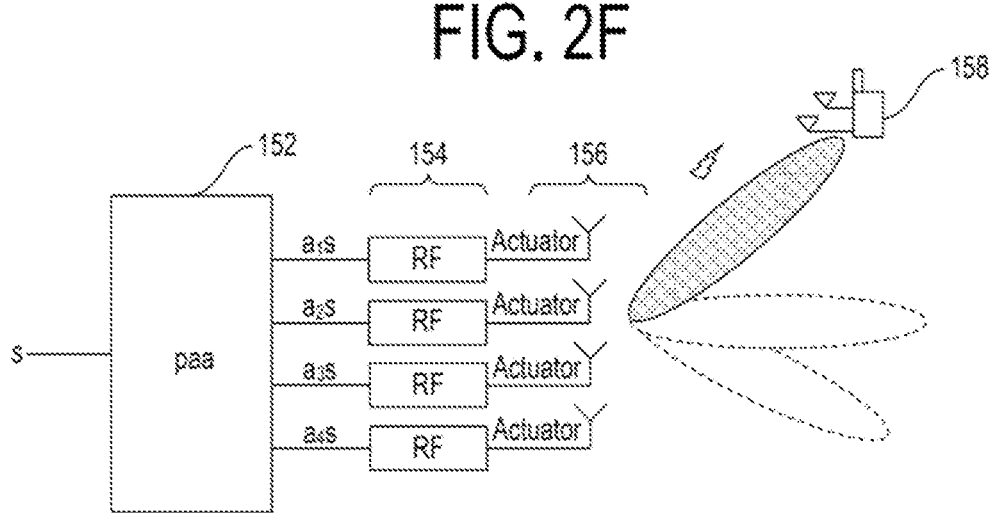
FIG. 2G shows vehicles for 5G operations.

FIG. 2G illustrates a simplified digital baseband beamforming architecture that digitally applies complex beamforming weights (composed of both a gain and phase factor) in the baseband domain. Antenna-based communication systems may utilize beamforming in order to create steered antenna beams with an antenna array. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beam gain in a particular direction. Many beamforming systems may allow for adaptive control of the beam pattern through dynamic adjustment of the delay and gain parameters for each antenna element, and accordingly may allow a beamformer to constantly adjust the steering direction of the beam such as in order to track movement of a transmitter or receiver of interest.

Digital beamformers may employ digital processing in the baseband domain in order to impart the desired phase/delay and gain factors on the antenna array. Accordingly, in digital beamforming systems, the phase and gain for each antenna element may be applied digitally to each respective antenna signal in the baseband domain as a complex weight. The resulting weighted signals may then each be applied to a separate radio frequency (RF) chain, which may each mix the received weighted signals to radio frequencies and provide the modulated signals to a respective antenna element of the antenna array.

As shown in FIG. 2G, digital beamformer 150 may receive baseband symbol s and subsequently apply a complex weight vector pBB=[α1 α2 α3 α4] T to s to generate pBBs, where each element α1, 1=1, 2, 3, 4 is a complex weight (comprising a gain factor and phase shift). Accordingly, each resulting element [α1s α2s α3s α4S] T of pBBS may be baseband symbol s multiplied by some complex weight α1. Digital beamformer 150 may then map each element of pBBs to a respective RF chain of RF system 152, which may each perform digital to analog conversion (DAC), radio carrier modulation, and amplification on the received weighted symbols before providing the resulting RF symbols to a respective element of antenna array 154. Antenna array 154 may then wirelessly transmit each RF symbol. This exemplary model may also be extended to a multi-layer case where a baseband symbol vector s containing multiple baseband symbols s1, s2, etc., in which case baseband precoding vector pBB may be expanded to a baseband precoding matrix pBB for application to baseband symbol vector s. In this case, α1, i=1, 2, 3, 4 are row vectors, and pBBs=[α1s α2s α3s α4s] T. Thus, after multiplying pBB and s, the overall dimension is the same as the overall dimension at the output of digital beamformer 150. The below descriptions thus refer to digital beamformer 150 as pBB and transmit symbol/vector as s for this reason while this model can be extended to further dimensions as explained.

By manipulating the beamforming weights of pBB, digital beamformer 150 may be able to utilize each of the four antenna elements of antenna array 154 to produce a steered beam that has a greater beamgain compared to a single antenna element. The radio signals emitted by each element of antenna array 154 may combine to realize a combined waveform that exhibits a pattern of constructive and destructive interference that varies over distances and direction from antenna array 154. Depending on a number of factors (including e.g. antenna array spacing and alignment, radiation patterns, carrier frequency, etc.), the various points of constructive and destructive interference of the combined waveform may create a focused beam lobe that can be "steered" in direction via adjustment of the phase and gain factors α1 of pBB. FIG. 2G shows several exemplary steered beams emitted by antenna array 154, which digital beamformer 150 may directly control by adjusting pBB. Although only steerable main lobes are depicted in the simplified illustration of FIG. 2G, digital beamformer 150 may be able to comprehensively "form" the overall beam pattern including nulls and sidelobes through similar adjustment of pBB.

In so-called adaptive beamforming approaches, digital beamformer 150 may dynamically change the beamforming weights in order to adjust the direction and strength of the main lobe in addition to nulls and sidelobes. Such adaptive approaches may allow digital beamformer 150 to steer the beam in different directions over time, which may be useful to track the location of a moving target point (e.g. a moving receiver or transmitter). In a mobile communication context, digital beamformer 150 may identify the location of a target User Equipment (UE) 158 (e.g. the direction or angle of UE 156 relative to antenna array 154) and subsequently adjust pBB in order to generate a beam pattern with a main lobe pointing towards UE 156, thus improving the array gain at UE 156 and consequently improving the receiver performance. Through adaptive beamforming, digital beamformer 150 may be able to dynamically adjust or "steer" the beam pattern as UE 156 moves in order to continuously provide focused transmissions to UE 156 (or conversely focused reception).

Digital beamformer 150 may be implemented as a microprocessor, and accordingly may be able to exercise a high degree of control over both gain and phase adjustments of pBB through digital processing. However, as shown in FIG. 1 for RF system 152 and antenna array 154, digital beamforming configurations may require a dedicated RF chain for each element of antenna array 154 (where each RF chain performs radio processing on a separate weighted symbol α is provided by digital beamformer 102); i.e. NRF=N where NRF is the number of RF chains and N is the number of antenna elements.

Hybrid beamforming solutions may apply beamforming in both the baseband and RF domains, and may utilize a reduced number of RF chains connected to a number of low-complexity analog RF phase shifters. Each analog RF phase shifter may feed into a respective antenna element of the array, thus creating groups of antenna elements that each correspond to a unique RF phase shifter and collectively correspond to a common RF chain. Such hybrid systems may thus reduce the number of required RF chains by accepting slight performance degradations resulting from the reliance on RF phase shifters instead of digital complex weighting elements.

In one embodiment the digital beam former provides a method of mitigating interference from interfering signals. The system tracks the location of interfering signals and readjusts the digital beam forming coefficients to create nulls in the antenna pattern directed towards that interfering signal. The digital beam forming coefficients are adjusted to improve or maximize the signal quality of communication signals received from the UEs. The UE provides the cell tower BS with quality indicators which indicate the quality of the signals received by the UE. In response to received link quality indicators, the digital beam former in the BS dynamically adjusts its antenna directionality and the antenna beam pattern to help optimize the signal transmitted to the UE. The digital beam forming coefficients are readjusted to continually help maintain and help improve or maximize the signal quality of the received signals as the UE and/or the cell tower change their relative positions. The digital beam former coefficients are adjusted to provide more antenna beams to geographic regions having high demand for communication services and also adjusted to provide fewer antenna beams to regions having a low demand for communication services. In the preferred embodiment, as the demand for communication services changes with respect to geographic location, the digital beam former dynamically assigns antenna beams or assigns additional beams in response to the changes in demand for communication services.

In another embodiment the UE receives a link quality indicator from a BS (or another UE) that it is communicating with. The link quality indicator (LQI) provides preferably 3 data bits indicating of the quality of the signal received at the BS. This link quality indicator is provided back to BS or UE which accordingly adjusts it's transmit digital beam forming coefficients dynamically to improve the quality of its transmitted signal. In this embodiment a local processor, DSP, or a neural network plane evaluates the link quality indicator and adjusts the beam forming coefficient provided to transmit digital beam forming network. In general this causes the transmit and receive antenna beam characteristics to be more optimized for the particular situation the UE is currently experiencing. The situation includes interference characteristics from other signals, interference characteristics caused by ground terrain and the specific receiver antenna characteristics of the receiving base station and/or satellite.

In another embodiment the UE tracks the communication signal from the base station and cell tower as the UE moves. This tracking is done by one of a variety of ways including using the receive signal and analyzing the angle or direction of arrival of the receipt signal. Alternatively, as the UE moves, the antenna beams, preferably both transmit and receive, are continually adjusted to help improve signal quality. Accordingly, the resulting antenna beam patterns are directed towards the communication station, while nulls are directed toward any interfering signal source. As the UE moves (or the small cell/cell tower moves), the antenna beam characteristics, through the use of the digital beam former, are adjusted to maintain improved communication with the BS and preferably remain directed towards the BS as the BS moves relative to the UE or vice versa.

Digital beam former of FIG. 2G provides for positioning of nulls in the antenna beam pattern and provides for beam shaping and other beam characteristics that are dynamically modified through the use of these digital beam forming techniques. In a preferred embodiment, the digital beam former provides dynamically reconfigurable antenna patterns based on current traffic demand levels. For example, one antenna beam provides broad coverage over a large region having a low demand for communication services, while other antenna beams are small and provide a high concentration of communication capacity in a region having high demand for communication services. In another embodiment, antenna beams are shaped in responsive to demand for communication services. Antenna beams are modified and shaped, for example, to approximate the contour of a geographic region having high demand for communication services next to an area having virtually no demand for communication services. Accordingly, communication capacity may be concentrated where it is needed. In the preferred embodiment, antenna beams are dynamically configured in real time in response to demand for communication services. However, in other embodiments of the present invention, antenna beams are provided based on historic and measured demand for communication services.

In one embodiment, the UE listens for signals, preferably within the small cell's footprint. Preferably, receive beam controller module configures the antenna beams to provides at least one broad antenna beam covering substantially an entire small cell footprint. Accordingly, signals are received from anywhere within that footprint on that one antenna beam. Signals that are received may include signals from existing users that are already communicating with the small cell system, interfering signals, e.g., signals from non-system users including interfering signals, and signals from system users requesting access to the system.

The neural network plane determines whether or not the signal is one from an existing user. In general, the location of existing users is known. If the signal received is not from an existing user, the system determines the location of that signal source. Those of skill in the art will recognize that various ways may be used to determine the geographic location of a signal source. Those ways may include analyzing the angle of arrival, the time of arrival, frequency of arrival, etc. Alternatively, if the signal source is a user requesting system access, that UE may provide geographic coordinates on its system access request signal.

Once the location of the signal source is determined the system determines whether or not the signal is an interfering signal. In other words, the system determines if the signal source will interfere with a portion of the spectrum assigned to the small cell system, or alternatively, if the interfering signal is a communication channel currently in use with a UE communicating with the small cell. If the system determines that the signal source is not an interfering signal and that the signal source is a request for a new channel, the system assigns an antenna beam to that user. The system may employ various security and access request procedures which are not necessarily important to the present description. Beam control modules then generate individual receive and transmit antenna beams directed to that UE at that UE's geographic location. The system preferably, repeatedly adjusts the DBF transmit and receive coefficients to help provide improved signal quality received from the UE.

In one preferred embodiment of the present invention the UE provides a link quality indicator (LQI) that indicates the quality of the received signal. The UE provides that link quality indicator to the small cell. The link quality indicator is evaluated causing transmit beam control module to adjust DBF control coefficients to help optimize the transmitted antenna beam to the UE.

When the system determines that the signal source is an interfering signal, for example a non-system user, the system calculates and adjust the receive DBF coefficients provided to receive DBF network 32 to help reduce or minimize interference from the interring signal. In one embodiment of the present invention, the system 118 places a "null" in the antenna pattern in the direction of the interfering signal. The interfering signal is continually monitored and tracked as either the UE moves or the interfering signal moves.

When the system has determined that the signal source is an existing user, the system determines when a hand-off is required. In some embodiments of the present invention the UE requests hand-offs while in other embodiments, the neural network plane determines when a hand-off is necessary. Preferably, hand-offs are determined based on signal quality. In general, a hand-off is requested when a user is near the edge of the antenna pattern footprint region or exclusion zone.

In one preferred embodiment of the present invention, antenna beams are individually provided to the UE and the individual antenna beam tracks the location of the UE. Accordingly, hand-offs are only between small cells and necessary at the edge of the small cell footprint. When a hand-off is necessary, the system assigns a new antenna beam from another small cell to the user. If a hand-off is not required, in-band interference is monitored along with received power level and link quality metrics.

In the system 132, the receive and transmits digital beam former (DBF) coefficients are adjusted to help maintain an improved or maximum signal quality, to help reduce or minimize in-band interference and to help maximize receive power level. During this "tracking" mode, additional interfering signals may cause a degradation in signal quality. Accordingly, the system dynamically readjusts the DBF coefficients to help maintain signal quality. In one embodiment of present invention link quality indicators are provided by BSs or UEs. Accordingly, the combination provide for tracking of the UE as the relative location between the UE and the small cell change. The system 34 determines when a hand-off is required. If a hand-off is not required the UE remains in the tracking mode. When the hand-off is required the system will execute a hand-off to the next small cell. In one embodiment of the present invention the next small cell is notified that a hand-off is required and it is provided the geographic location of the UE. Accordingly, the next small cell can assign and generate an antenna beam specifically for that UE before being released from its present small cell. Once the UE is handed off to the next small cell, the system adds the available antenna beam to its resource pool, allowing that antenna beam to be available to be assigned to another UE.

In another embodiment, the neural network plane determines the location of high demand and low demand geographic regions and this can be accomplished in any number of ways. For example, each UE communicating with the system has a geographic location associated therewith. Furthermore, each UE requesting access to the system may provide the system with geographic location data. Once the geographic locations of high demand and low demand areas are determined, the system causes the DBF beam control modules to provide less antenna beams in low demand areas and provide more antenna beams in high demand areas. In one embodiment of the present invention, each antenna beam provides a limited amount of communication capacity.

Low demand areas are provided with antenna beams having a much larger coverage region than antenna beams being provided to high demand areas. For example, antenna beam covers a large geographic region that currently has a low demand for communication services. Alternatively, antenna beams have much smaller geographic coverage regions and provide more communication capacity for a region that currently has a high demand for communication services. In another embodiment of the present invention the systems adjust the shape of the antenna beams based on the demand for communication services. For example, antenna beams can be long narrow beams formed to provide better area coverage for communication services.

As the demand for communication services changes, antenna beams are dynamically provided in response. As the day begins, antenna beams are initially at homes. As the day progresses, the antenna beams transition to office locations as the time of day changes in response to demand for communication services. In the case of a natural disaster where demand for communication services may be particularly great, dedicated antenna beams may be provided. A small cell control facility may direct small cell's digital beam former to allocate beams accordingly. In general, antenna beams preferably are provided in response to the changing demand of communication services using the neural network plane without the assistance of operators.

Figure 2H:
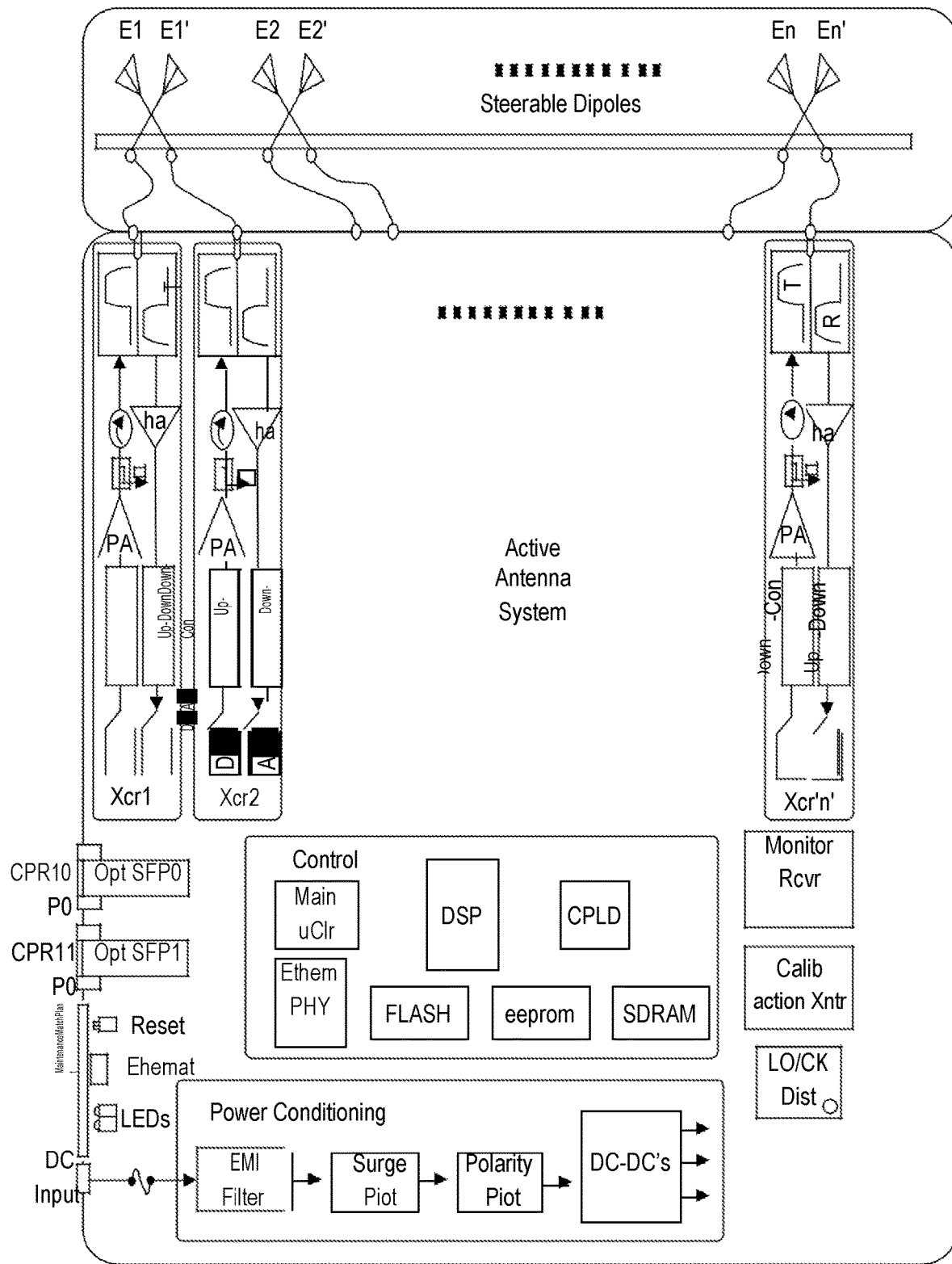
FIGS. 2H-2J show exemplary antenna systems.
Figure 2I:
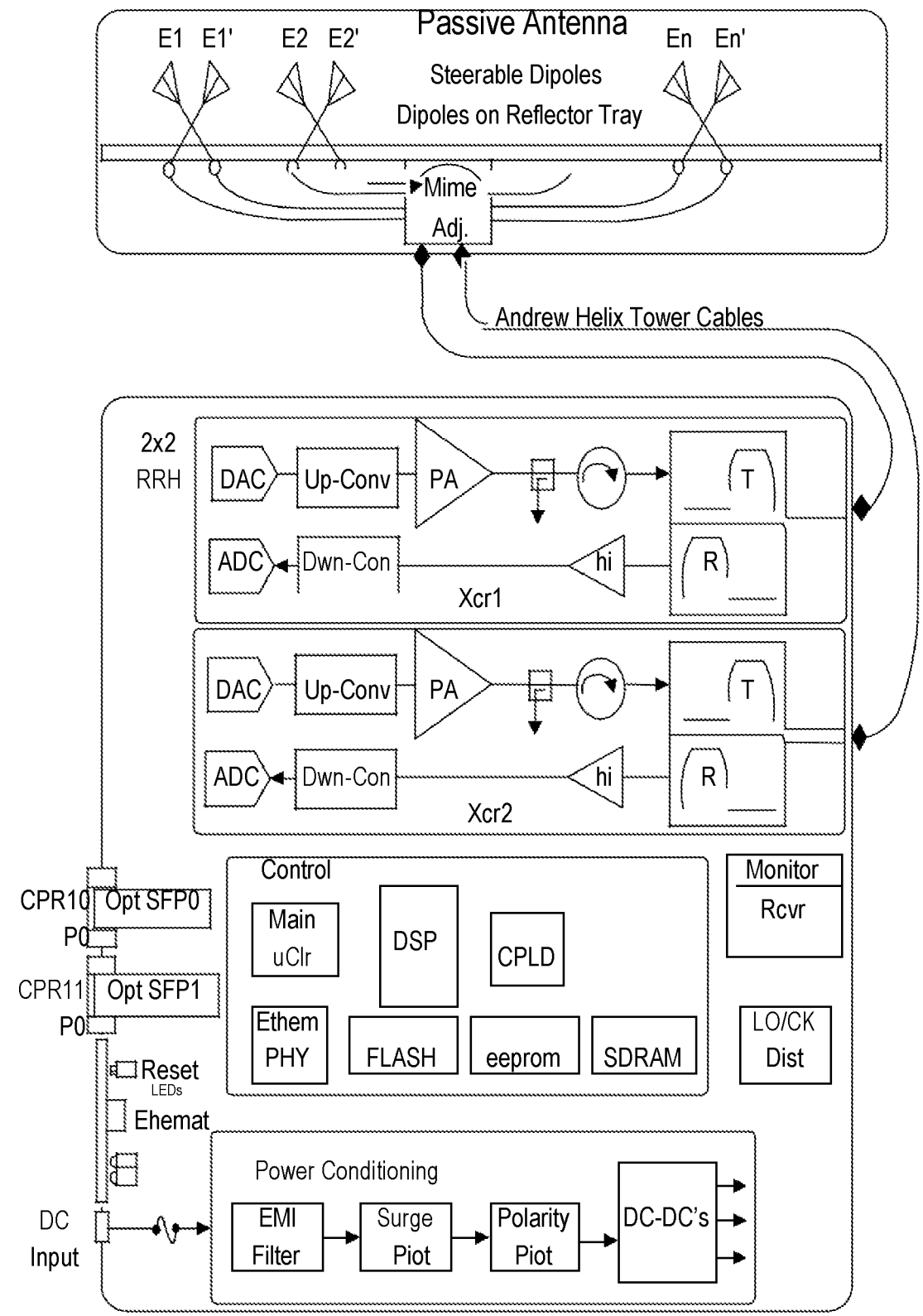

FIG. 2H-2I shows an exemplary active antenna system (AAS) and a remote radio head (RRH) connected to a baseband unit with a high-speed serial link as defined by the Common Public Radio Interface (CPRI), Open Base Station Architecture Initiative (OBSAI), or Open Radio Interface (ORI). The high speed serial link is used to transport the Tx and Rx signals from the BBU to the RRH or AAS. In an RRH, the downlink (Tx) signal is digitally upconverted and amplified on the downlink path. Correspondingly the analog uplink (Rx) signal is processed by a low noise amplifier (LNA), downconverted and digitized. The duplexed outputs from the RRH feed a passive antenna array via a corporate feed network with RET support. The RRH comprises two transceivers, one for each MIMO path. Each transceiver incorporates an upconverter, an amplifier, an LNA, a downconverter, and a duplexer.

In an active antenna, each element in the antenna array is connected to a separate transceiver element. A typical AAS system may therefore have multiple transceivers (for example 8-16). Since there are many more transceivers/amplifiers in an AAS, each amplifier in an AAS delivers a much lower power when compared to an amplifier in an equivalent RRH. The benefits of AAS over an RRH based site architecture include: site footprint reduction, distribution of radio functions within the antenna results in built-in redundancy and improved thermal performance, and distributed transceivers can support a host of advanced electronic beam-tilt features that can enable improvements in network capacity and coverage. The integration of the radio within the antenna is the elimination of components like cables, connectors, and mounting hardware and an overall reduction in the physical tower space required. By integrating the remote radio head functionality into the antenna, the aesthetics of the site can be improved and wind load reduced, resulting in lower leasing and installation costs.

The active antenna architecture can eliminate a substantial portion of the power losses in the RF feeder cables when compared to a conventional BTS. Additionally, the active antenna can support an electronic beam tilt without requiring a Remote Electrical Tilt (RET) feeder network. This further reduces the power loss for an AAS when compared to an RRH with a RET. In most configurations this can increase the power delivered to the antenna when compared with an RRH. The additional margin can be used to lower the overall thermal dissipation in the amplifiers.

Further, with the radios integrated directly into the antenna housing, and with replacement of a small number of large amplifiers with many small amplifiers, the heat is spread over the larger antenna structure as opposed to the smaller RRH or amplifier shelf. This availability of higher surface area for heat dissipation results lower temperature rises in the components, which results in improved thermal margins and better reliability.

The distributed and redundant architecture of the AAS, wherein each antenna element is fed by its own transceiver, provides reliability benefits as the failure of one transceiver does not cause a critical failure. The system is intelligent and can sense a transceiver failure. When a transceiver does fail, the amplitude and phases on the remaining elements are automatically adjusted digitally to compensate for the elevation beam distortion and the reduction of EIRP on the horizon. With the appropriate sizing of the amplifiers and intelligent readjustment of the amplitudes and phases, the AAS can be designed to have minimal or no loss in coverage performance with a single transceiver failure and minimal degradation with two transceiver failures. Since the likelihood of more than one transceiver failing in a single AAS is minimal, very high system availabilities can be achieved.

Since the AAS can be designed to have minimal loss in performance with a single transceiver failure, repairs and site upgrades for failed units can be delayed and scheduled. For a site with several sectors and bands, multiple unscheduled repair visits (as would be the case for an RRH based system) can be replaced by a single scheduled visit that is less frequent. This can significantly reduce the operational costs for operators.

The AAS can electronically tilt elevation beams by having independent baseband control of the phase, amplitude, and delay of individual carriers on each antenna element. This supports multi-mode systems where different carriers in the same frequency band, with different air interfaces, may require different tilt orientations. The flexibility with tilt control in AAS enables advanced RF planning features, much of which can potentially reduce the cost to operators by reducing the number of sites required. The electronic tilt capability also allows for the separate beam tilting and optimization of the Tx (downlink) and Rx (uplink) paths for cases when the link budgets for the Tx and Rx paths are unequal. It may also be used to optimize cell radii when the physical layer (modulation scheme) for the Tx and Rx paths is different, as is the case with LTE. Tilt can be adjusted on a per-carrier basis. This can be used vertical sectorization in LTE and RAN sharing for UMTS. In UMTS/LTE networks, adding sectors in the vertical plane can be done where the first carrier may cover an inner sector whereas a second carrier covers an outer sector.

As multiple operators vie for precious real estate on tower tops, antenna sharing and RAN sharing amongst two or more operators can be done. The RAN that supports a multicarrier UMTS system is shared by two operators with each operator controlling/owning one or more of the individual carriers. Since the RF planning and site deployments are likely to differ among operators, each UMTS carrier may need to be tilted by different amounts in order for each operator to achieve optimal network performance and optimizing beam tilt on a per-carrier basis based on active channel loading using Self-organizing networks (SON) algorithms can provide even higher network efficiencies.

Figure 2J:
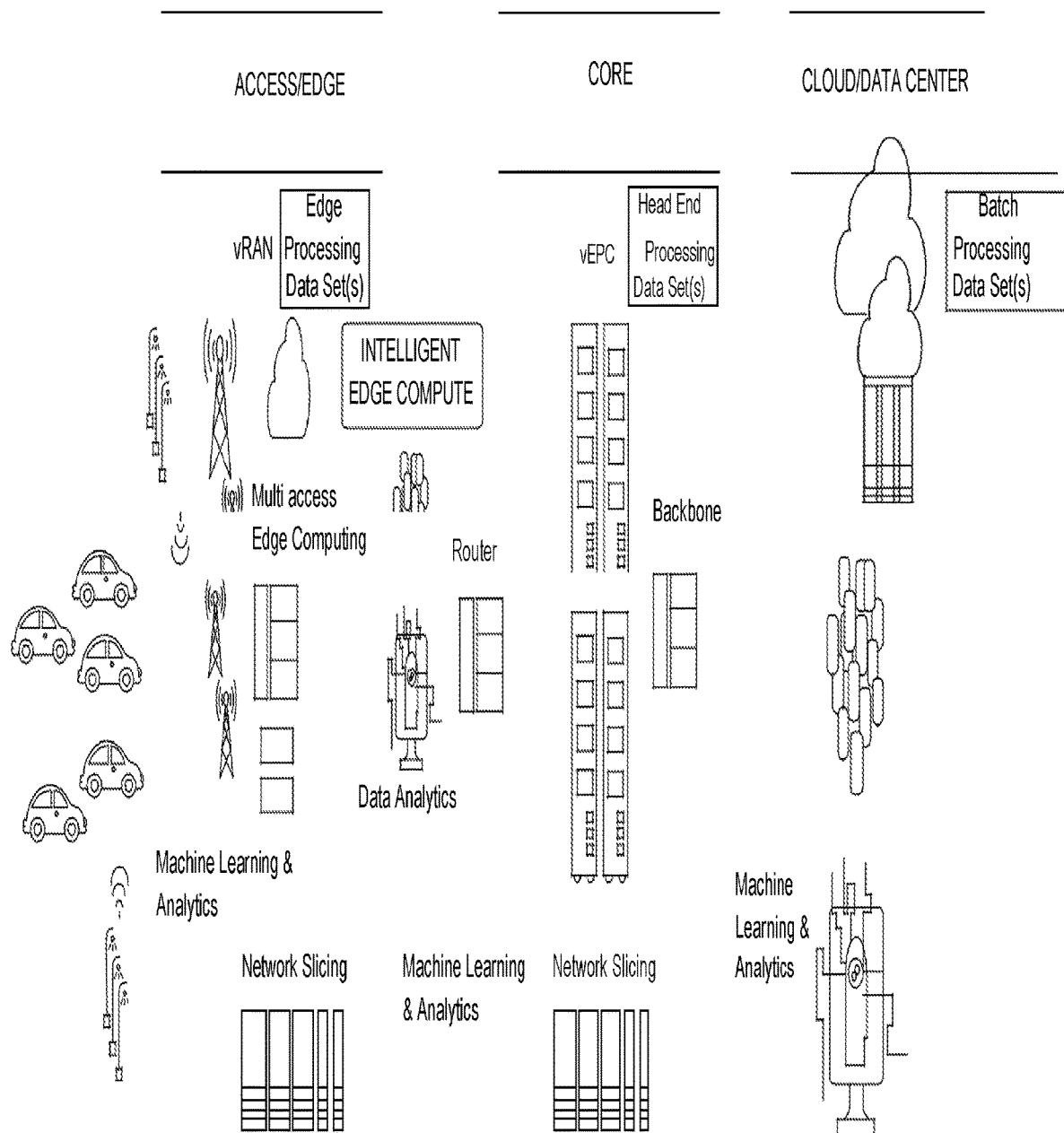
Figure 2K:
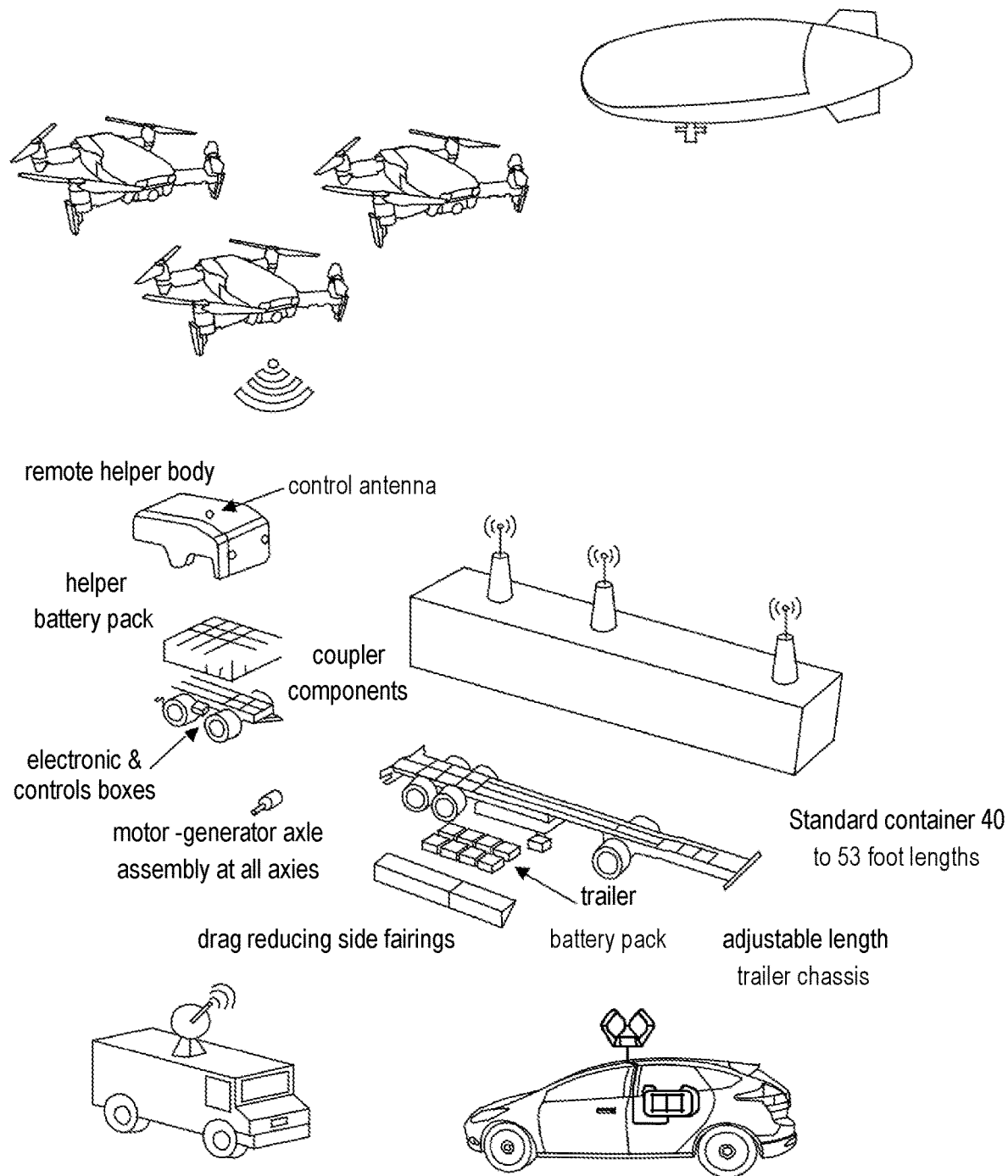
FIG. 2K shows exemplary vehicles that can be used to supplement 5G services as mobile 5G cell towers.

FIG. 2J shows exemplary vehicles that can be used to supplement 5G services as mobile 5G cell towers. For example, drone arrays can be set up to beam signals to client devices and carry 5G active antennas to allow the BS to communicate with the UEs. On the air, balloons/planes/helicopters, and even LEOs can be used to provide radio communications to the client devices with the 5G active antennas to allow the BS to communicate with the UEs. On the ground, trucks/buses/vans/cars can provide mobile 5G radio support. Such ground vehicles can use elevatable antenna that extends to increase height to the 5G active antennas to allow the BS to communicate with the UEs.

In one embodiment, a hybrid lighter than air/heavier than aircraft or air vehicle can be used as a Geostationary balloon satellites (GBS) are atmosphere analogues to satellites at a fixed point over the Earth's surface and the GBS can carry 5G active antennas to allow the BS to communicate with the UEs. In one embodiment, the lighter than air gas can be helium to ascend, and an airbag that compresses air to allow the drone to descend. Alternatively air can be liquified using ultra low temperature refrigeration such as LN2 cryogenic refrigeration. Solar cells provide energy for the GBS, and the hybrid air propulsion system spends about half of its time as heavier than air and half of its time as lighter than air vehicle to provide propulsion using variable buoyancy propulsion to allow the balloon to move into and maintain its position with minimal power consumption. In another embodiment, in addition to solar panels the GBS can receive laser power from a ground device that the GBS hovers over. Antennas would be auto-steered to aim directly at UEs they communicate with. In yet another GBS embodiment, an autonomous variable density, variable volume articulated aircraft has an aircraft body including a section defining a contractible and expandable aircraft body in cross section, a storage tank fixed to the aircraft body, a mass of first gas having a density less than air within one of the chambers, a medium for readily absorbing large masses of the first gas within the storage tank to appreciably reduce the volume of the one chamber carrying the gas, the amount of the first gas and the absorbing medium being sufficient to permit a change in density of the aircraft from lighter than air to heavier than air and vice versa, a pump to transporting the first gas from the one chamber to the tank absorption thereof, and a pump for selectively driving the gas from the absorbing within the tank to the one chamber for increasing the volume of gas within the compartment and the size of the aircraft body and reduction in density of the aircraft. In one embodiment, the medium for absorbing the first gas comprises water, the aircraft further comprising conduit fluid connecting the one chamber to the storage tank, pump provided within the conduit means for pumping gas from the one chamber to the storage tank and the conduit terminating in a gas diffuser within the tank submerged within the water. One embodiment drives the gas from the absorbing medium with a heater operatively positioned with respect to the tank for heating the solution formed by the water absorbing the first gas to release the gas from the liquid.

In another aspect, a drone can be used to supply the GBS with power. In one embodiment, the drone can swap battery with the GBS. In this embodiment, the GBS has a plurality of energy sources including at least one battery port or chamber having a latch to secure the battery to the GBS. A drone brings up a battery unit near the battery port of the drone, unlatches or unscrews the depleted battery and stores the depleted battery into a chamber. Lowering the battery can disconnect one or more couplings. One or more other disconnects can be used in some implementations. For example, separate quick disconnects can be used for respective high-voltage connection, low-voltage connection and a coolant connection. When the battery is successfully mounted onto the GBS, any quick disconnects on the GBS are then properly connected with corresponding disconnects on the new battery pack. This can ensure proper connection of high voltage, low voltage and liquid coolant to the GBS. For example, the GBS's internal system can check whether there is any water intrusion into the battery pack, or whether there are any short circuits. A replacement battery is then positioned in the exposed battery chamber, and arms on the drone secure the latch to seal the battery chamber. The refueling drone can detach from the GBS and goes to the next battery to be swapped on the GBS, and if done, the drone can return to a home station.

In another embodiment, the GBS is powered by hydrogen fuel cells, and the drone can refuel the GBS with gas or hydrogen fuel. Prior to flying to the GBS to refuel it, the internal hydrogen storage tanks in the refueling drone must be filled. A hydrogen storage subsystem is provided within the transportable hydrogen refueling station to refill or charge the lightweight composite hydrogen storage tanks, a quick connect, which can be any standard hydrogen connector, is used to connect an external hydrogen source to hydrogen storage subsystem. Downstream from the quick connect is a pressure release valve. The pressure release valve is a safety element to prevent hydrogen, at a pressure exceeding a pre-determined maximum, from entering the hydrogen storage subsystem. If the pressure of hydrogen being introduced through the quick connect exceeds a safe limit a restricted orifice working in combination with a pressure relief valve causes the excess hydrogen to be vented through a vent stack. In general, the valves are used to affect the flow of hydrogen within the refueling station. A check valve, between the vent stack and pressure relief valve, maintains a one way flow of the flow of pressurized hydrogen being relived from the storage subsystem. The restrictive orifice also prevents the hydrogen from entering the pressure rated feed line at a rate which causes extreme rapid filling of the lightweight hydrogen storage tanks. Prior to connecting the quick connect nitrogen gas, or other inert gas can be introduced into the feed line to purge any air from the feed line. Pressurized nitrogen dispensed from a nitrogen tank can be introduced through a nitrogen filling valve. One or more hydrogen leak sensors are also distributed and connected to the system controller. The pressure of the gaseous hydrogen is measured by one or more pressure sensors placed in the feed line. The first compressor subsystem contains an oil cooled first intensifier. An oil to air heat exchanger for cooling hydraulic oil which is supplied to a first intensifier heat exchanger to cool the first intensifier. The intensifier is a device, which unlike a simple compressor, can receive gas at varying pressures and provide an output stream at a near constant pressure. However, it may be suitable in some cases to use a compressor in place of an intensifier. The pressure of gaseous hydrogen which enters a second compressor subsystem at about 4,000 psi can be increased to achieve the desired 10,000 psi. The system controller can be used to maintain balance during the refilling of the lightweight composite hydrogen storage tanks by monitoring the pressure of each of the lightweight composite hydrogen storage tanks via adjacent pressure sensors. The system controller, in turn can switch between storage tanks and select which tank to fill at a given time interval during the filling.

The refueling drone can be used for refueling from the high pressure tanks. The hydrogen fueling subsystem is used to refuel an external hydrogen storage vessel in the GBS with pressurized hydrogen from the refueling drone. As the refueling begins after the system controller will check pre-identified parameters, such as, temperature and pressure of the external hydrogen storage vessel, confirmation of ground connection and in some cases, confirmation from vehicles of readiness to fill, in order to determine whether hydrogen should be dispensed to the external hydrogen vessel. The actual hydrogen refueling process can be preceded by safety measures. Pressurized nitrogen, or other inert gas, may be introduced through a purge line into the hydrogen dispensing feed lines to purge any air from the hydrogen dispensing feed lines. The purge is to manage the risk of dangerous hydrogen-air (oxygen) mixtures being formed and or being supplied to the external hydrogen vessel. Purge pressure relief valves are appropriately located to vent gas from the hydrogen dispensing feed lines. One proposed industry standard for a fuel cell vehicle fill coupler is described in the proposed "Fueling Interface Specification" prepared by the California Fuel Cell Partnership that description which is hereby incorporated by reference. The fill coupler, indicated in the proposed "Fueling Interface Specification", has a "smart" connect which, among other parameters, checks the pressure, temperature and volume of hydrogen within the tanks of a vehicle 12 (the external hydrogen storage vessel 25) being refueled. It will also check that the vehicle is grounded. The "smart" fill coupler can communicate with the refueling drone and after the external hydrogen vessel and the fill coupler are connected, recharging or filling of the hydrogen receptacle can occur. When refueling or recharging an external hydrogen storage vessel preferably a map of the external hydrogen vessel should be obtained. A map should check the temperature, volume and pressure of the hydrogen gas in the external hydrogen vessel and the volume pressure and temperature of the hydrogen in each lightweight composite hydrogen storage tanks and the map may include information about the pressure rating and capacity of the external hydrogen vessel. By controlling the temperature of the hydrogen gas during refueling a faster refueling can take place. If the temperature of the hydrogen in the external hydrogen vessel increase past ambient the volume of hydrogen which the external hydrogen vessel can store is decreased. Temperature management supports faster dispensing of dense gaseous hydrogen.

Preferably, the refueling drone designed for boom-type transfers in which a boom controller extends and maneuvers a boom to establish a connection to transfer hydrogen fuel from the refueling drone to the refueling drone. Prior to refueling, the refueling drone extends a refueling probe. The refueling probe 106 when fully extended, may be long enough for the refueling drone to safely approach and connect to the refueling probe. The distal end of the refueling probe connects to a receptacle 108 on an exterior of the refueling drone.

The refueling drone needs to be able to maneuver into position for aerial refueling and maintain its position during the refueling. The refueling drone includes a navigation system that may be used for positioning the refueling drone during aerial refueling. The GBS navigation system provides inertial and Global Positioning System (GPS) measurement data to the refueling drone via a data link. The navigation system then uses the inertial and GPS data for both the refueling drone and the GBS to compute a relative navigation solution, otherwise referred to as a relative vector. Preferably, the relative navigation solution is a GPS Real-Time Kinematic (RTK)/INS tightly coupled relative navigation solution. The relative navigation solution is calculated based on what data is available to the navigation system and allows the GBS to accurately and confidently maintain its relative position to the refueling drone. The navigation system includes an Inertial Navigation System (INS), a GPS, a navigation processor, and a system processor. The navigation system may have other sensors, such as magnetometer, an air data computer, and antennas for the data link and the GPS sensors. The INS may provide acceleration and angular rate data for the refueling drone. The refueling drone may include a similar INS for generating inertial data to be transmitted to the refueling drone. Typically, the INS relies on three orthogonally mounted acceleration sensors and three nominally orthogonally mounted inertial angular rate sensors, which can provide three-axis acceleration and angular rate measurement signals. For example, the INS may include three accelerometers and three gyroscopes. The three accelerometers and three gyroscopes may be packaged together with a processor, associated navigation software, and inertial electronics. The inertial electronics may be used to convert the acceleration and angular rate data into a digital representation of the data. The type of relative navigation solution provided by the system processor depends on the type of data available to the system processor. The relative position may be a simple difference of the platform (i.e., the GBS and the refueling drone) reported PVTs of a uniquely derived integrated relative GPS/INS solution. The types of platform navigation solutions include a GPS-only solution, a loosely coupled GPS/INS solution, and a tightly coupled GPS/INS solution that incorporates any combination of the other solutions. In addition to the platform PVT solutions, measurement data from both platforms may also available and be used to compute the relative solution independently of the PVT solutions being provided by each platform. It is important to note that the relative navigation solution is not limited to these solutions. For example, the relative navigation solution may also be an ultra-tightly coupled solution. The relative vector is calculated using the available data and processing techniques. A fixed solution is possible when a double difference (DD) process is able to confidently resolve the carrier phase DD integer ambiguities. A float solution is available when there exists five or more common sets (i.e., common to the GBS and the refueling drone) of GPS pseudorange and carrier phase. Relative GPS (RGPS) refers to a GPS-based relative solution that does not take into account the inertial measurement data from either the GBS or the refueling drone. Coupled or blended solutions integrate the available data (both GPS and INS) to form a relative vector between the GBS and the refueling drone. Depending on the distance between the refueling drone and the GBS, and the data link message content, the refueling drone selects the best available solution for relative navigation. The required level of performance, in terms of accuracy and integrity, is a function of the level of safety required for navigation. In general, the closer the GBS is to the refueling drone, the more accurate the relative navigation solution should be to avoid an unanticipated collision, while maintaining the refueling position. The protection levels associated with the relative vector are a function of the type of measurements available for processing and the confidence in those measurements from the GBS to the refueling drone. The protection levels associated with the relative vector may also be a function of the range from the GBS to the refueling drone. With multiple sets of measurement data, it is possible to calculate several relative navigation solutions. For example, if the refueling drone has three EGI systems on board and the GBS has two EGI systems on board, the system processor may form up to thirty independent relative navigation solutions. The multiple navigation solutions may be compared. If one or more of the navigation solutions is not consistent with the other navigation solutions, the system processor 208 may discard the inconsistent relative navigation solutions. In this manner, the failure of a GPS receiver and/or an inertial sensor may be detected and isolated by the system processor 208. A threshold for identifying inconsistent navigation solutions may be adjusted based on the requirements of aerial refueling. Aerial refueling requirements may be set by one or more regulatory agencies.

In one embodiment, a plurality of relative navigation solutions is calculated by the system processor. A flock of bird approach may be used. The type of relative navigation solution can vary based on the data available to the system processor. The number of relative navigation solutions calculated depends on the number of EGI systems on board the GBS and the refueling drone, and the currently available data from each sensor. Preferably, each of the solutions has the same baseline (assumes lever arms between EGI systems and accompanying GPS antennas). Next, the relative navigation solutions are compared with each other. The comparison detects whether any of the relative navigation solutions is inconsistent with the other solutions. An inconsistent solution may be an indication that one or more of the GPS receivers and/or inertial sensors is malfunctioning. The consistency information may be used to form a protection level for the relative navigation solution. The relative navigation solutions are compared to a threshold, such as the protection level determined by the consistency information. At block 308, if a particular relative navigation solution exceeds the threshold, the system processor 208 discards the solution. Otherwise, at block 310, the solution is used to navigate the refueling drone during aerial refueling. As a result, the refueling drone may safely and efficiently rendezvous with the GBS for aerial refueling.

In another embodiment, a kite can be tethered to a ground station and carry 5G active antennas to allow the BS to communicate with the UEs. The kite can carry propeller engines to provide propulsion if needed. The cable tethering the kite to the ground station supplies power and fiber optic broadband communication for the 5G active antennas to allow the BS to communicate with the UEs.

In another aspect, a moveable vehicle including a pole and a top portion to mount 4G antennas and a 5G housing, wherein the pole is retractable and extendable during 5G operation; and one or more antennas mounted on the 5G housing and in communication with a predetermined target using 5G protocols.

In another aspect, a system includes an airborne frame to mount 4G antennas and a 5G housing; and one or more antennas mounted on the 5G housing and in communication with a predetermined target using 5G protocols.

The system may include one or more of the following:

A processor can control to change the curvature of the surface and/or to change the directionality of the antenna.

The processor can calibrate the RF link between the tower and the client device.

The processor can calibrate the connection by examining the RSSI and TSSI and scan the moveable lens until the optimal RSSI/TSSI levels (or other cellular parameters) are reached.

The scanning of the target client/device can be done by injecting or removing liquid from moveable surface, or can be done by moving actuators coupled to the surface.

Opposing pairs of lenses can be formed to provide two-sided communication antennas.

An array of actuator/antenna can be used (similar to bee eyes), each antenna is independently steerable to optimize 5G transmission.

Fresnel lens can be used to improve SNR.

The focusing of the 5G signals to the target client/device can be automatically done using processor with iterative changes in the orientation of the antenna by changing the curvature or shape of the surface until predetermined criteria is achieved such as the best transmission speed, TSSI, RSSI, SNR, among others.

A learning machine such as neural network or SVM can be used over the control/management plane of the 5G network to optimize 5G parameters based on local behaviors.

A movable surface can be provided on the housing to steer the antenna. The moveable surface can be liquid lens or actuator array as described above.

Cameras and sensors can be positioned to capture security information.

Learning machine hardware can provide local processing at the edge.

The air frame has an antenna support structure having means to permit its collapsing and a waveguide antenna mounted to said support structure and including a plurality of integrally connected tubular waveguide cells that form a cell array that focuses transmitted signals onto a signal processing device; said lens waveguide antenna having means to permit its collapsing and a second support structure mount that operatively connects said collapsible support structure to a mounting surface to correctly position said collapsible lens waveguide antenna relative to said signal processing device when said antenna is operationally deployed.

A fleet of drones can operate and navigate as a flock of birds to provide real time adjustment in coverage as needed. The flock of birds antenna has power and autonomous navigation and can self-assemble and scatter as needed to avoid physical and wireless communication obstacles.

The cars/trucks/buses can carry ads as a monetization system. Alternatively, personal vehicles can be paid a percentage of the traffic relayed by their vehicles.

Turning now to the details of the antenna that converts electric currents into electromagnetic waves and vice versa, the antenna can be considered a complex resistive-inductive-capacitive (RLC) network. At some frequencies, it will appear as an inductive reactance, at others as a capacitive reactance. At a specific frequency, both reactance's will be equal in magnitude, but opposite in influence, and thus cancel each other. At this specific frequency, the impedance is purely resistive and the antenna is said to be resonant. The frequency of the electromagnetic waves is related to the wavelength by the well-known equation $\lambda = c/f$, where f is the frequency in hertz (Hz), $\lambda$ is the wavelength in meters (m), and c is the speed of light ($2.998 \times 10^8$ meters/second). Since resonance will occur at whole number fractions ($\frac{1}{2}$, $\frac{1}{3}$, $\frac{1}{4}$, etc.) of the fundamental frequency, shorter antennas can be used to send and recover the signal. As with everything in engineering, there is a trade-off. Reducing the antenna's size will have some impact on the efficiency and impedance of the antenna, which can affect the final performance of the system. A half-wave dipole antenna has a length that is one-half of the fundamental wavelength. It is broken into two quarter-wave lengths called elements. The elements are set at 180 degrees from each other and fed from the middle. This type of antenna is called a center-fed half-wave dipole and shortens the antenna length by half. The half-wave dipole antenna is widely used as it cuts the antenna size in half while providing good overall performance. The dipole antenna can have one of the quarter-wave elements of a dipole and allow the ground plane on the product's pc board to serve as a counterpoise, creating the other quarter-wave element to reduce size. Since most devices have a circuit board, using it for half of the antenna is space efficient and can lower cost. Generally, this half of the antenna will be connected to ground and the transmitter or receiver will reference it accordingly. This style is called a quarter-wave monopole and is among the most common antenna in today's portable devices. Another way to reduce the size of the antenna is to coil the element. This is where the straight wire is coiled or wrapped around a non-conductive substrate to create a helical element. This has the advantage of shortening the apparent length, but it will also reduce the antenna's bandwidth. Like an inductor, the tighter the coil and the higher the Q, the smaller the bandwidth.

It is stressed, however, that the present system is not limited to dipole elements, but rather any suitable structure can be utilized. Crossed dipoles are used in many mobile base station antennas to provide orthogonal, dual linear polarization for polarization diversity. The lens may be fed by any style of radiating antenna element such as the patch antenna, open-ended waveguide antenna, horn antenna, etc. Generally, low gain antennas are selected as feed elements for the spherical lens in order to maximize the lens efficiency and the directivity of the secondary radiation beam. The present invention is also capable of operating with multiple polarizations thanks to the spherically symmetric nature of the dielectric lens. The radiating antenna elements may exhibit single linear, dual linear, or circular polarization. Multiple polarizations may be important for future 5G systems where polarization selection may be different depending on the operating frequency and the intended user. Therefore, the multi-beam antenna should perform sufficiently no matter the desired polarization with a minimum of 20 dB isolation between orthogonal polarizations.

In one embodiment, a half-wave dipole antenna receives a radio signal. The incoming radio wave (whose electric field is E) causes an oscillating electric current within the antenna elements, alternately charging the two sides of the antenna positively (+) and negatively (−). Since the antenna is one half a wavelength long at the radio wave's frequency, the voltage and current in the antenna form a standing wave. This oscillating current flows down the antenna's transmission line through the radio receiver (represented by resistor R).

The antenna can be crossed dipole elements. In one illustrative non-limiting embodiment in FIG. 3A, the elements 111 are fabricated from double sided printed circuit board (PCB) material where the +45° dipole PCB material 112a is positioned substantially orthogonal (90°) with respect to the −45° dipole PCB material 112b. Thus as best shown in FIG. 3B, the first portion 112 extends substantially orthogonal to the second portion 114 to form a general T-shape. The first portion 112 is coupled with and extends substantially orthogonal to the inner platform surface 124. The second portion 114 is coupled with the first portion 112 and extends substantially parallel to and spaced apart from both the inner platform surface 120 and the outer lens body surface 104. The focal surface 130 is aligned with the phase center of the element feeding the lens. As shown, the focal surface 130 can be aligned with the middle of the second portion 114, though need not be aligned with the middle of the second portion 114. The particular PCB material may be chosen from a plethora of available materials, but the material is generally chosen to have a dielectric constant value in the range of $\varepsilon_r$=2-5 with a low dielectric loss tangent. For example, a suitable material would be Arlon 25N with a dielectric constant $\varepsilon \approx 3.38$ and a loss tangent tan $\delta \approx 0.0025$. The dipole arms 114a/114b and the baluns 116a/116b are generally copper and can be formed by etching or milling away the copper cladding from the PCB material. The dipole arms 114a/114b form the radiating structures for the antenna while the baluns 116a/116b provide a transition from the feed network generating the proper phase on each dipole arm as those skilled in the art can appreciate. Any suitable structure and arrangement for the baluns 116 can be utilized. Instead of the PCB material, the electrically conductive material used in the antenna can be made of or include an electrically conductive fabric, which can include any kind of electronic textile or "e-textile". E-textiles can include any textile that can be applied to the physical manipulation of electrical or electromagnetic signals or radiation; most often, this is associated with devices that incorporate one or more electronic devices. Conductive fabric used in the manufacture of c-textiles can have a surface resistance ranging from a low of about 0 $\Omega$/sq. to a high of about 1 $\Omega$/sq. and can provide at least partial shielding and/or at least partial blocking of electromagnetic wave transmission or radiation. Many methods for construction of these conductive fabrics exist, such as weaving metal, metalized fiber strands, or other conducting fabric strands into non-conductive fabric. Another method for constructing conductive fabrics includes spraying and/or painting conductive material onto a base layer, where the base layer is usually non-conductive. Metals that can be used in the construction of electronic textiles can include, but are not limited to, copper, nickel, gold, silver, steal, zinc, tin, tungsten, iron, iridium, aluminum, alloys thereof, or other conductive elements. Metalized fiber strands can include polymers coated with metal. Other conducting fabric strands can include electrically conducting polymers or plastics. Electronic textiles can include multiple metalized fibers wrapped together to form electrically conductive strands. Electronic textiles can include nano-tubes or other Nano-particles that have advanced electronic function. In another embodiment, the electrically conductive region 130 can be made using metal meshes, such as a copper wire or gold wire mesh. Just as there can be many different means to creating conductive fabrics for use with c-textiles, numerous non-conductive materials can be used in conjunction with the aforementioned conductive materials. Suitable non-conductive materials can include, but is not limited to, nylon, NOMEX®, KEVLAR®, aromatic polyamide polymers, polyester, cotton, Rip-stop nylon, canvas, other common textiles or materials having bulk electrical properties fitting the description a good non-conductor, or combinations thereof. The non-conductive material can be in the form of a web having air or a vacuum dispersed through non-conductive strands.

The antenna element 111 can be a spring-like material, which may be described as any elastic body or device that recovers its original shape when released after being distorted. The spring-like material of the antenna can be deformable and can be conductive, non-conductive, or partially conductive and partially non-conductive. For example, the spring-like material can include, but is not limited to, plastic, metal, rubber, fiber, fiberglass, carbon, carbon-glass composites, or a combination thereof. Other materials that can be used in the support member include shape memory allows, shape memory polymers, or a combination thereof. Suitable shape memory alloys can include, but are not limited to, Ag—Cd 44/49, Au—Cd 46.5/50, Cu—Al—Ni, Cu—Sn, Cu—Zn, Cu—Zn—Si, Cu—Zn—Al, Cu—Zn—Sn, Fe—Pt, Mn—Cu 5/35, Fe—Mn—Si, Pt alloys, Co—Ni—Al, Co—Ni—Ga, Ni—Fe—Ga, Ti—Pd, Ni—Ti, Ni—Mn—Ga, Fe—Ni, Fe—Pt, Fe—C, Fe—Ni—C, Fe—Cr—C, Au—Mn, In—Tl, In—Cd, In—Pb, Fe—Pd, Ni—Al, Ti—Mo, Ti—V, Cu—Al, Ti—Ta, or combinations thereof.

In one embodiment, to increase SNR, a screen is placed between a transmitter and a receiver. The screen can be used with one or more electrically conductive regions for reflecting electromagnetic radiation and one or more non-conductive regions for permitting electromagnetic radiation therethrough. The one or more electrically conductive regions can be disposed adjacent to at least one of the one or more non-conductive regions. The apparatus can also include a support member disposed about at least a portion of the screen. In another embodiment, a method for enhancing the gain of a wireless signal can include activating a wireless communication link to produce a wireless signal. The method can also include placing a Fresnel lens in the transmission path. The Fresnel lens can include a screen having one or more electrically conductive regions for reflecting electromagnetic radiation and one or more non-conductive regions for permitting electromagnetic radiation therethrough. The one or more electrically conductive regions can be disposed adjacent to at least one of the one or more non-conductive regions. The Fresnel lens can also include a support member disposed about at least a portion of the screen. The method can also include amplifying the wireless signal with the Fresnel lens by cancelling out at least a portion of one or more out-of-phase regions of the wireless signal. The Fresnel lens through its one or more screens can cancel or block at least a portion of an out-of-phase radiated field produced by the transmission source, at any instant of time, passing through a planar cut that is orthogonal to the transmission path. The cancellation of the out-of-phase radiation can be accomplished by insertion of the electrically conductive region of the Fresnel lens' one or more screens, such that it blocks or covers one or more Fresnel zone regions at a predetermined distance from the transmission source in the transmission path. Any transmission from a source or transmitter, such as the transmission source, can produce both in-phase and out-of-phase radiation defined by Fresnel zones. Fresnel zones can be concentric ellipsoids of revolution that define volumes of in-phase and out-of-phase radiation from the transmission source. The first Fresnel zone region can bound in-phase radiation and the second Fresnel zone region can bound out-of-phase radiation. Placing the Fresnel lens at the predetermined distance and at a predetermined angle relative to a transmission or receiver source can result in gain enhancement, focusing of radiated energy from the transmission source, signal improvement at the receiver relative to that of a communication link without the Fresnel lens, or any combination. This result can be accomplished, at least in part, by cancelling the out-of-phase radiation in Fresnel zone region. The predetermined angle may be any angle whereby the Fresnel lens is orthogonal to the transmission path. For example, the electrically conductive region can diffract, reflect, interfere with, block, or cancel out the out-of-phase radiation in Fresnel zone to enhance transmission gain and improve SNR in the communication link.

Figure 4B:
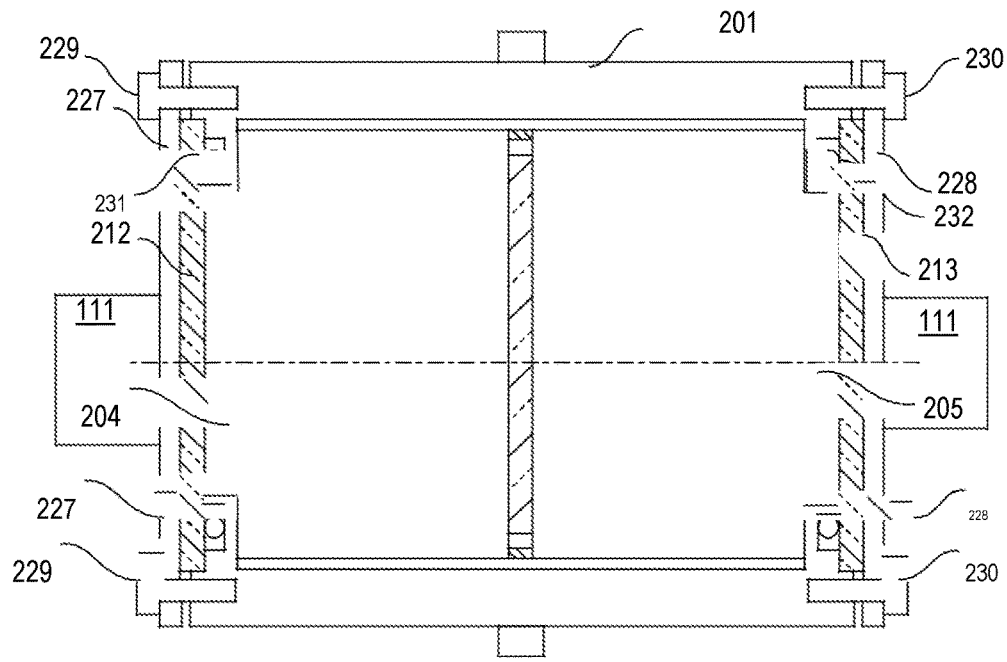
FIG. 4B-4C shows an exemplary lens-based array antenna whose orientation can be controlled.
Figure 4C:
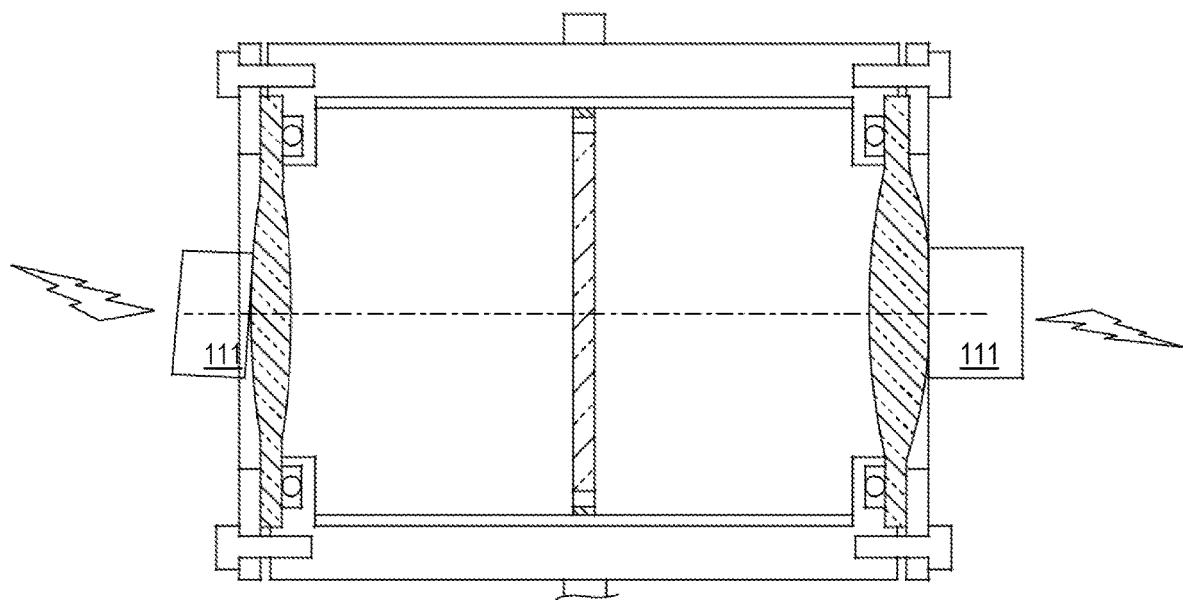
Figure 4D:
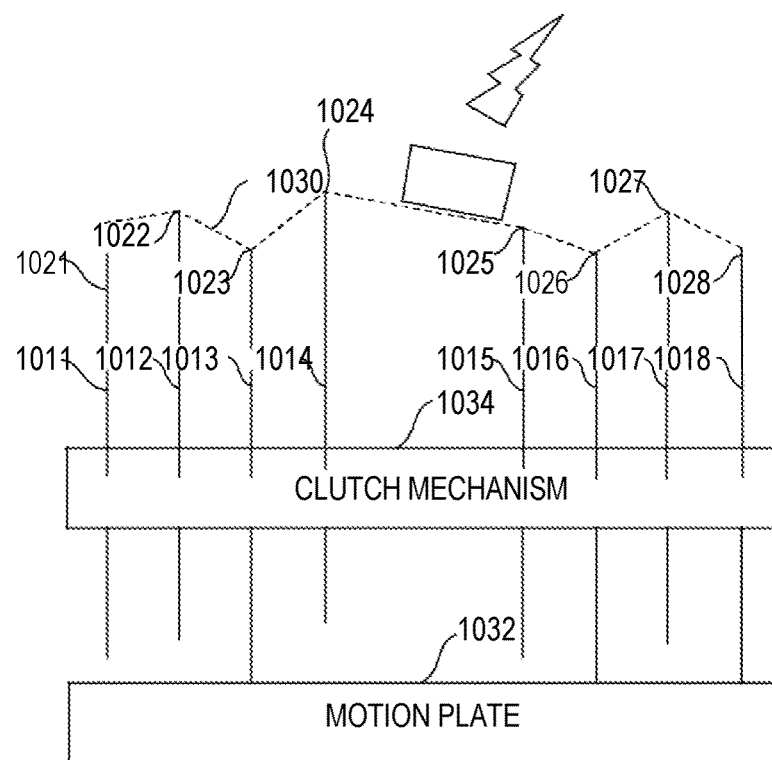
FIGS. 4D-4E shows an array of actuators to point an antenna element in a selected direction.
Figure 4E:
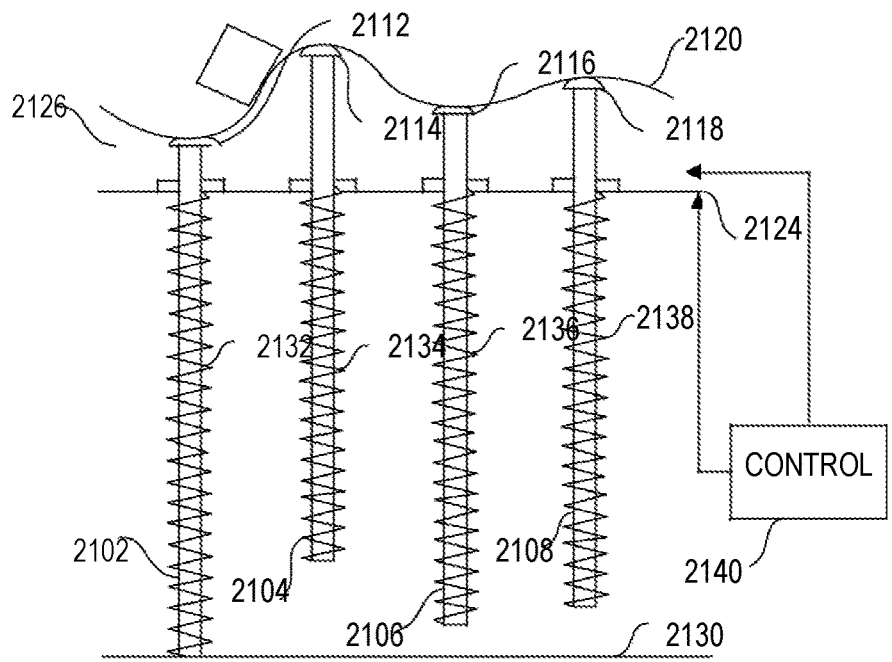

In one embodiment shown in FIG. 4A, a plurality of antenna element 111 can be placed on a substrate in a bee-eye arrangement. In one embodiment of FIG. 4A, the array is fixed. In another embodiment, each element 214 is motorized and steerable. In such motorized embodiment, an array of motors (such as linear motors) can move up and down and affect the directionality of the associated antenna element 111. In the embodiment of FIGS. 4B-4C, liquid lenses are provided on both sides, and antenna element 111 directionality can be fine tuned to optimize communication. The liquid lenses enable the antenna to move similar to the eyes to gaze toward the corresponding remote 5G cellular transceiver.

Turning now to FIG. 4A, a lens antenna system 210 is shown coupled to a conventional deployed small cell. As used herein, the term "lens" can refer to any three-dimensional structure, through which electromagnetic waves can pass and that uses either refraction or diffraction to control the exiting aperture distribution as a function of its position and shape. As used herein, the terms "Fresnel lens" or "Fresnel zone plate" can refer to a type of lens that produces focusing and imaging of electromagnetic waves using diffraction, rather than refraction. It is noted that a lens and hence, a Fresnel lens, are not antennas. An antenna is a transducer that transmits or receives electromagnetic waves. Conversely, a Fresnel lens does not transmit or receive electromagnetic waves. As stated above and as will be discussed in more detail supra, electromagnetic waves are passed through a Fresnel lens wherein said electromagnetic waves may be focused into Fresnel zone regions. The lens system 210 includes tubular waveguide lens cells, indicated generally at 214, interconnected to form a collapsible honeycomb array. The array 214 is constructed of a plurality of cells, each of the cells in the cell array 214 is hexagonal in cross-section as shown at 24 in FIG. 2a with equiangular sides having uniform lengths of about three inches. Each hexagonal cell preferably has a length uniform with other array cells of from six inches to twelve inches, depending upon the particular application and the frequency of the signals to be focused.

Each antenna element can rest on a corresponding actuator to adjust the aiming direction. Alternatively, a group of elements can be moved by one actuator to save cost. Thus, in one system 210, sub-groups of nearly antenna elements can be aimed/focused as a group.

One embodiment mounts the antenna elements on a hard lens at the front and a softer, flexible plastic sheet at the back. In between is a layer of viscous liquid. By pumping more of less of this liquid between the layers, the system can custom fit the curvature of the lens, thus finely aiming the antenna at a target for tuned reception. The system can calibrate the connection by examining the RSSI and TSSI and scan the moveable lens until the optimal RSSI/TSSI levels are reached. In another embodiment, a group of antennas can be moved to optimize data transmission. Two of the lenses can be placed on opposite sides for common control if desired.

FIG. 4B is a sectional view illustrating a liquid lens in which antenna mount portions 212 and 213 provided on the opposite ends of the protection member 201, and are formed of a member that is different from that of the protection member 201. The antenna element 111 is positioned on the liquid lens and can be pointed using the liquid lens, similar to an eye gaze. The antenna mount portions 212 and 213 are pressed by covering members 227 and 228 each having a hole. The covering members 227 and 228 are fixed to the protection member 201 by screws 229 and 230, respectively. To prevent the liquids 204 and 205 from leaking through a gap between the protection member 201 and antenna mount portions 212 and 213, O-rings 231 and 232 are provided between the protection member 201 and the transparent portions 212 and 113.

FIG. 4C is a sectional view illustrating a liquid lens in which antenna mount portions 214 and 215 provided on the opposite ends of the protection member 201. During operation, an elastic member in the middle of the chamber can be used for change in surface shape of the elastic member 206 when the elastic member 206 is moved. In the case of using an incompressible liquid, since volumes of the liquids 204 and 205 are constant before and after the movement of the elastic member 106, the surface shape of the elastic member changes in such a manner that the volumes of the liquids 204 and 205 are constant. Since the surface shape of the elastic member 206 is uniquely determined by the distance of movement of the elastic member 206, the elastic member 206 can be controlled to form a desired surface shape by controlling the position of the elastic member 206.

In an alternate embodiment, instead of liquid lens, an array of actuators can be used to aim the antenna array. Based on the desired antenna directionally, one embodiment of the antenna actuator 1004 forms a 3D shape by having an array of computer controlled moveable pins whose height is adjusted in accordance with the CAD design file, and the overall shape is smoothed by a Lycra sheet or felt sheet. The pins or rods lift the felt or Lycra sheet to form a 3D shape that points the antenna at a desired aim. In this embodiment, an array of N×N micro hydraulic actuators can be used to form the shape. This embodiment is a dense hydraulic planar pin-rod matrix array. Another embodiment actuates an N×N pin-rod matrix driven by servomotors. In either case, each pin-rod is controlled individually, similar to pixels on a screen except that the pixel has height as well.

In one embodiment, the N×N matrix can be an array of electro-mechanical pins positioned in a frame. The frame is adapted to hold the plurality of pins in a parallel position to one another in a series of columns and rows, such that the distal ends of the plurality of pins together form a flat virtual plane. Each pin of the plurality of pins includes an elongated housing member defining a linear axis therethrough, and a pin member adapted to slide linearly in either direction along the axis. Each of the housing member includes an upper electromagnet, and a lower electromagnet separated from the upper electromagnet. Each of the electromagnet is adapted to move its respective pin member linearly in either direction. Each of the pin member includes a linear potentiometer, a, magnet and an electronic transmitter attached to an opposite end to the distal end, such that when each of the pin members are moved linearly each respective linear potentiometer sends a signal to its respective transmitter which in turn sends an electronic signal describing its movement within its respective housing member, a plurality of electronic wires respectively connected to each transmitter, such that electronic signals can be relayed to and from each respective pin; an analog-digital converter connected to the plurality of electronic wires and adapted to convert the analog electronic signals relayed by the transmitters into digital format to be transmitted, processed, stored, and then converted back into analog form for return transmittal to the set of pins. A processor is connected to the converter and adapted to retrieve the electronic signals from the converter, store them, and retransmit them back to the converter when desired, such that a user can displace the pin members from the virtual plane in any pattern, have electronic signals sent, processed, stored, and returned to the same set of pins, or another separate set of pins, at a later time to thereby displace the pins to the same positions as the original pattern chosen by the user.

In one embodiment, the pin array device has each of the housing member of each pin comprise an upper frame upper electromagnet, upper spring, lower electromagnet, lower spring and shield along the entire upper frame wall to separate magnetic field between each interactive pin. The lower frame consists of the outer fixed part of the potentiometer and electronic transmission from electronic transmitter to both electromagnets. The pin consists of a magnet, a mobile portion of the potentiometer, electronic transmitter that picks up all the wire and sends position signal and feeds the power to both electromagnets via the lower housing. The electronic signal may be a Pulse Width Modulation signal, and the displacement of each of the pin members is proportional to the strength of the Pulse Width Modulation signal received by the electromagnets.

In yet another embodiment, the pins are moved by the action of a plate, common to all or a portion of the pins, that can extend and retract along a single axis of motion. A clutch mechanism cooperates with the moving plate to fix the pins at a desired position. In an exemplary embodiment, the shape generator 1004 can include a membrane covering the pins. A plurality of pins 1011-1018 arranged in an array such that respective head portions 1021-1028 associated with the pins collectively define a surface 1030. It will be appreciated that the area of array is not necessarily defined by two Cartesian dimensions. For example, the pins could be arranged along a spherical or hemispherical surface, with the array spanning the azimuthal and polar dimensions across the surface of the sphere. The position of a given pin (e.g., 1011) can be adjusted along an axis of motion.

In one embodiment, an optional motion plate 1032 can be provided to move the pins along the axis of motion as to adjust the position of the pins. The motion plate 1032 can be moved by reasonable mechanical or electromagnetic means. For example, the plate 1032 can be moved via an electrical motor, a hydraulic assembly, or one or more solenoid coils exerting a magnetic force.

A clutch mechanism 1034 is operative to arrest the motion of a given pin at a desired position. The respective positions of the pins can be selected to deform the display surface into a desired raised image. The clutch mechanism can comprise reasonable means for selectively arresting the motion of the pins. For example, the clutch mechanism 1034 can comprise components for mechanically or magnetically engaging the pins.

One embodiment provides an upper plate with a plurality of apertures through which corresponding pins forming the object's surface can pass. The pins can include head portions with areas larger than that of their respective apertures, to more fully tessellate the display surface and to help maintain the pins within the apertures. The upper plate can house part or all of a clutch mechanism that selectively engages one or more pins to maintain the pins at a desired position. The upper plate houses one or more banks of solenoids that shift the position of one or more portions of the clutch (not shown) that physically communicate with the pins. In an exemplary embodiment, the solenoids shift the position of one or more bars such that they contact or release circumferential grooves on the surface of the pins. This embodiment also provides a lower plate and a base plate disposed parallel to the upper plate along one or more support posts. A lifting plate can be suspended between the lower plate and the base plate on one or more guide posts. The lifting plate can be raised or lowered via a motor and belt system to adjust the position of the pins. For example, the pins can be reset to a fully raised position by raising the lifting plate to its maximum height. The movement of the guide pins and the action of the clutch mechanism can be regulated by a processor.

In an exemplary embodiment, the rows containing the pins 2102-2108 are staggered as to form a honeycomb pattern. Accordingly, the pins 2102-2108 are arranged in a plurality of linear rows and one or more staggered columns. Alternatively, the pins can be arranged in a Cartesian grid, such that both the rows and the columns are linear. It will be appreciated that other methods of arranging the pins can be utilized, and that the placement of the pins will vary with the necessary size and spacing of the pins, as well as the desired shape (e.g., flat, spherical, recessed) of the array.

In the illustrated display, the pins 2102-2108 have respective cap portions 2112-2118 that define a raised surface. The cap portions 2112-2118 can be covered by an elastic membrane or felt layer 2120 to provide a relatively smooth surface for the object. The use of the pin caps 2112-2118 and the membrane 2120 will depend on the application. The pins 2102-2108 pass through respective apertures in a stationary, outer plate 2124. The outer plate 2124 houses a clutch mechanism 2126 that acts to maintain the pins in their desired positions. In an exemplary implementation, the clutch mechanism 2126 can comprise a series of row bars and column bars having two associated positions. In a first, open, position, a given bar allows the pins within its associated row or column to move freely. In a second, restraining, position, the bar is moved to physically contact the pins at one of a plurality of evenly spaced grooves on the pin, maintaining the pin at its position. The spacing of the grooves corresponds to a desired resolution of the display 2100. The position of the bars can be changed via one or more banks of solenoids. In an exemplary embodiment, the bars are biased, by a spring or similar mechanism, to remain in the restraining position, until a solenoid is actuated to move the bar into an open position.

During operation, the pins can be reset into a fully extended position by a reset plate 2130. The reset plate 2130 can then be incrementally withdrawn to allow the pins 2102-2108 to retract toward the interior of the display device. In an exemplary embodiment, the reset plate 2130 is moved by a motor and belt arrangement. The pins 2102-108 have associated springs 2132-2138, with each spring (e.g., 2132) attached at a first end to the underside of the outer plate 2124 and at a second end to the end of the pin (e.g., 2102) opposite the cap portion (e.g., 2112). When the pins 2102-2108 are fully extended, the springs 2132-2138 are compressed against the underside of the outer plate 2124. The springs 2132-2138 thus provide a tensive force on the pins 2102-2108 as to draw the pins toward the interior of the object being formed.

The movement of the reset plate 2130 and the operation of the clutch mechanism can be coordinated by a controller 2140 to adjust the position of the pins 2102-2108. The controller 2140 can provide information relating to the desired pin positions to the projector. The reset plate 130 can be incrementally withdrawn toward the interior of the object. In an exemplary embodiment, the reset plate 2130 withdraws in increments equal to the spacing between the grooves on the pins 2102-2108. After each retraction of the plate, the clutch mechanism 2126 can be selectively activated to release one or more of the pins, while leaving others secured. The tensive force provided by the springs 2132-2138 pulls the ends of the released pins flush against the reset plate 130, such that the released pins retract to a uniform level defined by the position of the reset plate. The secured pins remain at their previous level. The pins are then secured by the clutch mechanism, and the plate is retracted by another increment. This process is repeated as the reset plate 2130 retracts to leave each pin at a desired level of extension.

In another embodiment, the pins pass through respective apertures in a stationary, outer plate housing a first portion of a clutch mechanism that acts to adjust the pins into desired positions. In an exemplary implementation, the first clutch portion can be piezoelectric restraints for the plurality of pins. In a default position, a given restraint loops around its associated pin, but allows the pin to move freely. Upon the application of an electrical current, the restraint contracts as to physically contact its associated pin at one of a plurality of evenly spaced grooves on the pin. This fixes the pin to the outer plate, maintaining the pin at a stationary position. The spacing of the grooves corresponds to a desired resolution of the 3D object being formed. The pins also pass through respective apertures in a moving plate which can be moved by a motor and belt arrangement. The moving plate houses a second portion of the clutch mechanism with piezoelectric restraints for the plurality of pins. The movement of the moving plate and the operation of the first/second clutch portions can be coordinated by a controller to adjust the position of the pins. The moving plate oscillates in a direction normal to the outer plate and a base plate between a first position, closest to the base plate and a second position, closest to the outer plate. In an exemplary embodiment, the first position and the second position are separated by a distance equal to the spacing between adjacent grooves. The pins begin in a default position, fixed to the outer plate by the first clutch portion. In an exemplary embodiment, the default position of the pins is a fully withdrawn position (e.g., the first clutch portion engages the uppermost groove of each pin). Since the default position of the pins is known, the controller can determine the distance between the default position and a desired position as a number of increments, as defined by the groove spacing of the pins. The controller can thus select one or more pins to extend by one or more increments. While the moving plate is in its first position, the selected pins are released by the first clutch portion. Simultaneously, the second clutch portion engages the selected pins, such that the pins are fixed to the moving plate. The moving plate can then be moved to its second position. Once the plate reaches the second position, the second clutch portion releases the selected pins, while the first clutch portion reengages the pins. It will be appreciated that the motion of the moving plate can be controlled by the controller such that the first clutch portion can engage the pins at a groove one increment below the default position. Accordingly, the selected pins are extended by one increment. This can be repeated a number of times, to allow one or more pins to be moved to a desired position up to a maximum extension. The final position of each pin will be determined by the number of times the first and second clutch portions are activated for the pin. This can be controlled by the controller according to the desired position of the pin. Once the pins have been positioned, the controller can direct the object fabricator 1006 to copy the 3D object formed by the pin grid 3D shape generator.

In another exemplary clutch mechanism, a pin can be encased in a solid restraining material having a low melting point. For example, the restraining material can be an alloy of lead and one or more other metals. The restraining material is contained in a container having a relatively high melting point. The clutch mechanism disengages by applying heat from a heat source to the restraining material in order to bring it to a liquid state. The heat source can be applied by a laser apparatus (not shown) directed on the restraining material or by a heating element associated with the container. In an exemplary implementation, the container is the heat source, producing resistive heat upon the application of an electrical current. While the restraining material is in a liquid state, the pin can move freely through the aperture. Once the heat source is deactivated, the restraining material cools and returns to a solid state, restraining the pin.

In yet another exemplary clutch mechanism, a wire has shape memory properties is looped around a pin. The material with shape memory properties has the ability to return to an imprinted shape when heated. A desired shape can be imprinted into the material by molding the material at a high temperature and maintaining the desired shape as it cools. Below a threshold temperature, the material is relatively flexible and can be deformed away from the imprinted shape with relative ease. Once the material is heated above the threshold temperature, however, it reverts back to the imprinted shape with some force. In an exemplary implementation, the wire is a formed from nitinol, an alloy of nickel and titanium. The wire is shaped such that the loop is opened around the pin and the pin can move freely through the loop. A current can be applied to the wire to heat the wire via resistive heating to a temperature greater than its threshold temperature. This causes the wire to return to its imprinted shape, engaging the pin as the loop closes. The wire returns to its imprinted shape somewhat forcefully, such that the tensive force on the ends of the wire is insufficient to restrain it. In an exemplary embodiment, the wire is looped around a groove in the surface of the pin to facilitate engagement of the pin. When the current is no longer applied, the wire 352 cools and returns to its more malleable state. Once the wire cools below threshold, the tensive force applied can once again deform the wire into an open shape, releasing the pin.

A controller, such as a microprocessor, microcontroller, or specialized logic that implements an RSSI/TSSI focus control algorithm, which is further described below. The RF focus control algorithm implemented on, for example, a microprocessor that continuously processes the data from the distance determination elements and determines whether the lens focus needs to be changed to optimize data transmission. In some embodiments, the algorithm interacts directly as an extension to the 5G system. In some embodiments, the algorithm is in effect a coarse tuning outer loop algorithm that interacts intimately with a system operator during a set up inner loop.

In some embodiments, the autofocus antenna utilize a data transmission speed pricing plan offered to the user. In some embodiments, the user may input known desired data speed information, such as information based on a separate RF evaluation of the user's system. In some embodiments, the autofocus antenna may operate to determine some or all of the necessary desired data speed information for the user, such as in operation of a focus training mode. In some embodiments, the user's desired data speed information is used to set the variable focus lens at the correct RF focal length for the situation (such as near, medium, or far distance) in an automatic adjusting mode of the autofocus 5G antennas.

In some embodiments, an optional automatic focus training mode is provided, wherein the 5G antennas automatically learn the compensation necessary for an individual's unique desired data speed, and thus generate at least some of the desired data speed information for the user. In some embodiments, the process for the focus training mode may operate in the matter of an autorefractor (as referred to an automated refractor), an autorefractor being a computer-controlled machine that may be used during 5G set up, the autorefractor operating to provide an objective measurement of a 5G refractive error and desired data speed for 5G antenna. In some embodiments, 5G antennas may generate a wavefront distortion map for use in evaluating the performance of the 5G antennas.

In some embodiments, an algorithm for a focus training process for the autofocus 5G antennas may include, for each of multiple RF views, such as RF views of targets that are near, medium, and far distances:

(a) Adjusting the lens to determine a setting that provides maximum RF clarity, the setting being a lens offset value; and (b) Saving the lens offset value for use in the automatic adjusting mode for the 5G antennas.

In some embodiments, the focus training mode may include menus that are provided to a user during a focus training process, wherein the focus training process may include the provision of alternative focus settings for a user and providing an inquiry to the user regarding which setting is better in order to hone in on an optimal desired data speed using a binary tree or a learning machine/neural network, among others.

In one embodiment of a process for a focus training mode of autofocus 5G antennas, upon the 5G antennas entering a training mode, a menu sequence for training is loaded to guide a user through the RF focus training process. In some embodiments, the system may instruct the user to view a 5G object at a first distance. In some embodiment, the view may be of symbols or images generated by the 5G antennas that assist a viewer in determining whether an image is in focus. In some embodiments, a set of views with alternative lens settings are provided to the viewer 546, where the set of view may include a first view at a first focus setting and a second view at a second focus setting. In some embodiments, a request is provided to the viewer to choose one view of the set of views as being better focused 548.

In some embodiments, if a certain speed threshold for the testing is not yet met, the process continues with provision of alternative RF focus settings to continue working towards an optimal focus setting for the distance. In some embodiments, if the speed threshold is met, then, if there is an additional distance to test, then the system communicates with an object at a next distance, with the processing returning to providing images with alternative lens settings for view by the user. In some embodiments, if there are no more additional distances to test, then the desired data speed of the user is determined based on the user choices of focus settings, the determined vision desired data speed is stored in the autofocus 5G antennas or in a companion device, and the training mode is ended.

Coinciding with a signing-off of global standardizations for 5G radio technology by 3GPP is the need for faster 6G wireless. One hundred gigabits-per-second speeds will be streamed to 6G users with very low latency. For comparison, the telecommunications union ITU's IMT-2020 has projected that 5G speeds is around 20 Gbps. In contrast, 4G at frequencies below a few gigahertz, provides generally available average downloads speeds at rates below 20 Mbps. High frequencies, in the range of 100 GHz to 1THz (terahertz) are used for 100 Gbps 6G.

To allow for ease of upgrading from 5G to 6G, reconfigurable antennas can used. A reconfigurable antenna is an antenna capable of modifying its frequency and radiation properties dynamically, in a controlled and reversible manner. The liquid metal antenna discussed above is an example of a reconfigurable antenna. Reconfigurable antennas can tune to different frequency bands. Such an antenna would not cover all bands simultaneously, but provides narrower instantaneous bandwidths that are dynamically selectable at higher efficiency than conventional antennas. Such tunable-antenna technology is an enabler for software-definable radios, the RF front ends of which must be reprogrammable on the fly.

In order to provide a dynamic response, reconfigurable antennas integrate an inner mechanism (such as RF switches, varactors, mechanical actuators or tunable materials) that enable the intentional redistribution of the RF currents over the antenna surface and produce reversible modifications of its properties. Reconfigurable antennas differ from smart antennas because the reconfiguration mechanism lies inside the antenna, rather than in an external beamforming network. The reconfiguration capability of reconfigurable antennas is used to maximize the antenna performance in a changing scenario or to satisfy changing operating requirements. Reconfigurable antennas can be classified according to the antenna parameter that is dynamically adjusted, typically the frequency of operation, radiation pattern or polarization.

Frequency reconfiguration—Frequency reconfigurable antennas can adjust their frequency of operation dynamically. They are particularly useful in situations where several communications systems converge because the multiple antennas required can be replaced by a single reconfigurable antenna. Frequency reconfiguration is generally achieved by physical or electrical modifications to the antenna dimensions using RF-switches, impedance loading or tunable materials.

Radiation pattern reconfiguration—Radiation pattern reconfigurability is based on the intentional modification of the spherical distribution of the radiation pattern. Beam steering is the most extended application and consists of steering the direction of maximum radiation to maximize the antenna gain in a link with mobile devices. Pattern reconfigurable antennas are usually designed using movable/rotatable structures or switchable and reactively-loaded parasitic elements. Metamaterial-based reconfigurable antennas have gained attention due their small form factor, wide beam steering range and wireless applications.

Polarization reconfiguration—Polarization reconfigurable antennas are capable of switching between different polarization modes. The capability of switching between horizontal, vertical and circular polarizations can be used to reduce polarization mismatch losses in portable devices. Polarization reconfigurability can be provided by changing the balance between the different modes of a multimode structure.

Compound reconfiguration—Compound reconfiguration is the capability of simultaneously tuning several antenna parameters, for instance frequency and radiation pattern. The most common application of compound reconfiguration is the combination of frequency agility and beam-scanning to provide improved spectral efficiencies. Compound reconfigurability is achieved by combining in the same structure different single-parameter reconfiguration techniques or by reshaping dynamically a pixel surface.

To provide steerable beam in desired direction, a reconfigurable parasitic pixel surface can be utilized. Pixel shaped parasitic elements are used to design antennas with diverse or multi-function characteristics like frequency, polarization and pattern. Nonuniform pixels can be used to develop a variety of configurations with frequency diversity. A reconfigurable pixel-layer isolator to dynamically regulate the mutual coupling between the two antennas in the repeater to achieve frequency diversity can be done. The pixel shape structures of an antenna (on a radiating patch or on the ground or as parasitic one) exhibit the highest reconfiguration capability, but requires large number of RF switches. In one embodiment, one side of a PCB has pixel patches with RF switches connecting rows and columns of the pixel patches, and the other side of the PCB is a thin line over the pixel patches that after the pixel patches expands into a large PCB land, with combinations of on RF switches change the frequency. For known frequency change from 5G to 6G, the pixel connections can be hardwired to improve performance and cut cost, or only a few RF switches are used to switch between known frequencies.

Figure 5A:
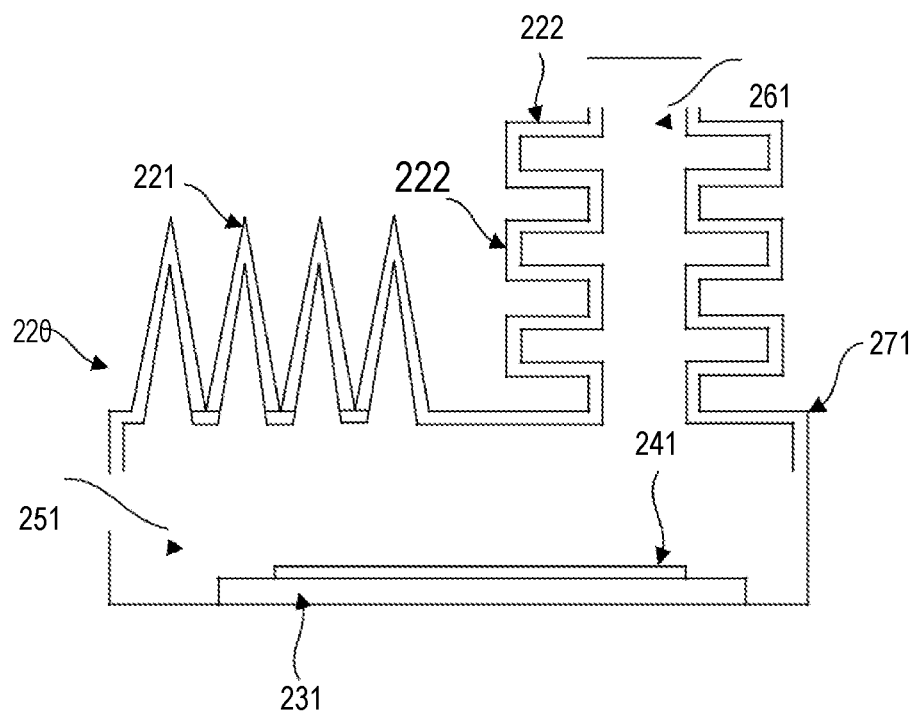
FIGS. 5A-5B show exemplary cooler and antenna combination for 5G electronic chips.
Figure 5B:
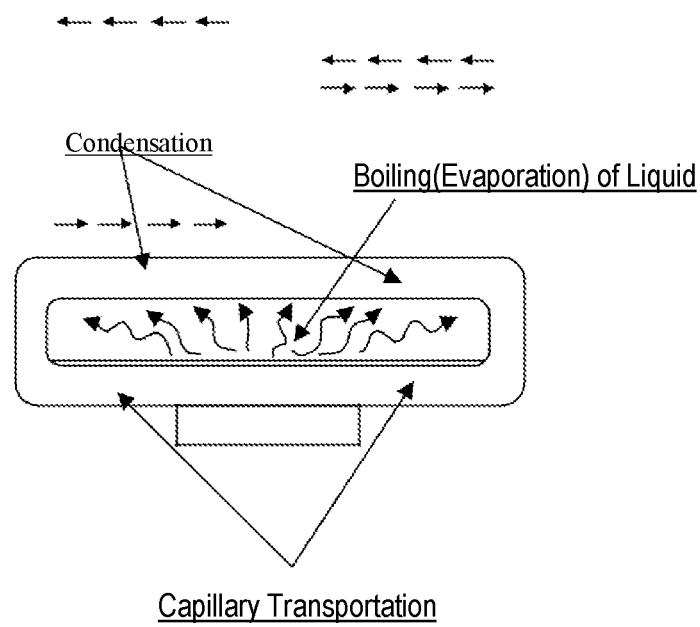

FIG. 5A-5B shows two exemplary 5G IC (such as power amplifier) with integrated cooling heat spreader and antenna structures. FIG. 5A illustrates an example of such a boiling cooler with a vessel 220 enclosed by a body-shell 271 comprising multiple 5G antennas such as upper chambers 221 and 222 in irregular shapes and different heights, for example, on top of a common base chamber. The boiling cooler also comprises a boiling enhancement surface 241 on a thermally conductive side shell 231 (a part of the body-shell 271), partially filled liquid coolant 251. Vapor generated from boiling helps spread heat over all extended space 261 adding extra pathway for cooling through convection. In some cases, the electric circuit module boards and/or system line cards, on which many electric or photonic components/devices are tightly packed, have very stringent requirements in the mechanical design for the associated or integrated coolers. Using plastic material for the body-shell of the cooler vessel can easily make the cooler in complex shape or specific dimension without worry about driving the cost high. In other system applications forced air cooling may be not available, making the traditional heat sink impossible to handle the ever-increasing heat flux out of those electronics system. The cooler utilizing boiling enhancement surface according to this invention achieves efficient cooling within the vessel, making the forced air convection not critical for the system. In addition, natural or forced-air convection can still provide extra heat exchange through the extended exterior surface of the vessel of this boiling cooler. While the embodiment shown in FIG. 5A is shown with the die 241 for horizontal operation, it can be placed for vertical operation.

FIG. 5B illustrates current two-phase cooling chamber with integrated electro-deposited surfaces that utilize boiling (evaporation), condensation, and capillary pumping action. Liquid will be vaporized (boiled) from the electro-deposited surface designed for boiling (evaporation) enhancement, then the vapor will be condensed at the enhanced surface for condensation by electro-deposition on top plate. Finally the condensed liquid will be supplied back to the heated region by another electro-deposited surface aimed for capillary pumping action. The system of FIG. 5B ensures that the heat absorbing surface or coating contacts the liquid coolant to ensure an efficient transfer of heat from the heat source to the liquid and to the rest of the module. The system allows the integrated circuit to run at top performance while minimizing the risk of failure due to overheating. The system provides a boiling cooler with a vessel in a simplified design using inexpensive non-metal material or low cost liquid coolant in combination with a boiling enhancement surface or coating.

The heat spreader has a base or first plate that engages a top or second plate. The first plate is adapted to be in thermal contact with a heat generating device such as a power amplifier, a processor or graphics device, for example. In one embodiment, the first plate is a thin plate with a locally heated region that is thermally in contact with the heat generating device. The first plate can have a recessed portion, or can be substantially flat. The system also includes an enhanced surface for capillary pumping action. This porous medium will replenish the condensed liquid back to the heated surface by capillary pumping force. The second plate has a top surface area corresponding to the bottom surface that collectively forms a region that contains liquid for boiling. In combination, the first and second plates form a housing or chamber that stores a liquid such as water. The liquid can be boiled (evaporated) when the first plate is heated by the heat generating device, and the boiling (evaporation) action cools the heat generating device during its operation. To increase boiling (evaporation) heat transfer performance over conventional metal heat spreaders, the heat spreader of FIG. 1 uses an electro-deposition method to augment nucleate boiling heat transfer coefficient and to extend the critical heat flux (CHF, or the highest heat flux that can be removed without exposing the surface to film boiling). The surface enhancement techniques effectively increase vapor/gas entrapment volume and thus increase active nucleation site density. In one implementation, the first plate has two electro-deposited surfaces. The first surface is an enhanced boiling (evaporation) microstructure surface including microporous surface structures 101. The microporous structure provides a significant enhancement of nucleate boiling heat transfer and CHF while reducing incipient wall superheat hysteresis. An electro-deposited surface is used for condensation. The electro-deposited surface with low current density (0.15-0.3 A/cm2) is formed for the purpose of obtaining a good surface to achieve enhanced dropwise condensation over plain surface. The wettability, uniformity and stability of the rough (bumpy) structures can be detected by a contact angle method. The structures built with median current density (0.3-1.0 A/cm2) in the figure show an increased active nucleation site density. The increased number of nucleation sites may enhance the heat transfer by providing more convection heat transfer from increased bubble agitation and/or increased latent heat transport. The electro-deposited surface for capillary pumping. Comparatively high current density (1.0-1.5 a/cm2) is utilized to generate interconnected porous structures with shapes of a honeycomb, probably due to the high current field. Capillary pumping in electro-deposited porous structures (multi-layered and honey-comb shape) launches the required liquid draw, establishing a condensed liquid flow from cool regions to hot regions (heating source area).

For different working liquids, different current densities should be considered. In addition, the current densities will be determined by the purpose of heat transfer modes. For example, in condensation enhancement, comparatively low current densities should be applied while the higher current density is required for capillary pumping action. For boiling (evaporation) enhancement, the cavity sizes should be optimized depending on liquid's surface tension. Usually, higher surface tension liquids such as water require comparatively large sizes of cavity compared to low surface tension liquids such as ethanol.

Figure 6:
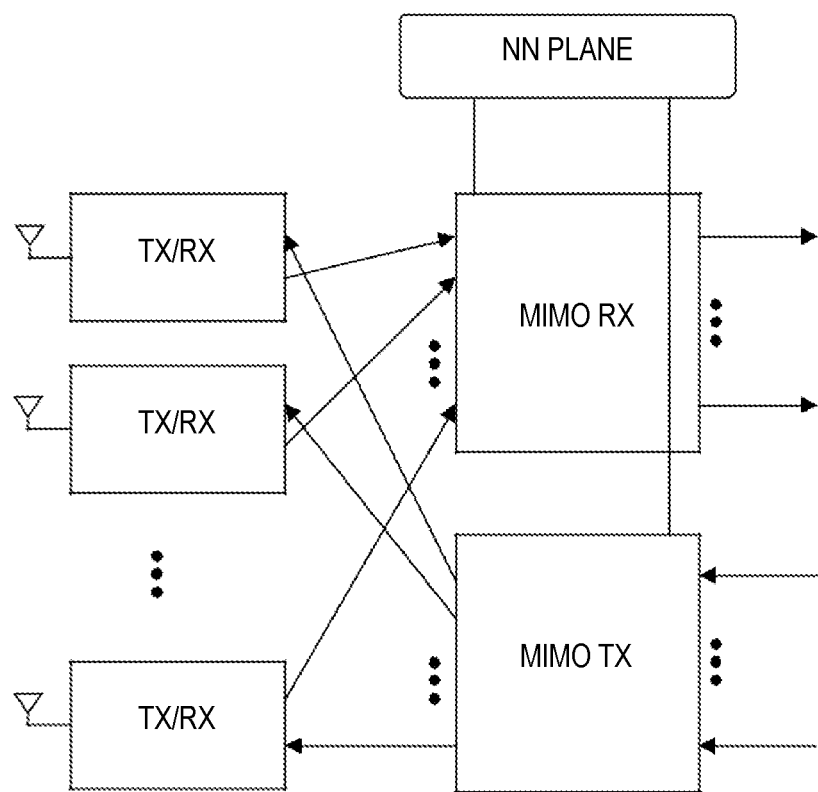
FIG. 6 shows an exemplary neural MIMO system.

FIG. 6 shows an exemplary simplified massive MIMO system with antenna ports for user streams. Each user stream is a spatial stream of data. Each spatial stream that may include data from multiple users that are allocated different frequencies within the same spatial stream, in some embodiments. Further, a given user may be allocated multiple spatial streams, in some embodiments. Therefore, the number of users communicating with the system may or may not correspond to the number of antenna ports. In some embodiments, MIMO RX is configured to perform the functionality of channel estimator, MIMO detector, link quality evaluator, etc. In some embodiments, MIMO TX is configured to perform MIMO precoder.

During operation, a base station selects a number of antennas from among a plurality of available antennas for use in MIMO wireless communications. For example, the system may include 128 antennas but the base station may select to use only 64 antennas during a given time interval based on current operating conditions. The decision of how many antennas to use may be based on user input, a number of users currently in a cell, wireless signal conditions, bandwidth of current communications, desired testing conditions, etc. The base station may select different numbers of antennas at different times, e.g., a larger number during peak communications intervals and a smaller number during trough intervals. The base station determines a number of processing elements for processing received signals from the selected number of antennas. In the illustrated embodiment, this is based on the number of antennas selected and one or more threshold throughput values. In some embodiments, this determination may be based on any of various appropriate parameters in addition to and/or in place of the parameters, including without limitation: the processing capacity of each processing element, the amount of data per sample or entry for various information, a sampling rate, the number of spatial streams, number of users, etc. Determining the number of processing elements may include determining a number of parallel receive chains for MIMO RX. In some embodiments, each receive chain includes a configurable MIMO core and a configurable linear decoder. The base station processes incoming wireless communications using the determined number of processing elements. This may include applying a MIMO signal estimation techniques such as MMSE, ZF, or MRC and decoding received data streams. After processing, the decoded data from the determined number of processing elements may be reformatted and routed and transmitted to appropriate destinations (e.g., via another network such as a carrier network, the Internet, etc.). In some embodiments, the base station dynamically switches between different MIMO signal estimation techniques, e.g., based on user input, operating conditions, or any of various appropriate parameters.

The neural network control of the MIMO system may, in some embodiments, facilitate testing of MIMO base stations, reduce power consumption during MIMO communications, allow for flexibility in capacity, allow for flexibility in MIMO signal estimation, allow routing around defective processing elements or antennas, etc. In some embodiments, the base station may also be dynamically or statically customized for a wide variety of operating conditions and/or research needs and may be configured for real-time processing.

The massive MIMO system may be included in base station, for example, and the TXRX data is provided to the neural network plane for optimization. Data on the operation of any of the subunits of the MIMO system can be captured for learning system behavior and for optimizing the system by the neural network or learning machine. In one embodiment, the subsystem includes front-end TX/RX units, antenna combiner, antenna splitter, bandwidth splitter, bandwidth combiner, channel estimator, MIMO detector, and MIMO precoder. Other subsystems of include additional MIMO detectors, MIMO precoders, bandwidth splitters, and bandwidth combiners. MIMO processing can be distributed among various processing elements. This may allow baseband processing to be partitioned across multiple FPGAs, for example. This may facilitate scaling of massive MIMO systems far beyond what a single centralized processing unit could achieve for real-time baseband processing. For uplink symbols, each TX/RX may be configured to digitize the received RF signals, perform analog front-end calibration and time/frequency synchronization, remove the cyclic prefix (CP), and perform FFT OFDM demodulation and guardband removal. This may result in frequency domain pilot and unequalized data symbol vectors, which is provided to antenna combiner. For downlink symbols, each TX/RX may be configured to perform ODFM processing. The antenna combiner, bandwidth splitter, MIMO precoder, bandwidth combiner, and antenna splitter are each located on a different SDR element that also implements one of TX/RXs. In one embodiment, channel estimator and MIMO detector are located on another SDR element that also implements one of TX/RXs. In various embodiments, the various elements of FIG. 3 may be partitioned among various hardware elements configured to perform the disclosed functionality. The hardware elements may be programmable and/or include dedicated circuitry. Antenna combiner is configured to receive the yet unequalized OFDM symbols from each TX/RX and combines them into a signal sent to bandwidth splitter. This combines the signals from up to N antennas in the subsystem. Combining this information before further processing may allow the system to stay within throughput constraints and may reduce the number of peer-to-peer connections between SDRs, for example. In some embodiments, the number of antennas for which signals are combined by each antenna combiner is dynamically configurable. Bandwidth splitter is configured to split the received signals into separate bandwidth portions and send the portions to MIMO detectors in different subsystems. Thus, in the illustrated embodiment, processing is distributed across different processing elements that each process data for a different frequency band. Each bandwidth portion may include one or more subcarriers and the portions may or may not be non-overlapping. In some embodiments, the number of bandwidth portions and the size of each portion is configurable, e.g., based on the number of antennas, current number of users in communication, etc. In other embodiments, processing may be distributed among processing elements across different time slices in addition to and/or in place of splitting by frequency. In some embodiments, bandwidth splitter is replaced with a time-slice splitter. Post-FTT subcarrier processing in OFDM may be inherently independent, allowing subsequent processing to be performed in parallel by different processing elements. The output of TX/RX can be provided directly to bandwidth splitter and an output of bandwidth combiner is provided directly to TX/RX. In other embodiments, these outputs may be provided to antenna combiner and antenna splitter similarly to the other signals. In embodiments in which TX/RX and bandwidth splitter share the same SDR element and TX/RX and bandwidth combiner share the same SDR element, however, the illustrated coupling may conserve I/O resources. MIMO detector is configured to use an estimated channel matrix (e.g., based on uplink pilot symbols) to cancel interference and detect frequency-domain symbols from each mobile device. As shown, in some embodiments MIMO detector is configured to process signals in a given bandwidth from multiple subsystems of system 300. In the illustrated embodiment, MIMO detector is configured to send the detected signals to channel estimator and to link quality evaluator (included in a central controller in some embodiments) for further processing.

Channel estimator is configured to perform channel estimation for its frequency portion for a number of mobile devices, e.g., to produce soft-bits (also referred to as log-likelihood ratios (LLRs)) and provide them to link quality evaluator (coupling not shown). In some embodiments, multiple decoders are implemented, including a turbo decoder, for example. MIMO precoder is configured to receive downlink data from data source and precode the data based on channel estimates (e.g., estimated reciprocity calibration weights) from channel estimator. In some embodiments, the MIMO precoders are configured to perform precoding on different frequency portions of the downlink data. In some embodiments (not shown), the MIMO precoders in system 300 are configured to perform precoding on different time portions of the downlink data. Bandwidth combiner is configured to combine signals at different bandwidths from multiple MIMO precoders and send the data to antenna splitter. This may result in a complete set of precoded data for transmission from the separately processed bandwidth portions. In other embodiments, bandwidth combiner is configured to combine data corresponding to separately-processed time slices in place of or in addition to combining separately-processed frequency portions. Antenna splitter is configured to split the received signal and provide the split signal to TX/RXs for OFDM processing and transmission to mobile devices or UEs. The set of antennas to which antenna splitter is configured to provide signals is dynamically configurable, in some embodiments (e.g., the number of antennas and/or the particular antennas in the set). Thus, in some embodiments, the set of processing elements configured to perform distributed processing for particular antennas and/or users is dynamically configurable. Link quality evaluator is included in a central control unit and is configured to measure link quality using one or more of various metrics such as bit error rate (BER), error vector magnitude (EVM), and/or packet-error rate (PER).

In various embodiments, the MIMO system is highly configurable, e.g., based on user input and/or by the neural network based on training history and current operating conditions. In some embodiments, various disclosed configuration operations are performed automatically. In some embodiments, the number of processing elements used at a given time to perform distributed processing for a set of users or a set of antennas is configurable. In some embodiments, the number of antennas used to communicate with each UE is configurable and/or dynamically determined. In some embodiments, the processing elements configured to perform different functionality described above is configurable. For example, the antenna combiner function may be moved from one FPGA to another FPGA or performed by multiple FPGAs. In some embodiments, the routing of data between processing elements is configurable, e.g., to avoid malfunctioning antennas and/or processing elements. In some embodiments, for example, system includes 16, 32, 64, 100, 128, 256, or more antennas. In some embodiments, components of system are modular such that the number of antennas may be increased by adding additional components, and each antenna parameters can be captured and learned by the neural network for subsequent optimization during live operation.

Figure 7A:
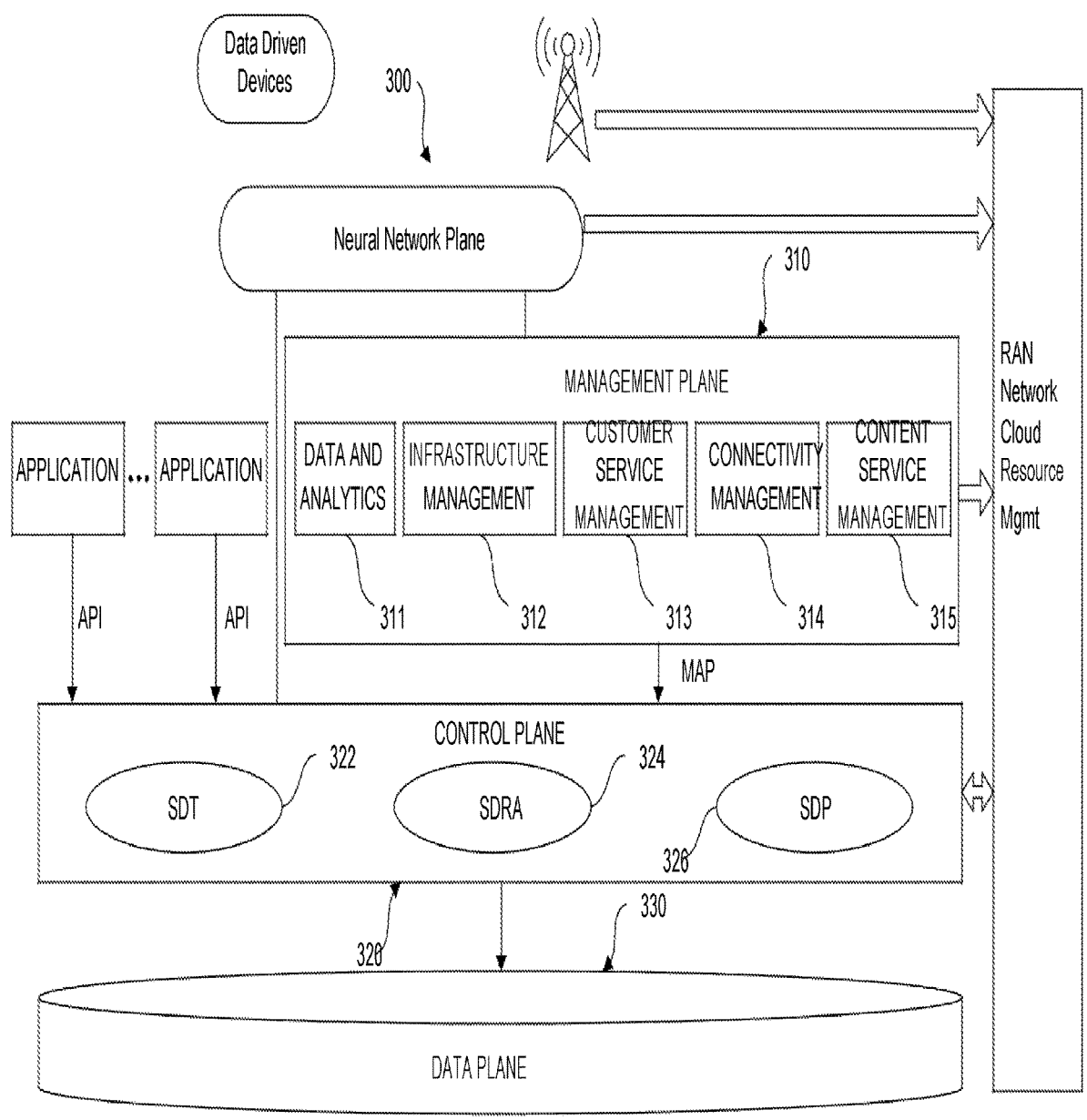

FIG. 7A shows an exemplary 5G control system that uses learning machines or neural networks to improve performance. The neural network plane provides automated intelligence to select the best operations given particular mobile device or wireless client needs. By enabling both client and infrastructure intelligence, the 5G networked system could reason about the deficiencies it suffers from, and improve its reliability, performance and security. By pushing more network knowledge and functions to the end host, the 5G clients could play more active roles in improving the user-experienced reliability, performance and security. The neural plane sits above the data plane, control plane and management plane. The Control Plane makes decisions about how to set up the antenna settings and where traffic is sent. Control plane packets are destined to or locally originated by the router itself. The control plane functions include the system configuration, management, and exchange of routing table information. The route controller exchanges the topology information with other routers and constructs a routing table based on a routing protocol, for example, RIP, OSPF or BGP. Control plane packets are processed by the router to update the routing table information. It is the signaling of the network. Since the control functions are not performed on each arriving individual packet, they do not have a strict speed constraint and are less time-critical. The Data Plane or Forwarding Plane Forwards traffic to the next hop along the path to the selected destination network according to control plane logic. Data plane packets go through the router. The routers/switches use what the control plane built to dispose of incoming and outgoing frames and packets. The management plane configures, monitors, and provides management, monitoring and configuration services to, all layers of the network stack and other parts of the system. It should be distinguished from the control plane, which is primarily concerned with routing table and forwarding information base computation.

On the client side, the system collect runtime, fine-grained information (protocol states, parameters, operation logic, etc.) from full-stack cellular protocols (physical/link layer, radio resource control, mobility management, data session management) inside the 5G device or phone, and such information is provided to the neural network plane. One embodiment extracts cellular operations from signaling messages between the device and the network. These control-plane messages regulate essential utility functions of radio access, mobility management, security, data/voice service quality, to name a few. Given these messages, it further enables in-device analytics for cellular protocols. The system infers runtime protocol state machines and dynamics on the device side, but also infer protocol operation logic (e.g., handoff policy from the carrier) from the network. The system collects raw cellular logs from the cellular interface to the device user-space at runtime, and then parses them into protocol messages and extracts their carried information elements. The parsed messages are then fed to the analyzer which aims to unveil protocol dynamics and operation logics. Based on the observed messages and the anticipated behavior model (from cellular domain knowledge), the analyzer infers protocol states, triggering conditions for state transitions, and protocol's taken actions. Moreover, it infers certain protocol operation logic (e.g., handoff) that uses operator-defined policies and configurations. It offers built-in abstraction per protocol and allows for customize these analyzers. On the management plane, the system captures full-stack network information on all-layer operations (from physical to data session layer) over time and in space. This is achieved by crowdsourcing massive network data from mobile devices temporally and spatially. An instability analyzer reports base station stability and reachability to avoid getting stuck in a suboptimal network. The instability analyzer models the decision logic and feeds this model with real configurations collected directly from the device and indirectly from the serving cell, as well as dynamic environment settings created for various scenarios. For example, antenna parameters (pointing direction, frequency, and RSSI/TSSI and channel) are captured to identify optimal settings for a particular device/client. The system can model cellular protocols is derived from the 5G standards for each protocol. This works particularly well for non-moving client devices such as 5G modems/routers and mobile phones that operate within a house or office most of the time, for example. When the mobile device is on the move, population data can be used to optimize antenna and communication parameters to derive the optimal connection for the device or client. For example, the neural network layer can identify clients using the Ultra Reliable Low Latency Communications specification (such as full car automation, factory automation, and remote-controlled surgery where reliability and responsiveness are mandatory) and control the 5G network to respond to URLLC requests by delivering data so quickly and reliably that responsiveness will be imperceptibly fast by selecting appropriate antenna parameters and settings for URLLC from the tower to the client device.

In addition to the neural network plane, the logical function architecture includes a data plane, a control plane, and a management plane. The control plane includes a software defined topology (SDT) logical entity configured to establish a virtual data-plane logical topology for a service, a software defined resource allocation (SDRA) logical entity configured to map the virtual data-plane topology to a physical data-plane for transporting service-related traffic over the wireless network, and a software defined per-service customized data plane process (SDP) logical entity configured to select transport protocol(s) for transporting the service-related traffic over a physical data-plane of the wireless network. The management plane may include entities for performing various management related tasks. For example, the management plane may include an infrastructure management entity adapted to manage spectrum sharing between different radio access networks (RANs) and/or different wireless networks, e.g., wireless networks maintained by different operators. The management plane may also include one or more of a data and analytics entity, a customer service management entity, a connectivity management entity, and a content service management entity, which are described in greater detail below.

The neural network plane works with network functions virtualization (NFV) to design, deploy, and manage networking services. It is a complementary approach to software-defined networking (SDN) for network management. While SDN separates the control and forwarding planes to offer a centralized view of the network, NFV primarily focuses on optimizing the network services themselves. The neural network plane automates the optimization level to the next automation and efficiency.

A virtual service specific serving gateway (v-s-SGW) can be done. The v-s-SGW is assigned specifically to a service being provided by a group of wirelessly enabled devices, and is responsible for aggregating service-related traffic communicated by the group of wirelessly enabled devices. In an embodiment, the v-s-SGW provides access protection for the service-related traffic by encrypting/decrypting data communicated over bearer channels extending between the v-s-SGW and the wirelessly-enabled devices. The v-s-SGW may also provide a layer two (L2) anchor point between the group of wirelessly-enabled devices. For example, the v-s-SGW may provide convergence between the different wireless communication protocols used by the wirelessly-enabled devices, as well as between different wireless networks and/or RANs being access by the wirelessly-enabled devices. Additionally, the v-s-SGW may perform at least some application layer processing for the service related traffic communicated by the wirelessly-enabled devices. Aspects of this disclosure further provide an embodiment device naming structure. For the v-s-SGW. Specifically, a v-s-SGW initiated on a network device is assigned a local v-u-SGW ID. Outgoing packets from the v-u-SGW ID include the local v-u-SGW ID and a host ID of the network device. Accordingly, recipients of those outgoing packets can learn the local v-u-SGW ID and the host ID associated with a particular v-s-SGW, and thereafter send packets to the v-s-SGW by including the local v-u-SGW ID and the host ID in the packet header.

Location tracking as a service (LTaaS) can be provided. The LTaaS feature may track locations of user equipment's (UEs) via a device location tracking as a service (LTaaS) layer such that locations of the UEs are dynamically updated in a LTaaS layer as the UEs move to different locations in the wireless networks. In some embodiments, the LTaaS layer consists of a centralized control center. In other embodiments, the LTaaS layer consists of a set of distributed control centers positioned in the wireless network, e.g., an application installed on a network device, such as a gateway or AP.

In yet other embodiments, the LTaaS layer comprises both a central controller center and regional control centers. In such embodiments, the central control center may be updated periodically by the regional control centers, which may monitor UE movement in their respective wireless networks. In embodiments, the LTaaS layer may monitor general locations of the UEs. For example, the LTaaS layer may associate the UE's location with a network device in a specific wireless network, e.g., an access point, a serving gateway (SGW), etc.

Content may be cached in network devices of wireless network or radio access network (RAN) in anticipation that a mobile device or user will want to access the content in the future. In some embodiments, a content forwarding service manager (CFM) may select content to be pushed to a caching location in the wireless network based on the popularity of available content stored in one or more application servers. The network device may comprise a virtual information-centric networking (ICN) server of an ICN virtual network (VN), and may be adapted to provide the cached content to a virtual user-specific serving gateway (v-u-SGW) of a served user equipment (UE) upon request. Notably, the cached content is stored by the network device in an information-centric networking (ICN) format, and the v-u-SGW may translate the cached content from the ICN format to a user-specific format upon receiving the cached content pursuant to a content request. The v-u-SGW may then relay the cached content having the user-specific format to a served UE. After the content is pushed to the network device, the content forwarding service manager (CFM) may update a content cache table to indicate that the content has been cached at the network device. The content cache table may associate a name of the content with a network address of the network device or the virtual IVN server included in the network device. The ICN VN may be transparent to the served UE, and may be operated by one of the wireless network operators or a third party. These and other aspects are described in greater detail below.

The management plane 310 may include entities for performing various management related tasks. In this example, the management plane 330 includes a data and analytics entity 311, an infrastructure management entity 312, customer service management entity 313, a connectivity management entity 314, and a content service management entity 315. The data and analytics entity 311 is configured to provide data analytics as a service (DAaaS). This may include manage on-demand network status analytics and on-demand service QoE status analytics for a particular service, and providing a data analytics summary to a client. The infrastructure management entity 312 may manage spectrum sharing between different radio access network (RANs) in a wireless network, or between wireless networks maintained by different operators. This may include wireless network integration, management of RAN backhaul and access link resources, coordination of spectrum sharing among co-located wireless networks, access management, air interface management, and device access naming and network node naming responsibilities.

The customer service management entity 313 may provide customer service functions, including managing customer context information, service-specific quality of experience (QoE) monitoring, and charging responsibilities. The connectivity management entity 314 may provide location tracking as a service (LTaaS) over the data plane of the wireless network. The connectivity management entity 314 may also have other responsibilities, such as establishing customized and scenario aware location tracking scheme, establishing software defined and virtual per-mobile user geographic location tracking schemes, and triggering user specific data plane topology updates. The content service management entity 315 may manage content caching in the wireless network. This may include selecting content to be cached in RAN, selecting caching locations, configuring cache capable network nodes, and managing content forwarding. In some embodiments, the management plane may also include a security management entity that is responsible for network access security (e.g., service-specific security, customer device network access protection, etc.), as well as inter-domain and intra-domain wireless network security.

The control plane 320 may include entities for performing various control related tasks. In this example, the control plane includes a software defined topology (SDT) logical entity 322, a software defined resource allocation (SDRA) logical entity 324, and a software defined per-service customized data plane process (SDP) logical entity 326. The SDT entity 322, the SDRA logical entity 324, and the SDP logical entity 326 may collectively configure a service-specific data plane for carrying service-related traffic. More specifically, the software defined topology (SDT) logical entity 322 is configured to establish a virtual data-plane logical topology for a service. This may include selecting network devices to provide the service from a collection of network devices forming the data plane 330. The software defined resource allocation (SDRA) logical entity 324 is configured to map the virtual data-plane topology to a physical data-plane for transporting service-related traffic over the wireless network. This may include mapping logical links of the virtual data-plane topology to physical paths of the data plane. The software defined per-service customized data plane process (SDP) logical entity 326 is configured to select transport protocol(s) for transporting the service-related traffic over a physical data-plane of the wireless network. The transport protocols may be selected based on various criteria. In one example, the SDP logical entity selects the transport protocol based on a characteristic of the service-related traffic, e.g., business characteristic, payload volume, quality of service (QoS) requirement, etc. In another example, the SDP logical entity selects the transport protocol based on a condition on the network, e.g., loading on the data paths, etc.

The SDT entity 322, the SDRA logical entity 324, and the SDP logical entity 326 communicate with the neural network plane to optimize the system configuration (including antenna pointing/setting/redundancy assignment, among others), and they may also have other responsibilities beyond their respective roles in establishing a service-specific data plane. For example, the SDT entity 322 may dynamically define key functionality for v-s-SGWs/v-u-SGWs, as well as enable mobile VN migration and provide mobility management services. As another example, the SDRA logical entity 324 may embed virtual network sessions, as well as provide radio transmission coordination. One or both of the SDT entity 322 and the SDRA logical entity 324 may provide policy and charging rule function (PCRF) services.

The SDT entity 322, the SDRA logical entity 324, and the SDP logical entity 326 may collectively configure a service-specific data plane for carrying service-related traffic. Specifically, the SDT entity 322 establishes a virtual data-plane logical topology for the service, the SDRA logical entity 324 maps the virtual data-plane topology to a physical data-plane path for transporting service-related traffic over the wireless network, and the SDP logical entity 326 select transport protocol(s) for transporting the service-related traffic over the physical data-plane.

In one example, the neural network can automatically allocate functions in a mobile network based at least in part on utilization levels. For example, various components of the 5G network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can provide utilization levels, capability information, locality information, etc., associated with the various functions to a network resource function (NRF) (or other component), for example, such that the NRF or other component can select a particular function of a plurality of possible components providing the same function based on the utilization levels of the particular component. Thus, the system, devices, and techniques broadly apply to selecting network functions, and is not limited to a particular context or function, as discussed herein.

The neural network plane improves the functioning of a network by taking a global management view to optimize the network by reducing network congestion, dropped packets, or dropped calls due to overutilization of resources. Further, the systems, devices, and techniques can reduce a size of components (e.g., processing capacity) by obviating or reducing any need to over-allocate resources to ensure spare capacity to reduce congestion. Further, selecting functions based on utilization levels can reduce signaling overhead associated with dynamically allocating a size of a virtual instance. In some instances, the architecture described herein facilitates scalability to allow for additional components to be added or removed while maintaining network performance. In some instances, optimal functions can be selected in connection with handovers (e.g., intracell or intercell) to balance a load on network functions to provide improved Quality of Service (QoS) for network communications. These and other improvements to the functioning of a computer and network are discussed herein.

In one example, the neural network plane interacts with a user equipment (UE), an access and mobility management function (AMF), a network resource function (NRF), a session management function (SMF), and a user plane function (UPF). The UE can transmit a registration request to the AMF. At a same or different time as the registration request, the UPF can transmit utilization information to the NRF, which in turn communicates with the neural network plane. In some instances, the utilization information can include information including, but not limited to: CPU utilization level; memory utilization level; active or reserved bandwidth; a number of active sessions; a number of allowable sessions; historical usage; instantaneous usage; dropped packets; packet queue size; delay; Quality of Service (QoS) level, antenna efficiency, antenna setting; and the like. Further, the utilization information can include a status of the UPF (e.g., online, offline, schedule for maintenance, etc.). In some instances, the UPF can transmit the utilization info at any regular or irregular interval. In some instances, the UPF can transmit the utilization info in response to a request from the NRF, and/or in response to a change in one or more utilization levels above or below a threshold value.

Next, the UE can transmit a session request to the AMF, which in turn can transmit the session request to the SMF. In some instances, the session request can include a request to initiate a voice communication, a video communication, a data communication, and the like, by and between the UE and other services or devices in the network. The SMF in turn talks to the neural network plane for management. Based on its learned optimization, the neural network plane communicates instructions to the SMF. At least partially in response to receiving command from the neural network plane, the SMF can transmit a UPF query to the NRF. In some instances, the UPF query can include information including, but not limited to: a type of session requested by the UE (e.g., voice, video, bandwidth, emergency, etc.); services requested by the UE; a location of the UE; a location of a destination of the session requested by the UE; a request for a single UPF or a plurality of UPFs; and the like.

In some instances, at least partially in response to receiving the UPF query, the NRF can provide a UPF response to the SMF. In some instances, the UPF response can include one or more identifiers associated with one or more UPFs that are available to provide services to the UE. In some instances, the UPF response can be based at least in part on the session request and/or on the utilization info received from the UPF (as well as other UPFs, as discussed herein).

Based at least in part on the UPF response, the SMF can select a UPF (e.g., in a case where a plurality of UPF identifiers are provided to the SMF) or can utilize the UPF provided by the NRF for a communication session. The SMF can select a UPF and can transmit a UPF selection to the UPF that has been selected and/or designated to provide communications to the UE.

At least partially in response to the UPF selection, the UPF can provide services to the UE. As discussed herein, the UPF can facilitate data transfer to and/or from the UE to facilitate communications such as voice communications, video communications, data communications, etc.

In this manner, the neural network plane incorporates intelligence in providing services to requests in a way that optimizes system hardware and software resources and overall cost.

Next, an example process is disclosed for selecting a network function, such as a user plane function, based on utilization information learned by the neural network. The example process can be performed by the neural network in conjunction with the network resource function (NRF) (or another component), in connection with other components discussed herein. First, the neural network receives utilization information associated with one or more network functions, such as one or more user planes. Although discussed in the context of a UPF, this process apply equally to other network functions, such as a network exposure function (NEF), a policy control function (PCF), a unified data management (UDM), an authentication server function (AUSF), an access and mobility management function (AMF), a session management function (SMF), an application function (AF), and the like. In one example, user planes in a network can transmit utilization information to the NRF. In some instances, the NRF can request utilization information from various UPFs (or any network function) on a regular schedule, upon receipt of a request to initiate a communication, and then forwarding such information to the neural network plane for training, for example. In some instances, the UPF (or any network function) can transmit utilization information upon determining that a utilization level has changed more than a threshold amount compared to a previous utilization level. In some instances, utilization information can include, but is not limited to, one or more of: CPU utilization (e.g., % utilization), bandwidth utilization, memory utilization, number of allowable sessions, number of active sessions, historical utilization information, expected utilization levels, latency, current QoS of active sessions, and the like. Further, in some instances, the neural network can receive capability information associated with the user plane(s) (or any network function), location information associated with the user plane(s) (or any network function), etc. Such utilization information, capability information, location information, etc. can be stored in a database accessible by the NRF.

Next, the process can include receiving a request for a network function, such as a user plane, the request associated with a user equipment. For example, a request can be received from a session management function (SMF) or an access and mobility management function (AM F) (or any network function) for a user plane (or any network function) to initiate a communication for a user equipment. In some instances, the request can indicate a number of user planes (or any network function) to be provided by the NRF (e.g., one or many). In some instances, the request can include information associated with the communication, such as a type of the communication, locations of the UE and/or the destination of the communication, specialized services (e.g., video encoding, encryption, etc.) requested in association with the communication, a bandwidth of the communication, a minimum QoS of the communication, and the like. In some instances, the request can be based at least in part on a request initiated by the UE and provided to the AMF, the SMF, or any network function.

Operations by the neural network plane includes determining one or more network functions (e.g., user planes) based at least in part on the request and the utilization level. For example, the neural network plane can include determining that a first user plane (or any network function) is associated with a first utilization level (e.g., 80% CPU utilization) and a second user plane (or any network function) is associated with a second utilization level (e.g., 30% utilization level). Further the neural network can include determining that the first utilization level is above a utilization threshold (e.g., 70% or any value) such that addition assignments of UEs to the UPF (or any network function) may degrade a quality of connections associated with first UPF (or any network function). Accordingly, the neural network can determine that the first UPF (or any network function) is to be selected to provide data traffic for the UE.

As can be understood herein, there may be a variety of learning algorithms or ways to determine which user planes (or any network function) are to be selected as available for a communication. In some instances, the neural network can include determining that the utilization level of the second user plane (or any network function) (e.g., 30%, discussed above) is lower than the utilization level of the first user plane (or any network function) (e.g., 80%, discussed above), and accordingly, can determine that the second user plane (or any network function) is to be selected for the communication.

The neural network determines a plurality of user planes (or any network function) that are available for a communication (e.g., that have a utilization level below a threshold value). In some instances, the user planes (or any network function) can be selected based on a proximity to the UE, capabilities requested by the UE, etc. In some instances, the operation 506 can include ranking or prioritizing individual ones of the plurality of user planes (or any network function) as most appropriate to be selected for the communication. The neural network then provides an identification of the one or more user planes (or any network function) to a session management function (SMF) (or any selecting network function) to facilitate a communication with the user equipment. For example, the operation by the neural network can include providing an address or other identifier corresponding to one or more UPFs (or any one or more network functions) to an SMF (or any selecting network function) in the network. In the case where one user plane (or any network function) is provided, the SMF (or any selecting network function) may utilize the explicit user plane (or any network function) identified by the NRF. In the case where more than one user plane (or any network function) is provided, the identification may include additional information to allow the SMF (or any selecting network function) to select a user plane (or any network function), as discussed herein.

In another example for selecting a user plane function based on utilization information during a handover performed by the neural network (or another component), in connection with other components discussed herein. As usual, the neural network has utilization information associated with one or more user planes which provide utilization information to NRF that in turn sends the info to the neural network layer. Upon receiving a request for a user plane, the neural network plane can include providing a first selection of at least one first user plane based at least in part on the request and the utilization information. The operation can include the providing, allocating, and/or selecting at least one user plane based on utilization information to balance a load across a plurality of available user planes. In some instances, the operation 606 can include establishing a communication for the UE at a first radio access network (RAN) utilizing the first user plane. The neural network can receive an indication of a handover request. For example, as a UE moves about an environment, a signal quality can decrease between the UE and the first RAN. Accordingly, the neural network can automatically change antenna parameters first based on learned parameters, and if that does not change signal quality, the neural network can determine that a handover should occur, based on one or more of, but not limited to: signal strength of an anchor connection (e.g., a signal strength of the first RAN); signal strength of a target RAN (e.g., a signal strength of a second RAN); latency; UE speed/direction; traffic level(s); QoS; etc. In some instances, the neural network determines that a new user plane is required/desired based at least in part on the indication of the handover request. The neural network plane can provide a second selection of at least one second user plane based at least in part on the handover request and the utilization information. For example, the at least one second user plane can include user planes suitable and available to facilitate a communication with the UE. In some instances, the above operations can be repeated as a UE moves about an environment (and/or in response to initiate a handover based on UPF maintenance, for example). That is, the operations can be repeated continuously or periodically to determine a user plane to facilitate a communication while balancing a load of the user planes.

The neural network plane can automatically configure the direction of antennas and combine antennas in a massive MIMO antenna by first focusing the antenna on the UE device (which optimizes the directionality of the wireless link between the BS and the UE), and then transmitting first pilot signals via each of multiple antennas of the UE; receiving antenna combining information from a base station (BS), the antenna combining information for combining the multiple antennas into one or more antenna groups and an orthogonal sequence allocated to each of the one or more antenna groups; and transmitting second pilot signals to the BS using the allocated orthogonal sequences, wherein the second pilot signals are used for estimating downlink channels from the BS to the UE, wherein the antenna combining information is determined based on correlation of each of the multiple antennas obtained from the first pilot signals, and wherein a same orthogonal sequence is applied to a second pilot signal transmitted via one or more of the multiple antennas belonging to a same antenna group. The neural network can send a preferred antenna combination that is sent to the BS based on one or more of the following: 1) minimize a correlation between effective channels of the one or more antenna groups, 2) an amount of data to be transmitted, 3) second pilot signals. The second pilot signals can be captured during different time periods than a time period during which a UE of belonging to a second UE group transmits the second pilot signals. The 1st pilot signal can be transmitted by the UE even after the UE configure the antenna combination. In this case, the base station may configure new antenna combination based on the previous antenna combination (mapping between one logical channel and another logical channel). Based on this, the base station may determine antenna combining information and transmit it to the UE and to make each of the logical (effective) channels become orthogonal to each other. The neural network plane monitors performance and can automatically reconfigure or modify antenna combination when the SINR of the received signals become poor over a predetermined period of time. Based on this request, the base station may receive the antenna combining information again and transmit it to the UE. The neural network plane may determine the antenna combining information to minimize the biggest correlation value between the effective channels. Or, it may determine to make the biggest correlation value between the effective channels less than a threshold value. By doing this, the base station may prevent the antenna groups from being aligned in the same direction. In another example, suppose there are 2 UEs (UE a and UE b) and that the UE a has lots of data to be transmitted/received while there are little for UE b. In this case, the neural network provides more effective channels to UE a while UE b gets fewer number of effective channels. In another example, the UE may determine the preferred antenna combining method based on the ACK/NACK of the received data. When the number of effective channels increases, the more diversity gain can be acquired. So, the UE of this example request more number of effective channels when the decoding results of the received data is NACK for certain number of time. Otherwise, the UE may request less number of effective channels. In still another example, the UE may determine the preferred antenna combining method based on the estimated channel information. The above preferred antenna combining methods of the UE can be controlled and granted by the network. The neural network may consider not only the UE transmitted this preferred antenna combining method, but other UEs within the cell.

Figure 7B:
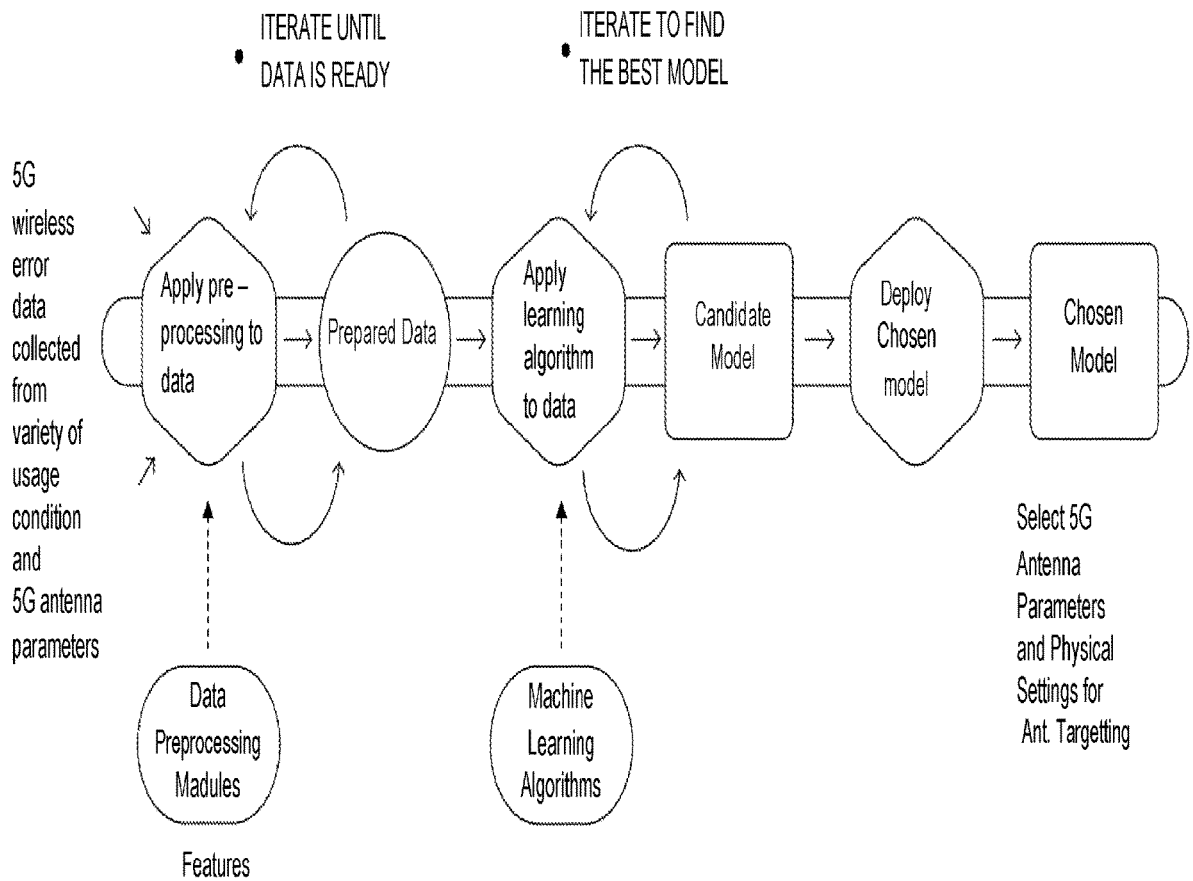
Figure 8:
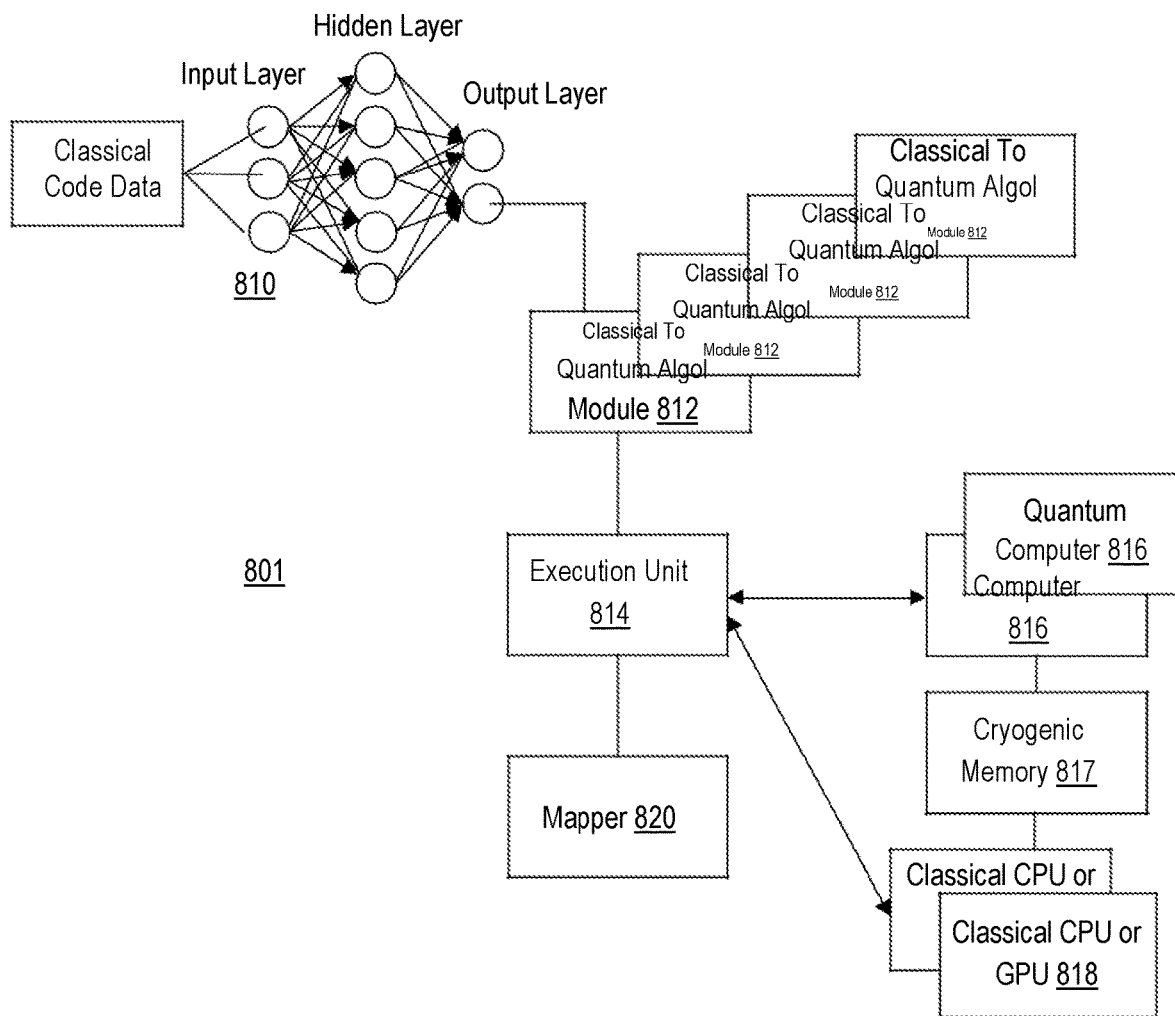

In one implementation, FIG. 7B shows an exemplary learning machine to automatically adjust the position/aim of the antennas to optimize data transmission performance and/or coverage. As noted earlier, 4G systems have range but lack speed. 5G systems have speed but requires more antennas and generally lacks the range of 4G systems. To optimize performance, a learning machine is used to automatically track a mobile device and adjust the best arrangement for the antenna arrays. The process is as follows:

Collect performance data from subsystems (see above) such as: Spatial and Modulation Symbols, RSSI, TSSI, CSI (channel state information), and attributes on channel matrix and error vector magnitude, for example Extract features and train learning machine to optimize spectral efficiency and energy efficiency of the wireless system During live communication, extract features from live 5G data and select antenna orientation/setting/params based on client device, resources available, and tower network properties for optimum transmission.

FIGS. 7C-7D show exemplary learning machine details. While the learning machine optimizes all resources, details on the antenna are discussed next, with the expectation that other resource allocations. The learning machine turn the antenna arrays "smart" so that the best antenna linkage between transceivers is achieved. Further, when one of the antenna elements in the array fails, the beamforming and beamsteering performance of the array degrades gracefully. Such an objective is achieved by reconfiguring the array when an element is found to be defective, by either changing the material properties of the substrate or by applying appropriate loading in order to make the array functional again. One embodiment changes the excitation coefficient for each array element (magnitude and phase) to optimize for changes due to the environment surrounding an array antenna. Using learning machines, one can train the antenna array to change its elements' phase or excitation distribution in order to maintain a certain radiation pattern or to enhance its beamsteering and nulling properties and solve the direction of arrival (DOA) as well.

The neural network control of the MIMO antennas provides significant gains that offer the ability to accommodate more users, at higher data rates, with better reliability, while consuming less power. Using neural network control of large number of antenna elements reduces power in a given channel by focusing the energy to targeted mobile users using precoding techniques. By directing the wireless energy to specific users, the power in channel is reduced and, at the same time, interference to other users is decreased.

In addition to controlling the 5G operation, the neural network can be used to provide local edge processing for IOT devices. A striking feature about neural networks is their enormous size. To reduce size of the neural networks for edge learning while maintaining accuracy, the local neural network performs late down-sampling and filter count reduction, to get high performance at a low parameter count. Layers can be removed or added to optimize the parameter efficiency of the network. In certain embodiments, the system can prune neurons to save some space, and a 50% reduction in network size has been done while retaining 97% of the accuracy. Further, edge devices on the other hand can be designed to work on 8 bit values, or less. Reducing precision can significantly reduce the model size. For instance, reducing a 32 bit model to 8 bit model reduces model size. Since DRAM memory access is energy intensive and slow, one embodiment keeps a small set of register files (about 1 KB) to store local data that can be shared with 4 MACs as the leaning elements). Moreover, for video processing, frame image compression and sparsity in the graph and linear solver can be used to reduce the size of the local memory to avoid going to off chip DRAMs. For example, the linear solver can use a non-zero Hessian memory array with a Cholesky module as a linear solver.

In another embodiment, original full neural network can be trained in the cloud, and distillation is used for teaching smaller networks using a larger "teacher" network. Combined with transfer learning, this method can reduce model size without losing much accuracy. In one embodiment, the learning machine is supported by a GPU on a microprocessor, or to reconfigure the FPGA used as part of the baseband processing as neural network hardware.

It should also be appreciated that, while the antenna system of the present invention is primarily intended for 5G/6G systems, it can be used in space-borne communication applications, radar, as well as other terrestrial applications, or in any application requiring a large, lightweight, stowable antenna.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

Many of the methods are described in their most basic form, but processes can be added to or deleted from any of the methods and information can be added or subtracted from any of the above description without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

What is claimed is:

1. A system, comprising:
    one or more sensors coupled to equipment to monitor operation and to predict a problem within a predetermined 5G latency of 1 ms or less;
    one or more 5G antennas;
    one or more 5G transceivers coupled to the one or more 5G antennas; and
    a processor coupled to the one or more 5G transceivers to control the equipment in real-time within the predetermined 5G latency in response to the problem detected by the one or more sensors.

2. The system of claim 1, comprising a remote processor to perform predictive maintenance based on sensor output.

3. The system of claim 1, comprising a remote processor to track equipment performance over time to predict a potential maintenance issue before they occur.

4. The system of claim 1, wherein the transceiver connects sensors, machines or robots.

5. The system of claim 1, wherein one or more sensors are at the edge to communicate with equipment.

6. The system of claim 1, comprising maintaining equipment based on statistics for wear rates or sensed equipment operation over time.

7. The system of claim 1, comprising a neural network or an artificial intelligence (AI) to perform predictive maintenance.

8. The system of claim 1, comprising an Internet of Things (loT) device wirelessly coupled to the processor.

9. The system of claim 1, comprising a remote processor to compare real-time data from sensors on connected equipment to an equipment history.

10. The system of claim 1, comprising a remote processor to proactively trigger maintenance activities based on sensor outputs indicating a potential breakdown.

11. The system of claim 1, comprising a remote processor and AI predictive analytics to request predictive maintenance.

12. The system of claim 1, comprising one or more cameras and sensors to capture security information.

13. The system of claim 1, wherein the processor analyzes walking gaits and facial features for identity identification.

14. The system of claim 1, wherein the processor analyzes sound captured using a microphone to determine events in progress.

15. The system of claim 1, comprising an edge processor to provide local edge processing for Internet-of-Things (IOT) sensors.

16. The system of claim 1, comprising an edge learning machine that uses pre-trained models and modifies the pre-trained models for a selected task.

17. The system of claim 1, comprising a cloud trained neural network whose network parameters are reduced before transferring to an edge neural network.

18. A system, comprising:
    one or more 5G antennas;
    one or more 5G transceivers coupled to the one or more 5G antennas; and
    a processor with a learning machine or neural network to control the one or more 5G transceivers, the processor automatically changing antenna parameters based on learned parameters and determining a handover based on a signal strength of an anchor connection, a second connection, a latency;
    equipment speed, equipment direction, traffic level, or quality of service.

19. A system, comprising:
    one or more 5G antennas;
    one or more 5G transceivers coupled to the one or more 5G antennas; and
    a processor to control the one or more 5G transceivers with the one or more 5G antennas, the processor running code to:

collect performance data including Spatial and Modulation Symbols, signal strength, channel state information, attributes on channel matrix, and error vector magnitude;

extract features and train a learning machine to optimize spectral efficiency and energy efficiency;

during live communication, extract features from live 5G data and use the 5G data to select antenna parameters based on a client device, resources available, and tower network property.

20. The system of claim 19, comprising an edge learning machine in communication with the processor, wherein the edge learning machine uses pre-trained models and modifies the pre-trained models during run-time for a selected task.

\* \* \* \* \*